United States Patent
Wang et al.

(10) Patent No.: US 9,921,867 B2
(45) Date of Patent: Mar. 20, 2018

(54) NEGOTIATION BETWEEN VIRTUAL MACHINE AND HOST TO DETERMINE EXECUTOR OF PACKET FLOW CONTROL POLICY WITH REDUCED ADDRESS SPACE

(71) Applicant: Huawei Technologies Co., Ltd., Shenzhen, Guangdong (CN)

(72) Inventors: Fuhai Wang, Shenzhen (CN); Guansen He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 530 days.

(21) Appl. No.: 14/586,121

(22) Filed: Dec. 30, 2014

(65) Prior Publication Data
US 2015/0186173 A1    Jul. 2, 2015

Related U.S. Application Data

(63) Continuation of application No. PCT/CN2014/081642, filed on Jul. 4, 2014.

(30) Foreign Application Priority Data

Dec. 30, 2013  (CN) .......................... 2013 1 0746701

(51) Int. Cl.
G06F 9/455  (2006.01)
G06F 9/54   (2006.01)
(Continued)

(52) U.S. Cl.
CPC ........ *G06F 9/45558* (2013.01); *G06F 9/5055* (2013.01); *H04L 47/10* (2013.01);
(Continued)

(58) Field of Classification Search
None
See application file for complete search history.

(56) References Cited

U.S. PATENT DOCUMENTS 8,176,486 B2 * 5/2012 Amir Husain ......... G06F 9/445
                                                     709/223
8,385,202 B2   2/2013 Kuik et al.
(Continued)

FOREIGN PATENT DOCUMENTS

CN    102132511 A   7/2011
CN    102413183 A   4/2012
(Continued)

OTHER PUBLICATIONS

Jiuxing Liu, et al., "High Performance VMM-Bypass I/O in Virtual Machines", Annual Tech '06: 2006 USENIX Annual Conference, Jun. 1, 2006, p. 29-42.
(Continued)

*Primary Examiner* — Abu Zar Ghaffari

(57) ABSTRACT

A packet flow control method, an apparatus, and a computing node are disclosed. The method may include: negotiating, between a virtual machine and a host, an executor of a flow control policy based on a flow control capability of the virtual machine; if it is determined that a negotiated executor of the flow control policy is the virtual machine, performing, by the virtual machine, forward processing on a to-be-forward-processed packet based on the flow control policy; and if it is determined that the negotiated executor of the flow control policy is the Host, sending, by the virtual machine, the to-be-forward-processed packet to the Host, so that the Host performs forward processing on the received packet based on the flow control policy. The technical solutions provided by embodiments of the present invention help reduce address space, of the Host, occupied for processing an outbound packet flow of the virtual machine.

36 Claims, 12 Drawing Sheets

(51) Int. Cl.
*G06F 9/50* (2006.01)
*H04L 12/801* (2013.01)

(52) U.S. Cl.
CPC .............. *G06F 2009/45595* (2013.01); *G06F 2209/509* (2013.01)

(56) References Cited

U.S. PATENT DOCUMENTS

| | | | | |
|---|---|---|---|---|
| 8,732,308 | B1* | 5/2014 | Talwar | G06F 9/546 709/226 |
| 9,225,631 | B2* | 12/2015 | Kapur | H04L 45/245 |
| 9,413,778 | B1* | 8/2016 | Elisha | H04L 63/1425 |
| 2003/0191792 | A1* | 10/2003 | Waki | G06F 9/30156 718/100 |
| 2010/0054129 | A1 | 3/2010 | Kuik et al. | |
| 2011/0273984 | A1* | 11/2011 | Hsu | H04L 29/06 370/235 |
| 2011/0321065 | A1 | 12/2011 | Gopalakrishnan et al. | |
| 2012/0093160 | A1* | 4/2012 | Tonsing | H04L 12/5602 370/392 |
| 2012/0185856 | A1* | 7/2012 | Ashihara | G06F 9/4856 718/1 |
| 2013/0125125 | A1 | 5/2013 | Karino Shuichi | |
| 2013/0254767 | A1 | 9/2013 | Mizuno et al. | |
| 2014/0160931 | A1* | 6/2014 | Choi | H04L 47/24 370/235 |

FOREIGN PATENT DOCUMENTS

| | | |
|---|---|---|
| CN | 102594707 A | 7/2012 |
| CN | 103176833 A | 6/2013 |
| CN | 103763403 A | 4/2014 |
| JP | 2013126062 A | 6/2013 |
| JP | 2013196604 A | 9/2013 |
| JP | 2013535711 A | 9/2013 |
| WO | WO 2013/191972 A1 | 12/2013 |

OTHER PUBLICATIONS

Aravind Menon, et al., "Optimizing Network Virtualization in Xen", Annual Tech '06: 2006 USENIX Annual Conference, May 31, 2006, p. 15-28.

Ryousei Takano et al., "Traffic monitoring and control method for virtual machine monitor-bypass network devices", Jun. 15, 2011, 7 pages.

* cited by examiner

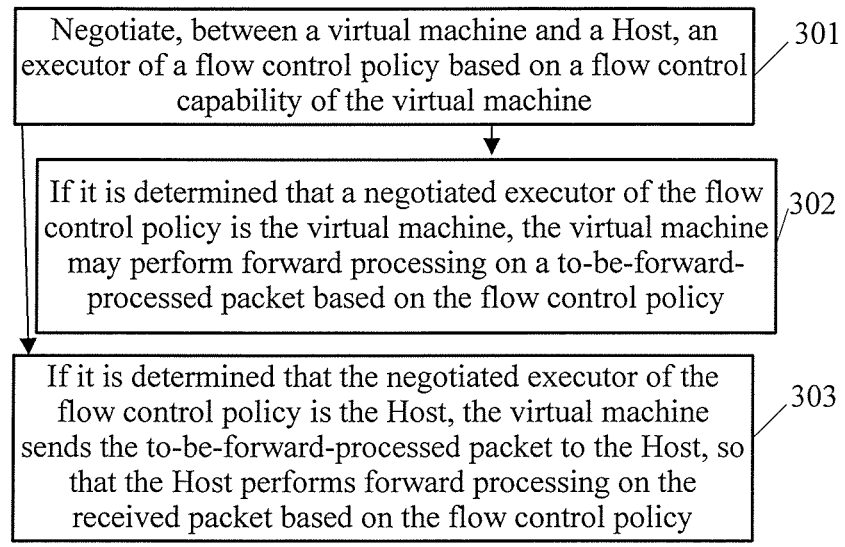
FIG. 3
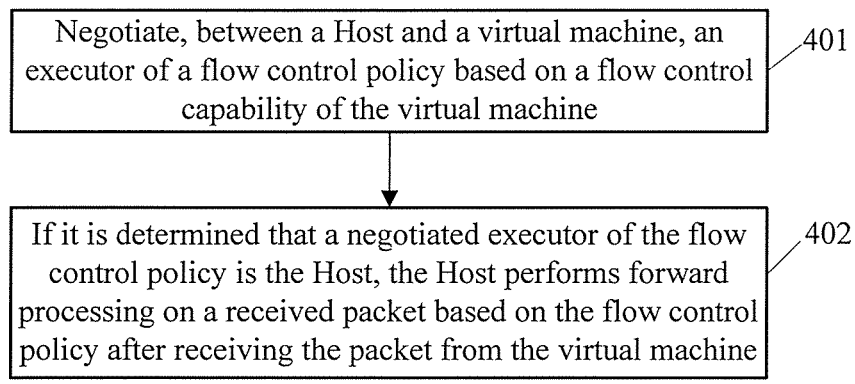
FIG. 4-a

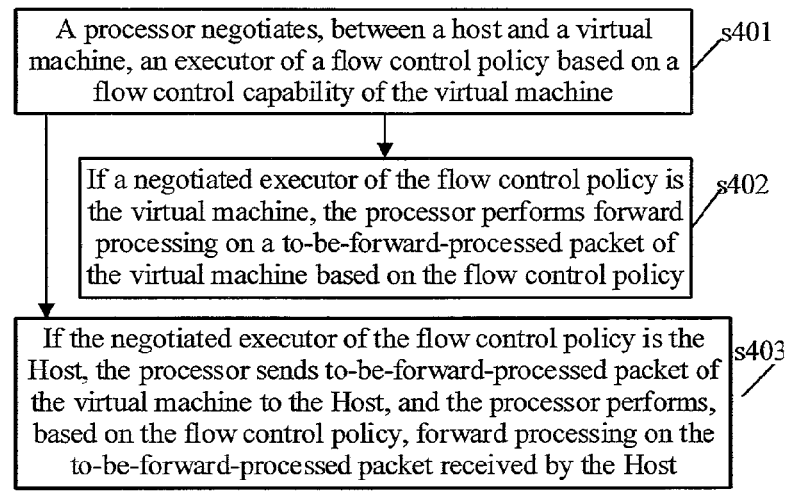
FIG. 4-b
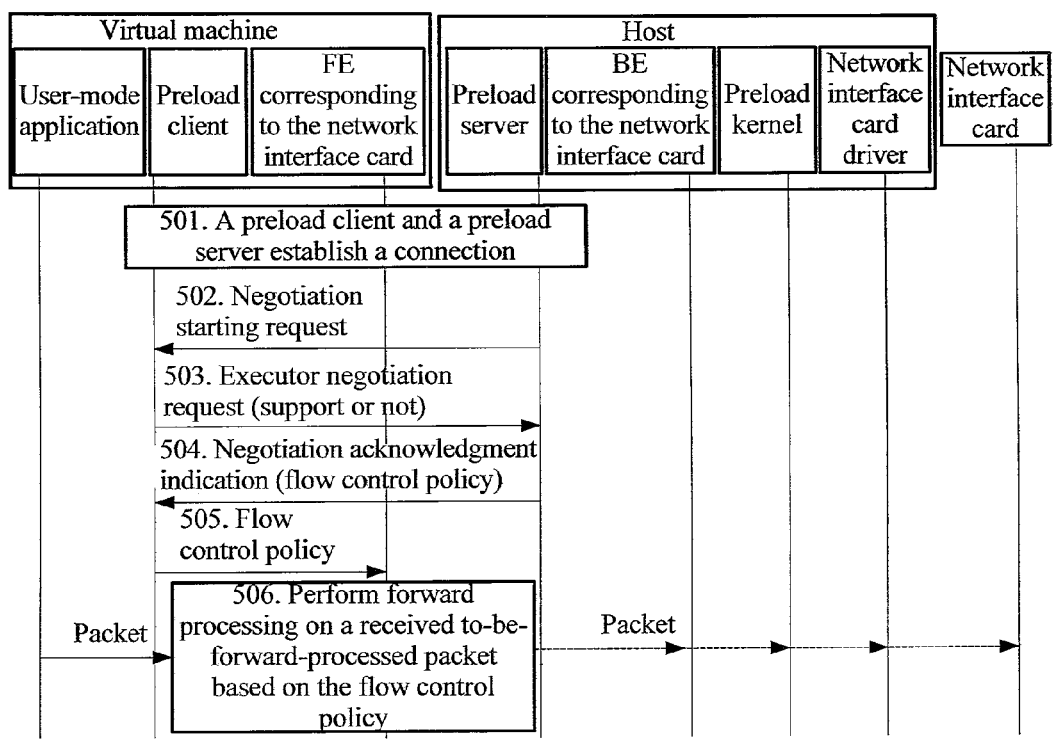
FIG. 5-a

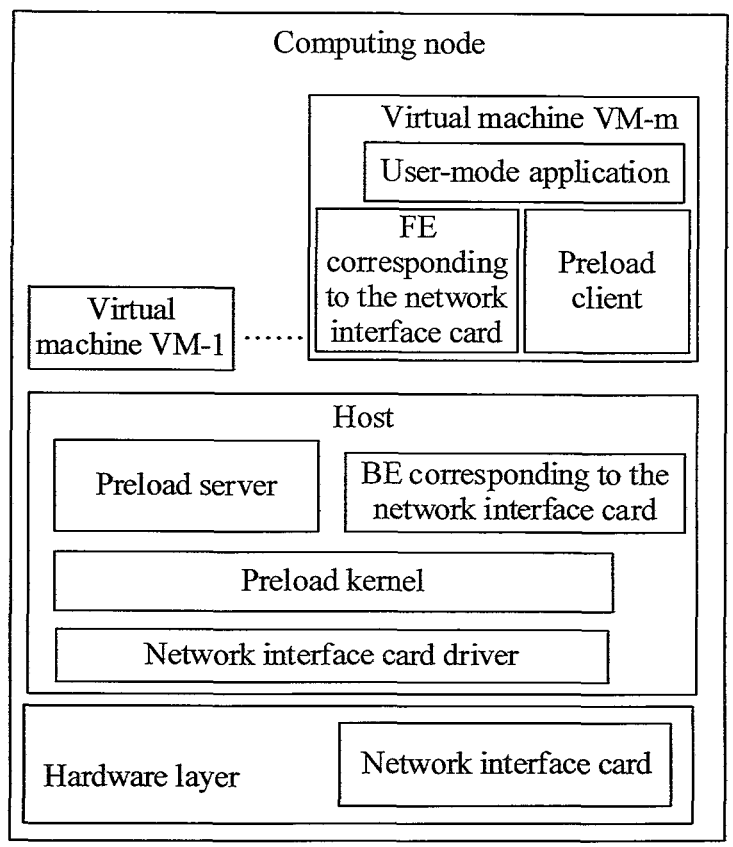
FIG. 5-b

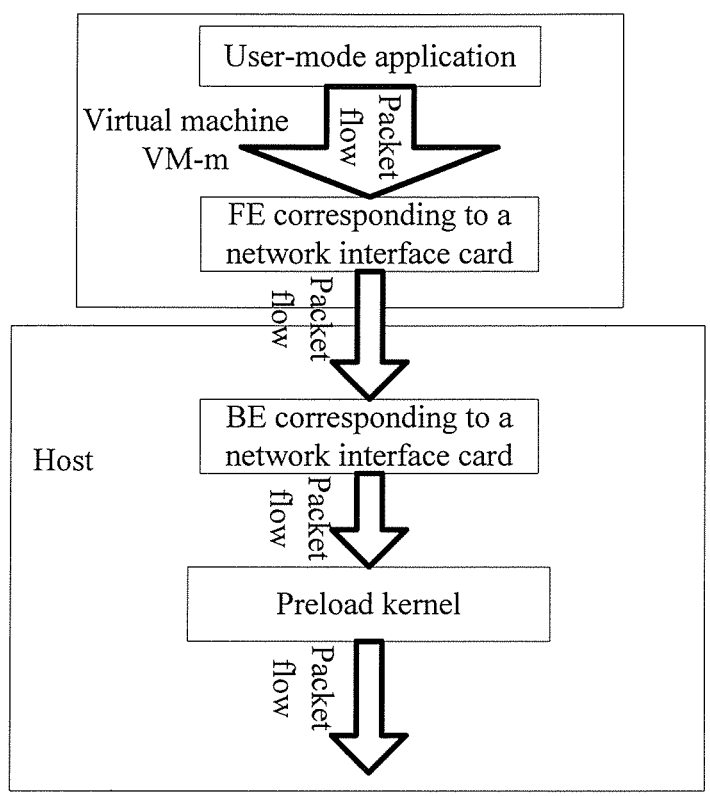
FIG. 5-c

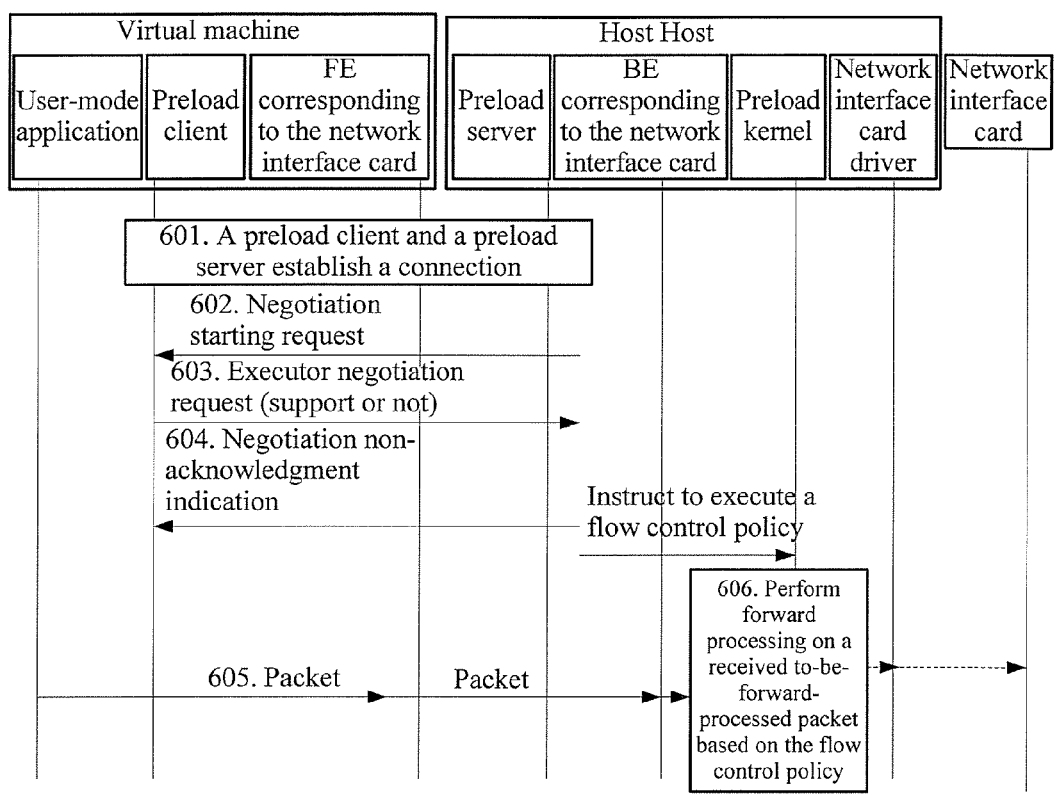
FIG. 6-a

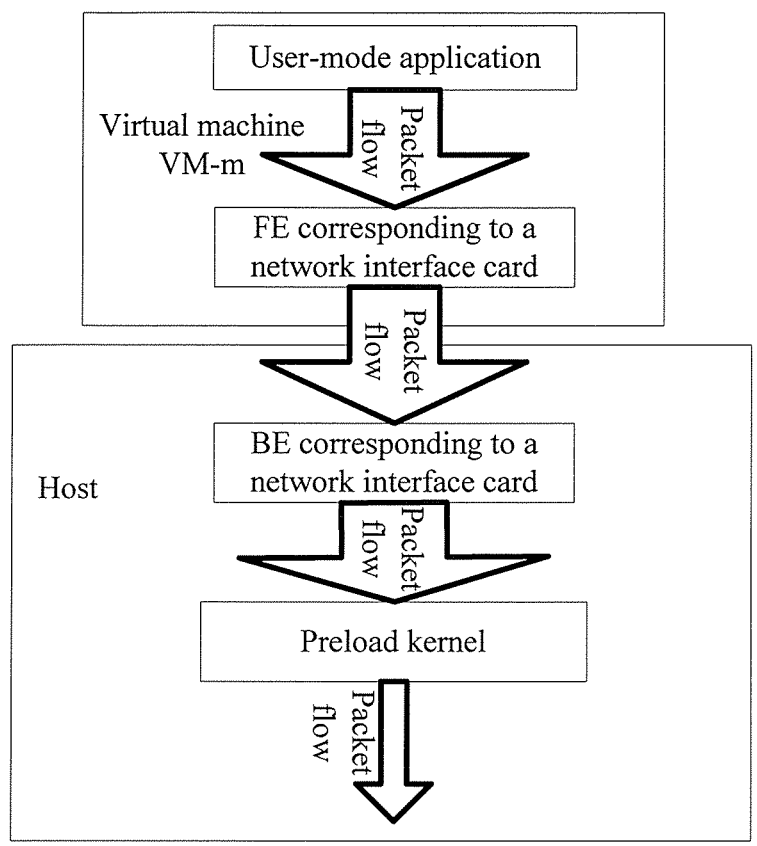
FIG. 6-b

NEGOTIATION BETWEEN VIRTUAL MACHINE AND HOST TO DETERMINE EXECUTOR OF PACKET FLOW CONTROL POLICY WITH REDUCED ADDRESS SPACE

CROSS-REFERENCE TO RELATED APPLICATIONS

This application is a continuation of International Application No. PCT/CN2014/081642, filed on Jul. 4, 2014, which claims priority to Chinese Patent Application No. 201310746701.5, filed on Dec. 30, 2013, both of which are hereby incorporated by reference in their entireties.

TECHNICAL FIELD

The present invention relates to the field of computer technologies, and in particular, to a packet flow control method, a related apparatus, and a computing node.

BACKGROUND

A virtualization technology is a decoupling technology for separating a bottom-layer hardware device from an upper-layer operating system and application program. As shown in FIG. 1, a virtual machine monitor (VMM) layer is introduced to directly manage bottom-layer hardware resources, and a virtual machine (virtual machine, VM) that is independent of the bottom-layer hardware is created for the upper-layer operating system and application program to use.

As one of important bottom-layer technologies that support a currently popular cloud computing (cloud computing) platform, the virtualization technology can greatly improve the resource usage efficiency of a physical device. Compared with a conventional physical server, a virtual machine has better isolation and encapsulation performance.

In some existing virtualized scenarios, a host (Host) performs bandwidth limitation or access control based on another policy on an outbound flow of a virtual machine. For example, after a VM sends a packet, the Host first copies the packet from address space of the VM to address space of the Host; the Host deter mines whether the packet exceeds a sending limit, generally discards directly or first caches a packet that exceeds the sending limit, and generally discards directly a packet that exceeds a cache limit.

During a studying and practicing process, the inventor finds that, an existing mechanism in which a Host executes flow control may, on some occasions, cause a serious processing delay (for example, in some scenarios in which the number of VMs is large or scenarios in which the number of packets sent by VM is large), causing a large amount of address space of the Host to be occupied.

SUMMARY

Embodiments of the present invention provide a flow control method, a related apparatus, and a computing node, so as to reduce address space of a Host occupied for processing an outbound packet flow of a virtual machine.

In order to resolve the foregoing technical problem, the embodiments of the present invention provide the following technical solutions:

A first aspect of the embodiments of the present invention provides a packet flow control method, where the method may include:

negotiating, between a virtual machine and a host, an executor of a flow control policy based on a flow control capability of the virtual machine;

if it is determined that a negotiated executor of the flow control policy is the virtual machine, performing, by the virtual machine, forward processing on a to-be-forward-processed packet based on the flow control policy; and if it is determined that the negotiated executor of the flow control policy is the Host, sending, by the virtual machine, the to-be-forward-processed packet to the Host, so that the Host performs forward processing on the received packet based on the flow control policy.

With reference to the first aspect, in a first possible implementation manner, the negotiating, between a virtual machine and a host, an executor of a flow control policy based on a flow control capability of the virtual machine includes:

sending, by the virtual machine, an executor negotiation request that carries description information about the flow control capability of the virtual machine to the Host;

if the virtual machine receives a negotiation acknowledgment indication that is sent by the Host after the Host determines, according to the description information about the flow control capability, that the virtual machine supports execution of the flow control policy, determining, by the virtual machine, that the negotiated executor of the flow control policy is the virtual machine; and if the virtual machine receives a negotiation non-acknowledgment indication that is sent by the Host after the Host determines, according to the description information about the flow control capability, that the virtual machine does not support the execution of the flow control policy, determining, by the virtual machine, that the negotiated executor of the flow control policy is the Host;

or the negotiating, between a virtual machine and a host, an executor of a flow control policy based on a flow control capability of the virtual machine includes:

sending, by the virtual machine, an executor negotiation request that carries description information about the flow control capability of the virtual machine to the Host, where the description information about the flow control capability is used to describe a version of a flow control policy of which execution is supported by the virtual machine;

if the virtual machine receives a negotiation acknowledgment indication that is sent by the Host after the Host determines, according to the description information about the flow control capability, that the virtual machine supports execution of a flow control policy of a current latest version or a preset version, determining, by the virtual machine, that the negotiated executor of the flow control policy is the virtual machine; and if the virtual machine receives a negotiation non-acknowledgment indication that is sent by the Host after the Host determines, according to the description information about the flow control capability, that the virtual machine does not support the execution of the flow control policy of the current latest version or the preset version, determining, by the virtual machine, that the negotiated executor of the flow control policy is the Host;

or the negotiating, between a virtual machine and a host, an executor of a flow control policy based on a flow control capability of the virtual machine includes:

sending, by the virtual machine, an executor negotiation request that carries description information about the flow control capability of the virtual machine to the Host;

if the virtual machine receives a negotiation acknowledgment indication that is sent by the Host after the Host determines, according to the description information about the flow control capability, that the virtual machine supports execution of the flow control policy, determining, by the virtual machine, that the negotiated executor of the flow control policy is the virtual machine; and if the virtual machine receives, within a first set duration, no negotiation acknowledgment indication that is sent by the Host in response to the executor negotiation request, determining, by the virtual machine, that the negotiated executor of the flow control policy is the Host;

or the negotiating, between a virtual machine and a host, an executor of a flow control policy based on a flow control capability of the virtual machine includes:

sending, by the virtual machine, an executor negotiation request that carries description information about the flow control capability of the virtual machine to the Host, where the description information about the flow control capability is used to describe a version of a flow control policy of which execution is supported by the virtual machine;

if the virtual machine receives a negotiation acknowledgment indication that is sent by the Host after the Host determines, according to the description information about the flow control capability, that the virtual machine supports execution of a flow control policy of a current latest version or a preset version, determining, by the virtual machine, that the negotiated executor of the flow control policy is the virtual machine; and if the virtual machine receives, within a first set duration, no negotiation acknowledgment indication that is sent by the Host in response to the executor negotiation request, determining, by the virtual machine, that the negotiated executor of the flow control policy is the Host;

or the negotiating, between a virtual machine and a host, an executor of a flow control policy based on a flow control capability of the virtual machine includes:

sending, by the virtual machine, an executor negotiation request that carries description information about the flow control capability of the virtual machine to the Host;

if the virtual machine receives a negotiation non-acknowledgment indication that is sent by the Host after the Host determines, according to the description information about the flow control capability, that the virtual machine does not support execution of the flow control policy, determining, by the virtual machine, that the negotiated executor of the flow control policy is the Host; and if the virtual machine receives, within a second set duration, no negotiation non-acknowledgment indication that is sent by the Host in response to the executor negotiation request, deter mining, by the virtual machine, that the negotiated executor of the flow control policy is the virtual machine;

or the negotiating, between a virtual machine and a host, an executor of a flow control policy based on a flow control capability of the virtual machine includes:

sending, by the virtual machine, an executor negotiation request that carries description information about the flow control capability of the virtual machine to the Host, where the description information about the flow control capability is used to describe a version of a flow control policy of which execution is supported by the virtual machine;

if the virtual machine receives a negotiation non-acknowledgment indication that is sent by the Host after the Host determines, according to the description information about the flow control capability, that the virtual machine does not support execution of a flow control policy of a current latest version or a preset version, determining, by the virtual machine, that the negotiated executor of the flow control policy is the Host; and if the virtual machine receives, within a second set duration, no negotiation non-acknowledgment indication that is sent by the Host in response to the executor negotiation request, determining, by the virtual machine, that the negotiated executor of the flow control policy is the virtual machine.

With reference to the first possible implementation manner of the first aspect, in a second possible implementation manner, the negotiation acknowledgment indication includes the flow control policy; and the performing, by the virtual machine, forward processing on the to-be-forward-processed packet based on the flow control policy includes:

performing, by the virtual machine, forward processing on the to-be-forward-processed packet based on the flow control policy included in the negotiation acknowledgment indication.

With reference to the first possible implementation manner of the first aspect or the second possible implementation manner of the first aspect, in a third possible implementation manner, the sending, by the virtual machine, an executor negotiation request that carries description information about the flow control capability of the virtual machine to the Host includes:

sending, by the virtual machine after receiving a negotiation starting request initiated by a user-mode process, the executor negotiation request that carries the description information about the flow control capability of the virtual machine to the Host; or sending, by the virtual machine after receiving a negotiation starting request from the Host, the executor negotiation request that carries the description information about the flow control capability of the virtual machine to the Host.

With reference to the first aspect, the first possible implementation manner of the first aspect, the second possible implementation manner of the first aspect, or the third possible implementation manner of the first aspect, in a fourth possible implementation manner, the negotiating, between a virtual machine and a host, an executor of a flow control policy based on a flow control capability of the virtual machine includes: after a connection between a preload client deployed in the virtual machine and a preload server deployed in the Host is established, negotiating between the virtual machine and the Host, by the preload client with the preload server based on the established connection, the executor of the flow control policy based on the flow control capability of the virtual machine.

With reference to the fourth possible implementation manner of the first aspect, in a fifth possible implementation manner, the method further includes:

after it is determined that the negotiated executor of the flow control policy is the virtual machine, periodically sending, by the preload client, a heartbeat message to the preload server through the connection.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner, the flow control policy is a flow control policy based on service quality and/or a flow control policy based on an access control list.

A second aspect of the embodiments of the present invention provides a packet flow control method, where the method may include:

negotiating, between a virtual machine and a host, an executor of a flow control policy based on a flow control capability of the virtual machine; and if it is determined that a negotiated executor of the flow control policy is the Host, performing, by the Host after receiving a packet from the virtual machine, forward processing on the received packet based on the flow control policy.

With reference to the second aspect, in a first possible implementation manner, the negotiating, between a virtual machine and a host, an executor of a flow control policy based on a flow control capability of the virtual machine includes:

receiving, by the Host, an executor negotiation request that is sent by the virtual machine and carries description information about the flow control capability of the virtual machine;

sending a negotiation acknowledgment indication to the virtual machine if the Host determines, according to the description information about the flow control capability, that the virtual machine supports execution of the flow control policy, where the negotiation acknowledgment indication indicates that the negotiated executor of the flow control policy is the virtual machine; and sending a negotiation non-acknowledgment indication to the virtual machine if the Host determines, according to the description information about the flow control capability, that the virtual machine does not support the execution of the flow control policy, where the negotiation non-acknowledgment indication indicates that the negotiated executor of the flow control policy is the Host;

or the negotiating, between a virtual machine and a host, an executor of a flow control policy based on a flow control capability of the virtual machine includes:

receiving, by the Host, an executor negotiation request that is sent by the virtual machine and carries description information about the flow control capability of the virtual machine, where the description information about the flow control capability is used to describe a version of a flow control policy of which execution is supported by the virtual machine;

sending a negotiation acknowledgment indication to the virtual machine if the Host determines, according to the description information about the flow control capability, that the virtual machine supports execution of a flow control policy of a current latest version or a preset version, where the negotiation acknowledgment indication indicates that the negotiated executor of the flow control policy is the virtual machine; and sending a negotiation non-acknowledgment indication to the virtual machine if the Host determines, according to the description information about the flow control capability, that the virtual machine does not support the execution of the flow control policy of the current latest version or the preset version, where the negotiation non-acknowledgment indication indicates that the negotiated executor of the flow control policy is the Host.

With reference to the second aspect or the first possible implementation manner of the second aspect, in a second possible implementation manner, the negotiating, between a virtual machine and a host, an executor of a flow control policy based on a flow control capability of the virtual machine includes: after a connection between a preload server in the Host and a preload client in the virtual machine is established, negotiating, by the preload server with the preload client by using the connection, and between the virtual machine and the host, the executor of the flow control policy based on the flow control capability of the virtual machine.

With reference to the second aspect, the first possible implementation manner of the second aspect, or the second possible implementation manner of the second aspect, in a third possible implementation manner, the method further includes:

after it is determined that the negotiated executor of the flow control policy is the virtual machine, if no heartbeat message is received from the virtual machine within a set duration, sending, by the Host to the virtual machine, an indication message to indicate that the executor of the flow control policy is switched to the Host.

With reference to the second aspect, the first possible implementation manner of the second aspect, the second possible implementation manner of the second aspect, or the third possible implementation manner of the second aspect, in a fourth possible implementation manner, the flow control policy is a flow control policy based on service quality and/or a flow control policy based on an access control list.

A third aspect of the embodiments of the present invention provides a packet flow control method, where the method may include:

negotiating, by a processor and between a host and a virtual machine, an executor of a flow control policy based on a flow control capability of the virtual machine;

if a negotiated executor of the flow control policy is the virtual machine, performing, by the processor, forward processing on a to-be-forward-processed packet of the virtual machine based on the flow control policy; and if the negotiated executor of the flow control policy is the Host, sending, by the processor, the to-be-forward-processed packet of the virtual machine from the virtual machine to the Host, and performing, by the processor based on the flow control policy, forward processing on the to-be-forward-processed packet received by the Host.

With reference to the third aspect, in a first possible implementation manner, the negotiating, by a processor and between a host and a virtual machine, an executor of a flow control policy based on a flow control capability of the virtual machine includes:

sending, by the processor to the Host, an executor negotiation request that is to be sent to the Host by the virtual machine, where the executor negotiation request carries description information about the flow control capability of the virtual machine; and after the Host receives the executor negotiation request, if the processor determines, according to the description information about the flow control capability, that the virtual machine supports execution of the flow control policy, sending, by the processor to the virtual machine, a negotiation acknowledgment indication that is to be sent to the virtual machine by the Host, where the negotiation acknowledgment indication indicates that the negotiated executor of the flow control policy is the virtual machine; and/or if the processor determines, according to the description information about the flow control capability, that the virtual machine does not support the execution of the flow control policy, sending, by the processor to the virtual machine, a negotiation non-acknowledgment indication that is to be sent to the virtual machine by the Host, where the negotiation non-acknowledgment indication indicates that the negotiated executor of the flow control policy is the Host;

or the negotiating, by a processor and between a host and a virtual machine, an executor of a flow control policy based on a flow control capability of the virtual machine includes: sending, by the processor to the Host, an executor negotiation request that is to be sent to the Host by the virtual machine, where the executor negotiation request carries description information about the flow control capability of the virtual machine, and the description information about the flow control capability is used to describe a version of a flow control policy of which execution is supported by the virtual machine; and after the Host receives the executor negotiation request, if the processor determines, according to the description information about the flow control capability, that the virtual machine supports execution of a flow control policy of a current latest version or a preset version, sending, by the processor to the virtual machine, a negotiation acknowledgment indication that is to be sent to the virtual machine by the Host, where the negotiation acknowledgment indication indicates that the negotiated executor of the flow control policy is the virtual machine; and/or if the processor determines, according to the description information about the flow control capability, that the virtual machine does not support the execution of the flow control policy of the current latest version or the preset version, sending, by the processor to the virtual machine, a negotiation non-acknowledgment indication that is to be sent to the virtual machine by the Host, where the negotiation non-acknowledgment indication indicates that the negotiated executor of the flow control policy is the Host.

With reference to the third aspect or the first possible implementation manner of the third aspect, in a second possible implementation manner, the negotiation acknowledgment indication includes the flow control policy; and the performing forward processing on the to-be-forward-processed packet of the virtual machine based on the flow control policy includes: performing forward processing on the to-be-forward-processed packet of the virtual machine based on the flow control policy included in the negotiation acknowledgment indication.

With reference to the third aspect, the first possible implementation manner of the third aspect, or the second possible implementation manner of the third aspect, in a third possible implementation manner, after it is determined that the negotiated executor of the flow control policy is the virtual machine, if the Host receives no heartbeat message from the virtual machine within a set duration, sending, by the processor to the virtual machine, an indication message that is to be sent by the Host to the virtual machine and used to indicate that the executor of the flow control policy is switched to the Host.

With reference to the third aspect, the first possible implementation manner of the third aspect, the second possible implementation manner of the third aspect, or the third possible implementation manner of the third aspect, in a fourth possible implementation manner, the flow control policy is a flow control policy based on service quality and/or a flow control policy based on an access control list.

With reference to the third aspect, the first possible implementation manner of the third aspect, the second possible implementation manner of the third aspect, the third possible implementation manner of the third aspect, or the fourth possible implementation manner of the third aspect, in a fifth possible implementation manner, the sending, to the Host, the executor negotiation request to be sent by the virtual machine to the Host includes:

after the virtual machine receives a negotiation starting request initiated by a user-mode process, sending, to the Host, the executor negotiation request to be sent by the virtual machine to the Host; or after the virtual machine receives a negotiation starting request from the Host, sending, to the Host, the executor negotiation request to be sent by the virtual machine to the Host.

With reference to the third aspect, the first possible implementation manner of the third aspect, the second possible implementation manner of the third aspect, the third possible implementation manner of the third aspect, the fourth possible implementation manner of the third aspect, or the fifth possible implementation manner of the third aspect, in a sixth possible implementation manner, the negotiating, between a host and a virtual machine, an executor of a flow control policy based on a flow control capability of the virtual machine includes: after a connection between a preload client deployed in the virtual machine and a preload server deployed in the Host is established, negotiating, by using the established connection, and between the virtual machine and the Host, the executor of the flow control policy based on the flow control capability of the virtual machine.

A fifth aspect of the embodiments of the present invention provides a virtual machine, where the virtual machine may include:

a first negotiating unit, configured to negotiate, between the virtual machine and a host, an executor of a flow control policy based on a flow control capability of the virtual machine; and a packet processing unit, configured to perform forward processing on a to-be-forward-processed packet based on the flow control policy if it is determined that a negotiated executor of the flow control policy is the virtual machine, and send the to-be-forward-processed packet to the Host if it is determined that the negotiated executor of the flow control policy is the Host, so that the Host performs forward processing on the received packet based on the flow control policy.

With reference to the fifth aspect, in a first possible implementation manner, the first negotiating unit is specifically configured to send an executor negotiation request that carries description information about the flow control capability of the virtual machine to the Host; if a negotiation acknowledgment indication is received, determine that the negotiated executor of the flow control policy is the virtual machine, where the negotiation acknowledgment indication is sent by the Host after the Host determines, according to the description information about the flow control capability, that the virtual machine supports execution of the flow control policy; and if a negotiation non-acknowledgment indication is received, determine that the negotiated executor of the flow control policy is the Host, where the negotiation non-acknowledgment indication is sent by the Host after the Host determines, according to the description information about the flow control capability, that the virtual machine does not support the execution of the flow control policy;

or the first negotiating unit is specifically configured to send an executor negotiation request that carries description information about the flow control capability of the virtual machine to the Host, where the description information about the flow control capability is used to describe a version of a flow control policy of which execution is supported by the virtual machine; if a negotiation acknowledgment indication that is sent by the Host after the Host determines, according to the description information about the flow control capability, that the virtual machine supports execution of a flow control policy of a current latest version or a preset version is received, determine that the negotiated executor of the flow control policy is the virtual machine; and if a negotiation non-acknowledgment indication that is sent by the Host after the Host determines, according to the description information about the flow control capability, that the virtual machine does not support the execution of the flow control policy of the current latest version or the preset version is received, determine that the negotiated executor of the flow control policy is the Host;

or the first negotiating unit is specifically configured to send an executor negotiation request that carries description information about the flow control capability of the virtual machine to the Host; if a negotiation acknowledgment indication is received, determine that the negotiated executor of the flow control policy is the virtual machine, where the negotiation acknowledgment indication is sent by the Host after the Host determines, according to the description information about the flow control capability, that the virtual machine supports execution of the flow control policy; and if no negotiation acknowledgment indication that is sent by the Host in response to the executor negotiation request is received within a first set duration, determine that the negotiated executor of the flow control policy is the Host;

or the first negotiating unit is specifically configured to send an executor negotiation request that carries description information about the flow control capability of the virtual machine to the Host, where the description information about the flow control capability is used to describe a version of a flow control policy of which execution is supported by the virtual machine; if a negotiation acknowledgment indication that is sent by the Host after the Host determines, according to the description information about the flow control capability, that the virtual machine supports execution of a flow control policy of a current latest version or a preset version is received, determine that the negotiated executor of the flow control policy is the virtual machine; and if no negotiation acknowledgment indication that is sent by the Host in response to the executor negotiation request is received within a first set duration, determine that the negotiated executor of the flow control policy is the Host;

or the first negotiating unit is specifically configured to send an executor negotiation request that carries description information about the flow control capability of the virtual machine to the Host; if a negotiation non-acknowledgment indication is received, determine that the negotiated executor of the flow control policy is the Host, where the negotiation non-acknowledgment indication is sent by the Host after the Host determines, according to the description information about the flow control capability, that the virtual machine does not support execution of the flow control policy; and if no negotiation non-acknowledgment indication that is sent by the Host in response to the executor negotiation request is received within a second set duration, determine that the negotiated executor of the flow control policy is the virtual machine;

or the first negotiating unit is specifically configured to send an executor negotiation request that carries description information about the flow control capability of the virtual machine to the Host, where the description information about the flow control capability is used to describe a version of a flow control policy of which execution is supported by the virtual machine; if a negotiation non-acknowledgment indication that is sent by the Host after the Host determines, according to the description information about the flow control capability, that the virtual machine does not support execution of a flow control policy of a current latest version or a preset version is received, determine that the negotiated executor of the flow control policy is the Host; and if no negotiation non-acknowledgment indication that is sent by the Host in response to the executor negotiation request is received within a second set duration, determine that the negotiated executor of the flow control policy is the virtual machine.

With reference to the fifth aspect or the first possible implementation manner of the fifth aspect, in a second possible implementation manner, the virtual machine further includes:

a sending unit, configured to periodically send a heartbeat message to the Host after it is determined that the negotiated executor of the flow control policy is the virtual machine.

With reference to the fifth aspect, the first possible implementation manner of the fifth aspect, or the second possible implementation manner of the fifth aspect, in a third possible implementation manner, the flow control policy is a flow control policy based on service quality and/or a flow control policy based on an access control list.

With reference to the first possible implementation manner of the fifth aspect, the second possible implementation manner of the fifth aspect, or the third possible implementation manner of the fifth aspect, in a fourth possible implementation manner, for sending the executor negotiation request that carries the description information about the flow control capability of the virtual machine to the Host, the first negotiating unit is specifically configured to send the executor negotiation request that carries the description information about the flow control capability of the virtual machine to the Host after a negotiation starting request initiated by a user-mode process is received; or send the executor negotiation request that carries the description information about the flow control capability of the virtual machine to the Host after a negotiation starting request from the Host is received.

A sixth aspect of the embodiments of the present invention provides a host, where the host includes:

a second negotiating unit, configured to negotiate, between a virtual machine and the host, an executor of a flow control policy based on a flow control capability of the virtual machine; and a packet processing unit, configured to: if it is determined that a negotiated executor of the flow control policy is the host, perform forward processing on a received packet based on the flow control policy after receiving the packet from the virtual machine.

With reference to the sixth aspect, in a first possible implementation manner, the second negotiating unit is specifically configured to receive an executor negotiation request that is sent by the virtual machine and carries description information about the flow control capability of the virtual machine; send a negotiation acknowledgment indication to the virtual machine if it is determined, according to the description information about the flow control capability, that the virtual machine supports execution of the flow control policy, where the negotiation acknowledgment indication indicates that the negotiated executor of the flow control policy is the virtual machine; and send a negotiation non-acknowledgment indication to the virtual machine if it is determined, according to the description information about the flow control capability, that the virtual machine does not support the execution of the flow control policy, where the negotiation non-acknowledgment indication indicates that the negotiated executor of the flow control policy is the host;

or the second negotiating unit is specifically configured to receive an executor negotiation request that is sent by the virtual machine and carries description information about the flow control capability of the virtual machine, where the description information about the flow control capability is used to describe a version of a flow control policy of which execution is supported by the virtual machine; send a negotiation acknowledgment indication to the virtual machine if it is determined, according to the description information about the flow control capability, that the virtual machine supports execution of a flow control policy of a current latest version or a preset version, where the negotiation acknowledgment indication indicates that the negotiated executor of the flow control policy is the virtual machine; and send a negotiation non-acknowledgment indication to the virtual machine if it is determined, according to the description information about the flow control capability, that the virtual machine does not support the execution of the flow control policy of the current latest version or the preset version, where the negotiation non-acknowledgment indication indicates that the negotiated executor of the flow control policy is the host.

With reference to the sixth aspect or the first possible implementation manner of the sixth aspect, in a second possible implementation manner, the packet processing unit is further configured to: after it is determined that the negotiated executor of the flow control policy is the virtual machine, and if no heartbeat message is received from the virtual machine within a set duration, send, to the virtual machine, an indication message used to indicate that the executor of the flow control policy is switched to the Host.

With reference to the sixth aspect, the first possible implementation manner of the sixth aspect, or the second possible implementation manner of the sixth aspect, in a third possible implementation manner, the flow control policy is a flow control policy based on service quality and/or a flow control policy based on an access control list.

A seventh aspect of the embodiments of the present invention provides a computing node, where the computing node may include a hardware layer, a host that runs at the hardware layer, and at least one virtual machine that runs on the Host, where:

the virtual machine is configured to negotiate, between the virtual machine and the Host, an executor of a flow control policy based on a flow control capability of the virtual machine; perform forward processing on a to-be-forward-processed packet based on the flow control policy if it is determined that a negotiated executor of the flow control policy is the virtual machine; and send the to-be-forward-processed packet to the Host if it is determined that the negotiated executor of the flow control policy is the Host; and the Host is configured to: if it is determined that the negotiated executor of the flow control policy is the Host, perform forward processing on a received packet based on the flow control policy after receiving the packet from the virtual machine.

With reference to the seventh aspect, in a first possible implementation manner, for negotiating, between the virtual machine and the Host, the executor of the flow control policy based on the flow control capability of the virtual machine, the virtual machine is specifically configured to send an executor negotiation request that carries description information about the flow control capability of the virtual machine to the Host; if a negotiation acknowledgment indication is received, determine that the negotiated executor of the flow control policy is the virtual machine, where the negotiation acknowledgment indication is sent by the Host after the Host determines, according to the description information about the flow control capability, that the virtual machine supports execution of the flow control policy; and if a negotiation non-acknowledgment indication is received, determine that the negotiated executor of the flow control policy is the Host, where the negotiation non-acknowledgment indication is sent by the Host after the Host determines, according to the description information about the flow control capability, that the virtual machine does not support the execution of the flow control policy;

or for negotiating, between the virtual machine and the Host, the executor of the flow control policy based on the flow control capability of the virtual machine, the virtual machine is specifically configured to send an executor negotiation request that carries description information about the flow control capability of the virtual machine to the host, where the description information about the flow control capability is used to describe a version of a flow control policy of which execution is supported by the virtual machine; if a negotiation acknowledgment indication that is sent by the Host after the Host determines, according to the description information about the flow control capability, that the virtual machine supports execution of a flow control policy of a current latest version or a preset version is received, determine that the negotiated executor of the flow control policy is the virtual machine; and if a negotiation non-acknowledgment indication that is sent by the Host after the Host determines, according to the description information about the flow control capability, that the virtual machine does not support the execution of the flow control policy of the current latest version or the preset version is received, determine that the negotiated executor of the flow control policy is the Host;

or for negotiating, between the virtual machine and the Host, the executor of the flow control policy based on the flow control capability of the virtual machine, the virtual machine is specifically configured to send an executor negotiation request that carries description information about the flow control capability of the virtual machine to the Host; if a negotiation acknowledgment indication is received, determine that the negotiated executor of the flow control policy is the virtual machine, where the negotiation acknowledgment indication is sent by the Host after the Host determines, according to the description information about the flow control capability, that the virtual machine supports execution of the flow control policy; and if no negotiation acknowledgment indication that is sent by the Host in response to the executor negotiation request is received within a first set duration, determine that the negotiated executor of the flow control policy is the Host;

or for negotiating, between the virtual machine and the Host, the executor of the flow control policy based on the flow control capability of the virtual machine, the virtual machine is specifically configured to send an executor negotiation request that carries description information about the flow control capability of the virtual machine to the host, where the description information about the flow control capability is used to describe a version of a flow control policy of which execution is supported by the virtual machine; if a negotiation acknowledgment indication that is sent by the Host after the Host determines, according to the description information about the flow control capability, that the virtual machine supports execution of a flow control policy of a current latest version or a preset version is received, determine that the negotiated executor of the flow control policy is the virtual machine; and if no negotiation acknowledgment indication that is sent by the Host in response to the executor negotiation request is received within a first set duration, determine that the negotiated executor of the flow control policy is the Host;

or for negotiating, between the virtual machine and the Host, the executor of the flow control policy based on the flow control capability of the virtual machine, the virtual machine is specifically configured to send an executor negotiation request that carries description information about the flow control capability of the virtual machine to the Host; if a negotiation non-acknowledgment indication is received, determine that the negotiated executor of the flow control policy is the Host, where the negotiation non-acknowledgment indication is sent by the Host after the Host determines, according to the description information about the flow control capability, that the virtual machine does not support execution of the flow control policy; and if no negotiation non-acknowledgment indication that is sent by the Host in response to the executor negotiation request is received within a second set duration, determine that the negotiated executor of the flow control policy is the virtual machine;

or for negotiating, between the virtual machine and the Host, the executor of the flow control policy based on the flow control capability of the virtual machine, the virtual machine is specifically configured to send an executor negotiation request that carries description information about the flow control capability of the virtual machine to the host, where the description information about the flow control capability is used to describe a version of a flow control policy of which execution is supported by the virtual machine; if a negotiation non-acknowledgment indication that is sent by the Host after the Host determines, according to the description information about the flow control capability, that the virtual machine does not support execution of a flow control policy of a current latest version or a preset version is received, determine that the negotiated executor of the flow control policy is the Host; and if no negotiation non-acknowledgment indication that is sent by the Host in response to the executor negotiation request is received within a second set duration, determine that the negotiated executor of the flow control policy is the virtual machine.

With reference to the seventh aspect or the first possible implementation manner of the seventh aspect, in a second possible implementation manner, the Host is further configured to: after it is determined that the negotiated executor of the flow control policy is the virtual machine, if no heartbeat message is received from the virtual machine within a set duration, send, to the virtual machine, an indication message used to indicate that the executor of the flow control policy is switched to the Host.

An eighth aspect of the embodiments of the present invention provides a computing node, which includes:

storage, and a processor that is connected to the storage, where:

the processor is configured to: negotiate, between a host and a virtual machine, an executor of a flow control policy based on a flow control capability of the virtual machine; and if a negotiated executor of the flow control policy is the virtual machine, perform forward processing on a to-be-forward-processed packet of the virtual machine based on the flow control policy; and if the negotiated executor of the flow control policy is the Host, send the to-be-forward-processed packet of the virtual machine from the virtual machine to the Host, and perform, based on the flow control policy, forward processing on the to-be-forward-processed packet received by the Host.

With reference to the eighth aspect, in a first possible implementation manner of the eighth aspect, the processor is configured to send, to the Host, an executor negotiation request that is to be sent to the Host by the virtual machine, where the executor negotiation request carries description information about the flow control capability of the virtual machine; and after the Host receives the executor negotiation request, if it is determined, according to the description information about the flow control capability, that the virtual machine supports execution of the flow control policy, send, to the virtual machine, a negotiation acknowledgment indication that is to be sent to the virtual machine by the Host, where the negotiation acknowledgment indication indicates that the negotiated executor of the flow control policy is the virtual machine; and/or if it is determined, according to the description information about the flow control capability, that the virtual machine does not support the execution of the flow control policy, send, to the virtual machine, a negotiation non-acknowledgment indication that is to be sent to the virtual machine by the Host, where the negotiation non-acknowledgment indication indicates that the negotiated executor of the flow control policy is the Host;

or the processor is configured to send, to the Host, an executor negotiation request that is to be sent to the Host by the virtual machine, where the executor negotiation request carries description information about the flow control capability of the virtual machine, and the description information about the flow control capability is used to describe a version of a flow control policy of which execution is supported by the virtual machine; and after the Host receives the executor negotiation request, if it is determined, according to the description information about the flow control capability, that the virtual machine supports execution of a flow control policy of a current latest version or a preset version, send, to the virtual machine, a negotiation acknowledgment indication that is to be sent to the virtual machine by the Host, where the negotiation acknowledgment indication indicates that the negotiated executor of the flow control policy is the virtual machine; and/or if it is determined, according to the description information about the flow control capability, that the virtual machine does not support the execution of the flow control policy of the current latest version or the preset version, send, to the virtual machine, a negotiation non-acknowledgment indication that is to be sent to the virtual machine by the Host, where the negotiation non-acknowledgment indication indicates that the negotiated executor of the flow control policy is the Host.

With reference to the first possible implementation manner of the eighth aspect, in a second possible implementation manner of the eighth aspect, the negotiation acknowledgment indication includes the flow control policy; and the processor is configured to perform forward processing on the to-be-forward-processed packet of the virtual machine based on the flow control policy included in the negotiation acknowledgment indication.

With reference to the eighth aspect, the first possible implementation manner of the eighth aspect, or the second possible implementation manner of the eighth aspect, in a third possible implementation manner of the eighth aspect, the processor is further configured to: after it is determined that the negotiated executor of the flow control policy is the virtual machine, if the Host receives no heartbeat message from the virtual machine within a set duration, send, to the virtual machine, an indication message that is to be sent by the Host to the virtual machine and used to indicate that the executor of the flow control policy is switched to the Host.

It can be learned that in some technical solutions according to embodiments of the present invention, an executor of a flow control policy is negotiated between a virtual machine and a Host based on a flow control capability of the virtual machine; if it is determined that a negotiated executor of the flow control policy is the virtual machine, the virtual machine performs forward processing on a to-be-forward-processed packet based on the flow control policy; and if it is determined that the negotiated executor of the flow control policy is the Host, the virtual machine sends the to-be-forward-processed packet to the Host, so that the Host performs forward processing on the received packet based on the flow control policy. A mechanism in which the virtual machine and the Host negotiate the executor of the flow control policy is introduced, so that both the virtual machine and the Host have an opportunity to be the executor of the flow control policy; this makes it possible for the virtual machine to execute the flow control policy, which helps perform flow control on a packet as early as possible, and further helps reduce ineffective processing and reduce bandwidth and address space, of the Host, occupied by an invalid packet flow. It can be seen that the solution helps reduce the address space, of the Host, occupied for processing an outbound packet flow of the virtual machine. Moreover, because the executor of the flow control policy is determined through negotiation, an execution capability of the executor of the flow control policy is ensured to a certain extent, which helps improve reliability of executing the flow control policy.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 3 is a schematic flowchart of a packet flow control method according to an embodiment of the present invention;

FIG. 4-a is a schematic flowchart of another packet flow control method according to an embodiment of the present invention;

FIG. 4-b is a schematic flowchart of another packet flow control method according to an embodiment of the present invention;

FIG. 5-a is a schematic flowchart of another packet flow control method according to an embodiment of the present invention;

FIG. 5-b is a schematic structural diagram of a computing node according to an embodiment of the present invention;

FIG. 5-c is a schematic diagram of an effect of packet flow control according to an embodiment of the present invention;

FIG. 6-a is a schematic flowchart of another packet flow control method according to an embodiment of the present invention;

FIG. 6-b is a schematic diagram of an effect of another packet flow control according to an embodiment of the present invention;

DETAILED DESCRIPTION

Figure 1:
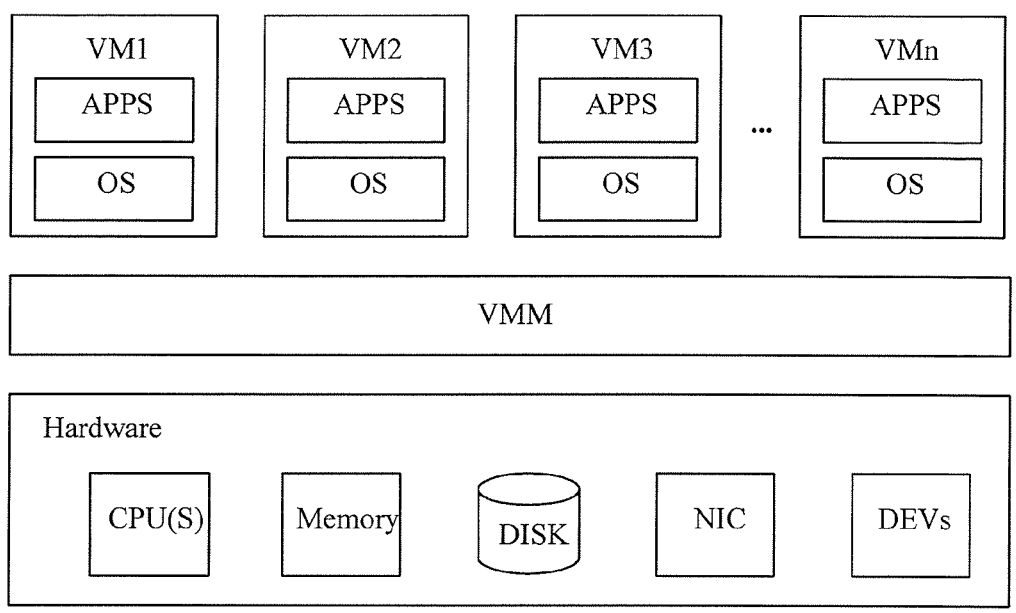
FIG. 1 is a schematic diagram of a virtualization architecture according to an embodiment of the present invention.

Embodiments of the present invention provide a flow control method, a related apparatus, and a computing node, so as to reduce address space of a Host occupied for processing an outbound packet flow of a virtual machine.

To make a person skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

For ease of understanding the embodiments of the present invention, several elements that are to be introduced in describing the embodiments of the present invention are first described herein.

Virtual machine VM: One or more virtual computers may be simulated on one physical computer by using virtual machine software. These virtual machines work like real computers, where an operating system and application program may be installed on the virtual machines, and the virtual machines may further access network resources. For an application program that runs in a virtual machine, the application program works in the virtual machine as if it works in a real computer.

Hardware layer: The hardware layer is a hardware platform on which a virtualized environment runs. The hardware layer may include a variety of hardware. For example, a hardware layer of a computing node may include a CPU and a memory, and may further include a high-speed/low-speed input/output (input/output, I/O) device such as a network interface card and storage device, and another device that has specific processing functions such as an input/output memory management unit (Input/Output Memory Management Unit, IOMMU), where the IOMMU may be used to perform conversion between a physical address of a virtual machine and a physical address of a Host.

Host (Host): The Host, as a management layer, is used to implement management and allocation of hardware resources, present a virtual hardware platform to a virtual machine, and implement scheduling and isolation of virtual machines. The Host may be a virtual machine monitor (VMM). In addition, on some occasions, a VMM cooperates with one privileged virtual machine, and the VMM and the virtual machine are combined to form a Host. The virtual hardware platform provides various hardware resources for each virtual machine that runs on the virtual hardware platform, for example, provides a virtual central processing unit (Central Processing Unit, CPU), a memory, a virtual disk, a virtual network interface card, and the like. The virtual disk may correspond to a file or a logical block device of the Host. The virtual machine runs on the virtual hardware platform that is prepared by the Host for the virtual machine, and one or more virtual machines run on the Host.

Figure 2:
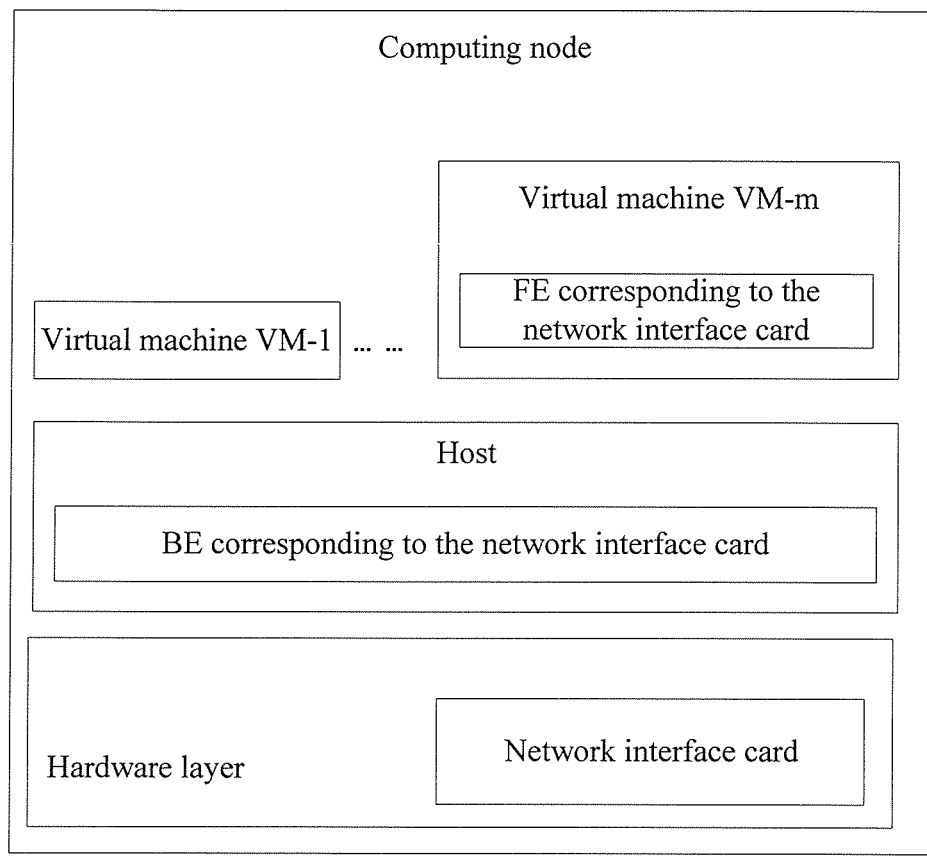
FIG. 2 is a schematic diagram of another virtualization architecture according to an embodiment of the present invention.

Referring to FIG. 2, FIG. 2 is a schematic diagram of a virtualization architecture of a computing node according to an embodiment of the present invention, where the architecture mainly includes three layers: a hardware layer, a Host, and a virtual machine (VM). The hardware layer includes a network interface card. A back-end (Back-End, BE) instance corresponding to the network interface card is deployed in the Host, and the VM has a front-end (Front-End, FE) instance corresponding to the network interface card, where the BE in the VM may be considered as a front-end driver of the network interface card, and the FE in the Host may be considered as a back-end driver of the network interface card.

In an embodiment of a packet flow control method according to the present invention, the packet flow control method includes: negotiating, between a virtual machine and a Host, an executor of a flow control policy based on a flow control capability of the virtual machine; if it is determined that a negotiated executor of the flow control policy is the virtual machine, performing, by the virtual machine, forward processing on a to-be-forward-processed packet based on the flow control policy; and if it is determined that the negotiated executor of the flow control policy is the Host, sending, by the virtual machine, the to-be-forward-processed packet to the Host, so that the Host performs forward processing on the received packet based on the flow control policy.

Referring to FIG. 3, FIG. 3 is a schematic flowchart of a packet flow control method according to an embodiment of the present invention. As shown in FIG. 3, the packet flow control method according to this embodiment of the present invention may include the following content:

301. Negotiate, between a virtual machine and a Host, an executor of a flow control policy based on a flow control capability of the virtual machine.

In some embodiments of the present invention, the virtual machine and the host may negotiate, between the virtual machine and the Host, the executor of the flow control policy based on the flow control capability of the virtual machine in multiple manners.

For example, the negotiating, between a virtual machine and a Host, an executor of a flow control policy based on a flow control capability of the virtual machine includes: sending, by the virtual machine, an executor negotiation request that carries description information about the flow control capability of the virtual machine to the Host; if the virtual machine receives a negotiation acknowledgment indication that is sent by the Host after the Host determines, according to the description information about the flow control capability, that the virtual machine supports execution of the flow control policy, determining, by the virtual machine, that the negotiated executor of the flow control policy is the virtual machine; and if the virtual machine receives a negotiation non-acknowledgment indication that is sent by the Host after the Host determines, according to the description information about the flow control capability, that the virtual machine does not support the execution of the flow control policy, determining, by the virtual machine, that the negotiated executor of the flow control policy is the Host.

For another example, the negotiating, between a virtual machine and a Host, an executor of a flow control policy based on a flow control capability of the virtual machine includes: sending, by the virtual machine, an executor negotiation request that carries description information about the flow control capability of the virtual machine to the Host, where the description information about the flow control capability is used to describe a version of a flow control policy of which execution is supported by the virtual machine; if the virtual machine receives a negotiation acknowledgment indication that is sent by the Host after the Host determines, according to the description information about the flow control capability, that the virtual machine supports execution of a flow control policy of a current latest version or a preset version, determining, by the virtual machine, that the negotiated executor of the flow control policy is the virtual machine; and if the virtual machine receives a negotiation non-acknowledgment indication that is sent by the Host after the Host determines, according to the description information about the flow control capability, that the virtual machine does not support the execution of the flow control policy of the current latest version or the preset version, determining, by the virtual machine, that the negotiated executor of the flow control policy is the Host.

For another example, the negotiating, between a virtual machine and a Host, an executor of a flow control policy based on a flow control capability of the virtual machine includes: sending, by the virtual machine, an executor negotiation request that carries description information about the flow control capability of the virtual machine to the Host; if the virtual machine receives a negotiation acknowledgment indication that is sent by the Host after the Host determines, according to the description information about the flow control capability, that the virtual machine supports execution of the flow control policy, determining, by the virtual machine, that the negotiated executor of the flow control policy is the virtual machine; and if the virtual machine receives, within a first set duration, no negotiation acknowledgment indication that is sent by the Host in response to the executor negotiation request, determining, by the virtual machine, that the negotiated executor of the flow control policy is the Host.

For another example, the negotiating, between a virtual machine and a Host, an executor of a flow control policy based on a flow control capability of the virtual machine includes: sending, by the virtual machine, an executor negotiation request that carries description information about the flow control capability of the virtual machine to the Host, where the description information about the flow control capability is used to describe a version of a flow control policy of which execution is supported by the virtual machine; if the virtual machine receives a negotiation acknowledgment indication that is sent by the Host after the Host determines, according to the description information about the flow control capability, that the virtual machine supports execution of a flow control policy of a current latest version or a preset version, determining, by the virtual machine, that the negotiated executor of the flow control policy is the virtual machine; and if the virtual machine receives, within a first set duration, no negotiation acknowledgment indication that is sent by the Host in response to the executor negotiation request, determining, by the virtual machine, that the negotiated executor of the flow control policy is the Host.

For another example, the negotiating, between a virtual machine and a Host, an executor of a flow control policy based on a flow control capability of the virtual machine includes: sending, by the virtual machine, an executor negotiation request that carries description information about the flow control capability of the virtual machine to the Host; if the virtual machine receives a negotiation non-acknowledgment indication that is sent by the Host after the Host determines, according to the description information about the flow control capability, that the virtual machine does not support the execution of the flow control policy, determining, by the virtual machine, that the negotiated executor of the flow control policy is the Host; and if the virtual machine receives, within a second set duration, no negotiation non-acknowledgment indication that is sent by the Host in response to the executor negotiation request, determining, by the virtual machine, that the negotiated executor of the flow control policy is the virtual machine.

For another example, the negotiating, between a virtual machine and a Host, an executor of a flow control policy based on a flow control capability of the virtual machine includes: sending, by the virtual machine, an executor negotiation request that carries description information about the flow control capability of the virtual machine to the Host, where the description information about the flow control capability is used to describe a version of a flow control policy of which execution is supported by the virtual machine; if the virtual machine receives a negotiation non-acknowledgment indication that is sent by the Host after the Host determines, according to the description information about the flow control capability, that the virtual machine does not support execution of a flow control policy of a current latest version or a preset version, determining, by the virtual machine, that the negotiated executor of the flow control policy is the Host; and if the virtual machine receives, within a second set duration, no negotiation non-acknowledgment indication that is sent by the Host in response to the executor negotiation request, determining, by the virtual machine, that the negotiated executor of the flow control policy is the virtual machine.

In some embodiments of the present invention, the description information about the flow control capability is used to describe a version of a flow control policy of which execution is supported by the virtual machine; therefore, that the Host determines, according to the description information about the flow control capability, whether the virtual machine supports execution of the flow control policy of the current latest version or the preset version may specifically include: determining, through comparison, whether the version, which is described by the description information about the flow control capability, of the flow control policy of which execution is supported by the virtual machine, is the same as the current latest version or the preset version of the flow control policy; if they are the same, determining that the virtual machine supports execution of the flow control policy of the current latest version or the preset version; and if they are different, determining that the virtual machine does not support the execution of the flow control policy of the current latest version or the preset version. For another example, that the Host determines, according to the description information about the flow control capability, whether the virtual machine supports execution of the flow control policy of the current latest version or the preset version may specifically include: determining, through comparison, whether each version of k (where k is a positive integer) versions, which are described by the description information about the flow control capability, of flow control policies of which execution is supported by the virtual machine, is the same as the current latest version or the preset version of the flow control policy; if it is obtained, by comparison, that one version of the k versions is the current latest version or the preset version of the flow control policy, determining that the virtual machine supports execution of the flow control policy of the current latest version or the preset version; and if it is obtained, by comparison, that any one version of the k versions is different from the current latest version or the preset version of the flow control policy, determining that the virtual machine does not support the execution of the flow control policy of the current latest version or the preset version.

It may be understood that specific manners in which the virtual machine and the host negotiate, between the virtual machine and the Host, the executor of the flow control policy based on the flow control capability of the virtual machine are not limited to the foregoing examples.

302. If it is determined that a negotiated executor of the flow control policy is the virtual machine, the virtual machine may perform forward processing on a to-be-forward-processed packet based on the flow control policy.

303. If it is determined that the negotiated executor of the flow control policy is the Host, the virtual machine sends the to-be-forward-processed packet to the Host, so that the Host performs forward processing on the received packet based on the flow control policy.

The flow control policy mentioned in this embodiment may be, for example, a flow control policy based on service quality and/or a flow control policy based on an access control list; certainly, the flow control policy may also be a flow control policy that makes reference to other factors.

In the flow control policy based on service quality, a specific manner (where a specific forward processing manner may be sending a packet with a delay, sending a packet without a delay, or discarding a packet, or the like) of performing forward processing on the packet is determined mainly based on a service priority corresponding to the to-be-forward-processed packet. For example, multiple to-be-forward-processed packets currently exist in a cache; a packet corresponding to a higher service priority may be sent with a shorter delay or even without a delay, a packet corresponding to a lower service priority may be sent with a longer delay, and a to-be-forward-processed packet corresponding to a service priority that is lower than a set priority threshold may even be discarded. This helps ensure service quality of a high-priority service as much as possible. That is, the performing forward processing on the to-be-forward-processed packet according to the flow control policy based on service quality may specifically include: performing forward processing on the to-be-forward-processed packet according to a forward processing manner corresponding to a service priority of the to-be-forward-processed packet.

In the flow control policy based on an access control list, a specific manner of performing forward processing on the packet is determined mainly based on whether information carried in the to-be-forward-processed packet matches a record included in an access control list. For example, the access control list is a restricted access control list (which is similar to a blacklist); if the restricted access control list has a record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; on the contrary, if the restricted access control list has no record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. For another example, the access control list is a permitted access control list (which is similar to a whitelist); if the permitted access control list has no record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; and if the permitted access control list has a record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. Other cases may be processed by analogy.

In some embodiments of the present invention, the negotiation acknowledgment indication includes the flow control policy; and the performing, by the virtual machine, forward processing on the to-be-forward-processed packet based on the flow control policy includes: performing, by the virtual machine, forward processing on the to-be-forward-processed packet based on the flow control policy included in the negotiation acknowledgment indication.

Certainly, the Host may also transfer the flow control policy to the virtual machine in other manners, so that the virtual machine performs, after it is determined that the negotiated executor of the flow control policy is the virtual machine, forward processing on the to-be-forward-processed packet based on the flow control policy transferred by the Host. Certainly, the flow control policy may also be pre-configured in the virtual machine; when the virtual machine determines that the negotiated executor of the flow control policy is the virtual machine, the virtual machine performs forward processing on the to-be-forward-processed packet based on the pre-configured flow control policy.

In some embodiments of the present invention, that the virtual machine sends the executor negotiation request that carries the description information about the flow control capability of the virtual machine to the Host includes: sending, by the virtual machine after receiving a negotiation starting request (which, that is, may be triggered by a user-mode application or a user instruction) initiated by a user-mode process, the executor negotiation request that carries the description information about the flow control capability of the virtual machine to the Host; or sending, by the virtual machine after receiving a negotiation starting request from the Host, the executor negotiation request that carries the description information about the flow control capability of the virtual machine to the Host. Certainly, the virtual machine may also independently or be triggered by another condition to send the executor negotiation request that carries the description information about the flow control capability of the virtual machine to the Host.

In some embodiments of the present invention, a preload client may be deployed in the virtual machine, a preload server may be deployed in the Host, and the preload client and the preload server may negotiate, between the virtual machine and the Host, the executor of the flow control policy based on the flow control capability of the virtual machine. For example, the negotiating, between a virtual machine and a Host, an executor of a flow control policy based on a flow control capability of the virtual machine may include: after a connection between the preload client deployed in the virtual machine and the preload server deployed in the Host is established, negotiating between the virtual machine and the Host, by the preload client with the preload server based on the established connection, the executor of the flow control policy based on the flow control capability of the virtual machine.

In some embodiments of the present invention, further, after it is determined that the negotiated executor of the flow control policy is the virtual machine, the preload client periodically sends a heartbeat message to the preload server through the connection. One of the purposes of sending the heartbeat message is to notify the Host of a state that the virtual machine works properly; if the Host receives no heartbeat message from the virtual machine within a set duration, the Host may determine by default that a fault occurs on the virtual machine. For example, after it is determined that the negotiated executor of the flow control policy is the virtual machine, if the Host receives no heartbeat message from the virtual machine within the set duration, the Host may switch the executor of the flow control policy to the Host (that is, the Host also performs forward processing on a packet, which is from the virtual machine, based on the flow control policy no matter whether the virtual machine performs forward processing on the to-be-forward-processed packet based on the flow control policy; because flow control policies executed in the Host and the virtual machine are the same, for a same packet flow, if the Host or the virtual machine or both execute the flow control policy, eventual packet output conditions are basically the same), and may or may not send, to the virtual machine, an indication message used to indicate that the executor of the flow control policy is switched to the Host.

In some embodiments of the present invention, after it is determined that the negotiated executor of the flow control policy is the virtual machine, the preload client may also, when a fault occurs when the virtual machine executes the flow control policy, send an indication message to the preload server to indicate that the fault occurs when the virtual machine executes the flow control policy; after it is determined that the negotiated executor of the flow control policy is the virtual machine, if the Host receives the indication message from the virtual machine to indicate that the fault occurs when the virtual machine executes the flow control policy, the Host may switch the executor of the flow control policy to the Host.

In some embodiments of the present invention, after it is determined that the negotiated executor of the flow control policy is the virtual machine, the preload server may also periodically or non-periodically send a state query message to the preload client to query whether the virtual machine properly executes the flow control policy; and if no state indication message in response to the state query message is received from the virtual machine within a set duration, or an indication message is received, where the indication message is from the virtual machine and indicates that a fault occurs when the virtual machine executes the flow control policy, it may be determined that a fault occurs when the virtual machine executes the flow control policy. Certainly, the preload server may also monitor, in other manners, whether a fault occurs when the virtual machine executes the flow control policy. If it is determined that a fault occurs when the virtual machine executes the flow control policy, the Host may switch the executor of the flow control policy to the Host.

It can be learned that in the solution according to this embodiment, an executor of a flow control policy is negotiated between a virtual machine and a Host based on a flow control capability of the virtual machine; if it is determined that a negotiated executor of the flow control policy is the virtual machine, the virtual machine performs forward processing on a to-be-forward-processed packet based on the flow control policy; and if it is determined that the negotiated executor of the flow control policy is the Host, the virtual machine sends the to-be-forward-processed packet to the Host, so that the Host performs forward processing on the received packet based on the flow control policy. A mechanism in which the virtual machine and the Host negotiate the executor of the flow control policy is introduced, so that both the virtual machine and the Host have an opportunity to be the executor of the flow control policy; this makes it possible for the virtual machine to execute the flow control policy, which helps perform flow control on a packet as early as possible, and further helps reduce ineffective processing and reduce bandwidth and address space, of the Host, occupied by an invalid packet flow. It can be seen that the solution helps reduce the address space, of the Host, occupied for performing forward processing on an outbound packet flow of the virtual machine. Moreover, the executor of the flow control policy is determined through negotiation, which helps improve reliability of executing the flow control policy.

Further, when both the virtual machine and the Host support execution of the flow control policy, the virtual machine has priority in executing the flow control policy; this further helps perform flow control on a packet as early as possible, and further helps reduce bandwidth occupied by ineffective processing and the invalid packet flow.

In another embodiment of a flow control method according to the present invention, another packet flow control method includes: negotiating, between a virtual machine and a Host, an executor of a flow control policy based on a flow control capability of the virtual machine; and if the Host determines that a negotiated executor of the flow control policy is the Host, performing, by the Host after receiving a packet from the virtual machine, forward processing on the received packet based on the flow control policy.

Referring to FIG. 4-*a*, FIG. 4-*a* is a schematic flowchart of another packet flow control method according to another embodiment of the present invention. As shown in FIG. 4-*a*, the another packet flow control method according to the another embodiment of the present invention may include the following content:

401. Negotiate, between a virtual machine and a Host, an executor of a flow control policy based on a flow control capability of the virtual machine.

In some embodiments of the present invention, the Host and the virtual machine may negotiate, between the virtual machine and the Host, the executor of the flow control policy based on the flow control capability of the virtual machine in multiple manners.

For example, that the host and the virtual machine negotiate, between the virtual machine and the Host, the executor of the flow control policy based on the flow control capability of the virtual machine may include: receiving, by the Host, an executor negotiation request that is sent by the virtual machine and carries description information about the flow control capability of the virtual machine; sending a negotiation acknowledgment indication to the virtual machine if the Host determines, according to the description information about the flow control capability, that the virtual machine supports execution of the flow control policy, where the negotiation acknowledgment indication indicates that the negotiated executor of the flow control policy is the virtual machine; sending a negotiation non-acknowledgment indication to the virtual machine if the Host determines, according to the description information about the flow control capability, that the virtual machine does not support the execution of the flow control policy, where the negotiation non-acknowledgment indication indicates that the negotiated executor of the flow control policy is the Host.

For another example, that the host and the virtual machine negotiate, between the virtual machine and the Host, the executor of the flow control policy based on the flow control capability of the virtual machine may include: receiving, by the Host, an executor negotiation request that is sent by the virtual machine and carries description information about the flow control capability of the virtual machine, where the description information about the flow control capability is used to describe a version of a flow control policy of which execution is supported by the virtual machine; sending a negotiation acknowledgment indication to the virtual machine if the Host determines, according to the description information about the flow control capability, that the virtual machine supports execution of a flow control policy of a current latest version or a preset version, where the negotiation acknowledgment indication indicates that the negotiated executor of the flow control policy is the virtual machine; sending a negotiation non-acknowledgment indication to the virtual machine if the Host determines, according to the description information about the flow control capability, that the virtual machine does not support the execution of the flow control policy of the current latest version or the preset version, where the negotiation non-acknowledgment indication indicates that the negotiated executor of the flow control policy is the Host.

It may be understood that specific manners in which the virtual machine and the host negotiate, between the virtual machine and the Host, the executor of the flow control policy based on the flow control capability of the virtual machine are not limited to the foregoing examples.

402. If it is determined that a negotiated executor of the flow control policy is the Host, the Host performs forward processing on a received packet based on the flow control policy after receiving the packet from the virtual machine.

It may be understood that "both parties" mentioned above refers to both objects that participate in the negotiation of the executor of the flow control policy; in this embodiment, both objects are the virtual machine and the Host.

In addition, if the negotiated executor of the flow control policy is the virtual machine, the virtual machine may perform forward processing on a to-be-forward-processed packet based on the flow control policy.

The flow control policy mentioned in this embodiment may be, for example, a flow control policy based on service quality and/or a flow control policy based on an access control list; certainly, the flow control policy may also be a flow control policy that makes reference to other factors.

In the flow control policy based on service quality, a specific manner (where a specific forward processing manner may be sending a packet with a delay, sending a packet without a delay, or discarding a packet, or the like) of performing forward processing on the packet is determined mainly based on a service priority corresponding to the to-be-forward-processed packet. For example, multiple to-be-forward-processed packets currently exist in a cache; a packet corresponding to a higher service priority may be sent with a shorter delay or even without a delay, a packet corresponding to a lower service priority may be sent with a longer delay, and a to-be-forward-processed packet corresponding to a service priority that is lower than a set priority threshold may even be discarded. This helps ensure service quality of a high-priority service as much as possible. That is, the performing forward processing on the to-be-forward-processed packet according to the flow control policy based on service quality may specifically include: performing forward processing on the to-be-forward-processed packet according to a forward processing manner corresponding to a service priority of the to-be-forward-processed packet.

In the flow control policy based on an access control list, a specific manner of performing forward processing on the packet is determined mainly based on whether information carried in the to-be-forward-processed packet matches a record included in an access control list. For example, the access control list is a restricted access control list (which is similar to a blacklist); if the restricted access control list has a record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; on the contrary, if the restricted access control list has no record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. For another example, the access control list is a permitted access control list (which is similar to a whitelist); if the permitted access control list has no record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; and if the permitted access control list has a record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. Other cases may be processed by analogy.

In some embodiments of the present invention, the negotiation acknowledgment indication includes the flow control policy; and the performing, by the virtual machine, forward processing on the to-be-forward-processed packet based on the flow control policy includes: performing, by the virtual machine, forward processing on the to-be-forward-processed packet based on the flow control policy included in the negotiation acknowledgment indication.

Certainly, the Host may also transfer the flow control policy to the virtual machine in other manners, so that the virtual machine performs, after it is determined that the negotiated executor of the flow control policy is the virtual machine, forward processing on the to-be-forward-processed packet based on the flow control policy transferred by the Host. Certainly, the flow control policy may also be pre-configured in the virtual machine; when the virtual machine determines that the negotiated executor of the flow control policy is the virtual machine, the virtual machine performs forward processing on the to-be-forward-processed packet based on the pre-configured flow control policy.

In some embodiments of the present invention, a preload client may be deployed in the virtual machine, a preload server may be deployed in the Host, and the preload client and the preload server may negotiate, between the virtual machine and the Host, the executor of the flow control policy based on the flow control capability of the virtual machine. For example, that the virtual machine and the host negotiate, between the virtual machine and the Host, the executor of the flow control policy based on the flow control capability of the virtual machine may include: after a connection between the preload server deployed in the Host and the preload client deployed in the virtual machine is established, negotiating, by the preload server with the preload client based on the established connection, and between the virtual machine and the Host, the executor of the flow control policy based on the flow control capability of the virtual machine.

In some embodiments of the present invention, further, after it is determined that the negotiated executor of the flow control policy is the virtual machine, the preload client may periodically send a heartbeat message to the preload server through the connection. One of the purposes of sending the heartbeat message is to notify the Host of a state that the virtual machine works properly; if the Host receives no heartbeat message from the virtual machine within a set duration, the Host may determine by default that a fault occurs on the virtual machine. For example, after it is determined that the negotiated executor of the flow control policy is the virtual machine, if the Host receives no heartbeat message from the virtual machine within the set duration, the Host may switch the executor of the flow control policy to the Host (that is, the Host also performs forward processing on a packet, which is from the virtual machine, based on the flow control policy no matter whether the virtual machine performs forward processing on the to-be-forward-processed packet based on the flow control policy; because flow control policies executed in the Host and the virtual machine are the same, for a same packet flow, if the Host or the virtual machine or both execute the flow control policy, eventual packet output conditions are basically the same), and may or may not send, to the virtual machine, an indication message used to indicate that the executor of the flow control policy is switched to the Host.

It can be learned that in the solution according to this embodiment, a Host and a virtual machine negotiate, between the virtual machine and the Host, an executor of a flow control policy based on a flow control capability of the virtual machine; and if the Host determines that a negotiated executor of the flow control policy is the Host, the Host performs forward processing on a received packet based on the flow control policy after receiving the packet from the virtual machine. A mechanism in which the virtual machine and the Host negotiate the executor of the flow control policy is introduced, so that both the virtual machine and the Host have an opportunity to be the executor of the flow control policy; this makes it possible for the virtual machine to execute the flow control policy, which helps perform flow control on a packet as early as possible, and further helps reduce ineffective processing and reduce bandwidth and address space, of the Host, occupied by an invalid packet flow. It can be seen that the solution helps reduce the address space, of the Host, occupied for performing forward processing on an outbound packet flow of the virtual machine. Moreover, the executor of the flow control policy is determined through negotiation, which helps improve reliability of executing the flow control policy.

Further, when both the virtual machine and the Host support execution of the flow control policy, the virtual machine has priority in executing the flow control policy; this further helps perform flow control on a packet as early as possible, and further helps reduce bandwidth occupied by ineffective processing and the invalid packet flow.

This embodiment of the present invention further provides a packet flow control method, where the method may include: negotiating, between a host and a virtual machine, an executor of a flow control policy based on a flow control capability of the virtual machine; if a negotiated executor of the flow control policy is the virtual machine, performing forward processing on a to-be-forward-processed packet of the virtual machine based on the flow control policy; and if the negotiated executor of the flow control policy is the Host, sending the to-be-forward-processed packet of the virtual machine to the Host; and performing, based on the flow control policy, forward processing on the to-be-forward-processed packet received by the Host.

In some embodiments of the present invention, the negotiating, between a host and a virtual machine, an executor of a flow control policy based on a flow control capability of the virtual machine includes:

sending, to the Host, an executor negotiation request that is to be sent to the Host by the virtual machine, where the executor negotiation request carries description information about the flow control capability of the virtual machine; and after the Host receives the executor negotiation request, if it is determined, according to the description information about the flow control capability, that the virtual machine supports execution of the flow control policy, sending, to the virtual machine, a negotiation acknowledgment indication that is to be sent to the virtual machine by the Host, where the negotiation acknowledgment indication indicates that the negotiated executor of the flow control policy is the virtual machine; and/or if it is determined, according to the description information about the flow control capability, that the virtual machine does not support the execution of the flow control policy, sending, to the virtual machine, a negotiation non-acknowledgment indication that is to be sent to the virtual machine by the Host, where the negotiation non-acknowledgment indication indicates that the negotiated executor of the flow control policy is the Host;

or the negotiating, between a host and a virtual machine, an executor of a flow control policy based on a flow control capability of the virtual machine includes:

sending, to the Host, an executor negotiation request that is to be sent to the Host by the virtual machine, where the executor negotiation request carries description information about the flow control capability of the virtual machine, and the description information about the flow control capability is used to describe a version of a flow control policy of which execution is supported by the virtual machine; and after the Host receives the executor negotiation request, if it is determined, according to the description information about the flow control capability, that the virtual machine supports execution of a flow control policy of a current latest version or a preset version, sending, to the virtual machine, a negotiation acknowledgment indication that is to be sent to the virtual machine by the Host, where the negotiation acknowledgment indication indicates that the negotiated executor of the flow control policy is the virtual machine; and/or if it is determined, according to the description information about the flow control capability, that the virtual machine does not support the execution of the flow control policy of the current latest version or the preset version, sending, to the virtual machine, a negotiation non-acknowledgment indication that is to be sent to the virtual machine by the Host, where the negotiation non-acknowledgment indication indicates that the negotiated executor of the flow control policy is the Host.

In some embodiments of the present invention, the negotiation acknowledgment indication includes the flow control policy.

The performing forward processing on the to-be-forward-processed packet of the virtual machine based on the flow control policy includes: performing forward processing on the to-be-forward-processed packet of the virtual machine based on the flow control policy included in the negotiation acknowledgment indication.

In some embodiments of the present invention, after it is determined that the negotiated executor of the flow control policy is the virtual machine, if the Host receives no heartbeat message from the virtual machine within a set duration, the Host sends, to the virtual machine, an indication message that is to be sent by the Host to the virtual machine and used to indicate that the executor of the flow control policy is switched to the Host.

The flow control policy that is mentioned in this embodiment may be, for example, a flow control policy based on service quality and/or a flow control policy based on an access control list; certainly, the flow control policy may also be a flow control policy that makes reference to other factors.

In the flow control policy based on service quality, a specific manner (where a specific forward processing manner may be sending a packet with a delay, sending a packet without a delay, or discarding a packet, or the like) of performing forward processing on the packet is determined mainly based on a service priority corresponding to the to-be-forward-processed packet. For example, multiple to-be-forward-processed packets currently exist in a cache; a packet corresponding to a higher service priority may be sent with a shorter delay or even without a delay, a packet corresponding to a lower service priority may be sent with a longer delay, and a to-be-forward-processed packet corresponding to a service priority that is lower than a set priority threshold may even be discarded. This helps ensure service quality of a high-priority service as much as possible. That is, the performing forward processing on the to-be-forward-processed packet according to the flow control policy based on service quality may specifically include: performing forward processing on the to-be-forward-processed packet according to a forward processing manner corresponding to a service priority of the to-be-forward-processed packet.

In the flow control policy based on an access control list, a specific manner of performing forward processing on the packet is determined mainly based on whether information carried in the to-be-forward-processed packet matches a record included in an access control list. For example, the access control list is a restricted access control list (which is similar to a blacklist); if the restricted access control list has a record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; on the contrary, if the restricted access control list has no record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. For another example, the access control list is a permitted access control list (which is similar to a whitelist); if the permitted access control list has no record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; and if the permitted access control list has a record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. Other cases may be processed by analogy.

In some embodiments of the present invention, the sending, to the Host, the executor negotiation request to be sent by the virtual machine to the Host includes: after the virtual machine receives a negotiation starting request initiated by a user-mode process, sending, to the Host, the executor negotiation request to be sent by the virtual machine to the Host; or after the virtual machine receives a negotiation starting request from the Host, sending, to the Host, the executor negotiation request to be sent by the virtual machine to the Host.

In some embodiments of the present invention, the negotiating, between a host and a virtual machine, an executor of a flow control policy based on a flow control capability of the virtual machine includes: after a connection between a preload client deployed in the virtual machine and a preload server deployed in the Host is established, negotiating, by using the established connection, and between the virtual machine and the Host, the executor of the flow control policy based on the flow control capability of the virtual machine.

The foregoing steps of this embodiment may be executed by a processor or other hardware.

Referring to FIG. 4-*b*, FIG. 4-*b* is a schematic flowchart of another packet flow control method according to another embodiment of the present invention. As shown in FIG. 4-*b*, the another packet flow control method according to the another embodiment of the present invention may include the following content:

s401. A processor negotiates, between a host and a virtual machine, an executor of a flow control policy based on a flow control capability of the virtual machine.

s402. If a negotiated executor of the flow control policy is the virtual machine, the processor performs forward processing on a to-be-forward-processed packet of the virtual machine based on the flow control policy.

s403. If the negotiated executor of the flow control policy is the Host, the processor sends the to-be-forward-processed packet of the virtual machine to the Host, and the processor performs, based on the flow control policy, forward processing on the to-be-forward-processed packet received by the Host.

In some embodiments of the present invention, that a processor negotiates, between a host and a virtual machine, an executor of a flow control policy based on a flow control capability of the virtual machine may include the following:

that a processor negotiates, between a host and a virtual machine, an executor of a flow control policy based on a flow control capability of the virtual machine includes: sending, by the processor to the Host, an executor negotiation request that is to be sent to the Host by the virtual machine, where the executor negotiation request carries description information about the flow control capability of the virtual machine; and after the Host receives the executor negotiation request, if the processor determines, according to the description information about the flow control capability, that the virtual machine supports execution of the flow control policy, sending, by the processor to the virtual machine, a negotiation acknowledgment indication that is to be sent to the virtual machine by the Host, where the negotiation acknowledgment indication indicates that the negotiated executor of the flow control policy is the virtual machine; and/or if the processor determines, according to the description information about the flow control capability, that the virtual machine does not support the execution of the flow control policy, sending, by the processor to the virtual machine, a negotiation non-acknowledgment indication that is to be sent to the virtual machine by the Host, where the negotiation non-acknowledgment indication indicates that the negotiated executor of the flow control policy is the Host;

or that a processor negotiates, between a host and a virtual machine, an executor of a flow control policy based on a flow control capability of the virtual machine includes: sending, by the processor to the Host, an executor negotiation request that is to be sent to the Host by the virtual machine, where the executor negotiation request carries description information about the flow control capability of the virtual machine, and the description information about the flow control capability is used to describe a version of a flow control policy of which execution is supported by the virtual machine; and after the Host receives the executor negotiation request, if the processor determines, according to the description information about the flow control capability, that the virtual machine supports execution of a flow control policy of a current latest version or a preset version, sending, by the processor to the virtual machine, a negotiation acknowledgment indication that is to be sent to the virtual machine by the Host, where the negotiation acknowledgment indication indicates that the negotiated executor of the flow control policy is the virtual machine; and/or if the processor determines, according to the description information about the flow control capability, that the virtual machine does not support the execution of the flow control policy of the current latest version or the preset version, sending, by the processor to the virtual machine, a negotiation non-acknowledgment indication that is to be sent to the virtual machine by the Host, where the negotiation non-acknowledgment indication indicates that the negotiated executor of the flow control policy is the Host.

In some embodiments of the present invention, the negotiation acknowledgment indication includes the flow control policy.

That the processor performs forward processing on the to-be-forward-processed packet of the virtual machine based on the flow control policy includes: performing, by the processor, forward processing on the to-be-forward-processed packet of the virtual machine based on the flow control policy included in the negotiation acknowledgment indication.

Certainly, the Host may also transfer the flow control policy to the virtual machine in other manners, so that the processor performs, after it is determined that the negotiated executor of the flow control policy is the virtual machine, forward processing on the to-be-forward-processed packet of the virtual machine based on the flow control policy transferred by the Host. Certainly, the flow control policy may also be pre-configured in the virtual machine; when it is determined that the negotiated executor of the flow control policy is the virtual machine, the processor performs forward processing on the to-be-forward-processed packet of the virtual machine based on the pre-configured flow control policy.

In some embodiments of the present invention, after it is determined that the negotiated executor of the flow control policy is the virtual machine, if the Host receives no heartbeat message from the virtual machine within a set duration, the processor sends, to the virtual machine, an indication message that is to be sent by the Host to the virtual machine and used to indicate that the executor of the flow control policy is switched to the Host.

In some embodiments of the present invention, the flow control policy is a flow control policy based on service quality and/or a flow control policy based on an access control list.

In some embodiments of the present invention, the sending, by the processor to the Host, an executor negotiation request that is to be sent to the Host by the virtual machine may include:

after the virtual machine receives a negotiation starting request initiated by a user-mode process, sending, by the processor to the Host, the executor negotiation request to be sent by the virtual machine to the Host; or after the virtual machine receives a negotiation starting request from the Host, sending, by the processor to the Host, the executor negotiation request to be sent by the virtual machine to the Host.

The flow control policy that is mentioned in this embodiment and based on which a processor processes a to-be-forward-processed packet may be, for example, a flow control policy based on service quality and/or a flow control policy based on an access control list; certainly, the flow control policy may also be a flow control policy that makes reference to other factors.

In the flow control policy based on service quality, a specific manner (where a specific forward processing manner may be sending a packet with a delay, sending a packet without a delay, or discarding a packet, or the like) of performing forward processing on the packet is determined mainly based on a service priority corresponding to the to-be-forward-processed packet. For example, multiple to-be-forward-processed packets currently exist in a cache; a packet corresponding to a higher service priority may be sent with a shorter delay or even without a delay, a packet corresponding to a lower service priority may be sent with a longer delay, and a to-be-forward-processed packet corresponding to a service priority that is lower than a set priority threshold may even be discarded. This helps ensure service quality of a high-priority service as much as possible. That is, the performing forward processing on the to-be-forward-processed packet according to the flow control policy based on service quality may specifically include: performing forward processing on the to-be-forward-processed packet according to a forward processing manner corresponding to a service priority of the to-be-forward-processed packet.

In the flow control policy based on an access control list, a specific manner of performing forward processing on the packet is determined mainly based on whether information carried in the to-be-forward-processed packet matches a record included in an access control list. For example, the access control list is a restricted access control list (which is similar to a blacklist); if the restricted access control list has a record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; on the contrary, if the restricted access control list has no record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. For another example, the access control list is a permitted access control list (which is similar to a whitelist); if the permitted access control list has no record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; and if the permitted access control list has a record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. Other cases may be processed by analogy.

In some embodiments of the present invention, the negotiating, between a host and a virtual machine, an executor of a flow control policy based on a flow control capability of the virtual machine may include: after a connection between a preload client deployed in the virtual machine and a preload server deployed in the Host is established, negotiating, by the processor by using the established connection, and between the virtual machine and the Host, the executor of the flow control policy based on the flow control capability of the virtual machine.

It can be learned that in the solution according to this embodiment, with assistance of a processor, a virtual machine and a host negotiate, between the virtual machine and the Host, an executor of a flow control policy based on a flow control capability of the virtual machine; and if the virtual machine determines that a negotiated executor of the flow control policy is the virtual machine, the virtual machine performs forward processing on a to-be-forward-processed packet based on the flow control policy; and if the virtual machine determines that the negotiated executor of the flow control policy is the Host, the virtual machine sends the to-be-forward-processed packet to the Host, so that the Host performs forward processing on the received packet based on the flow control policy. A mechanism in which the virtual machine and the Host negotiate the executor of the flow control policy is introduced, so that both the virtual machine and the Host have an opportunity to be the executor of the flow control policy; this makes it possible for the virtual machine to execute the flow control policy, which helps perform flow control on a packet as early as possible, and further helps reduce ineffective processing and reduce bandwidth and address space, of the Host, occupied by an invalid packet flow. It can be seen that the solution helps reduce the address space, of the Host, occupied for performing forward processing on an outbound packet flow of the virtual machine. Moreover, the executor of the flow control policy is determined through negotiation, which helps improve reliability of executing the flow control policy.

Further, when both the virtual machine and the Host support execution of the flow control policy, the virtual machine has priority in executing the flow control policy; this further helps perform flow control on a packet as early as possible, and further helps reduce bandwidth occupied by ineffective processing and the invalid packet flow.

For ease of better understanding and implementation of the solutions according to the embodiments of the present invention, the following exemplary description is provided by using some specific examples.

Referring to FIG. 5-*a* and FIG. 5-*b*, FIG. 5-*a* is a schematic flowchart of another packet flow control method according to another embodiment of the present invention, and FIG. 5-*b* is a schematic structural diagram of a computing node that is according to this embodiment of the present invention and may be used to implement the flow control method shown in FIG. 5-*a*. FIG. 5-*b* shows, as an example, a specific internal logical architecture of a Host and a virtual machine that are deployed in the computing node; certainly, the Host and the virtual machine may also have another internal logical architecture that is different from the example shown in FIG. 5-*b*. This embodiment is described mainly by using an example in which the flow control method is implemented in the architecture shown in FIG. 5-*b*.

As shown in FIG. 5-*a*, the another packet flow control method according to the another embodiment of the present invention may include the following content:

501. A preload client (preload client) deployed in a virtual machine VM-m and a preload server (preload server) deployed in the Host establish a connection. The connection is a connection of the Transmission Control Protocol or a communication connection of another type.

If an intrinsic communication connection exists between the preload client deployed in the virtual machine VM-m and the preload server deployed in the Host or the preload client and the preload server can directly communicate with each other, step 501 may also be omitted.

502. The preload client deployed in the virtual machine VM-m receives a negotiation starting request sent by the preload server deployed in the Host.

503. The preload client deployed in the virtual machine VM-m sends an executor negotiation request that carries description information about a flow control capability of the virtual machine VM-m to the preload server deployed in the Host.

It may be understood that in step 502, the preload server deployed in the Host sends the negotiation starting request to the preload client deployed in the virtual machine VM-m mainly to trigger the preload client deployed in the virtual machine VM-m to initiate negotiation of an executor of a flow control policy; certainly, the preload client deployed in the virtual machine VM-m may also be triggered by another condition (for example, a negotiation starting request (which, that is, may be triggered by a user-mode application or a user instruction) initiated by a user-mode process is received) to initiate the negotiation of the executor of the flow control policy. If the preload client deployed in the virtual machine VM-m independently initiates the negotiation of the executor of the flow control policy, step 502 may be omitted.

504. The preload server deployed in the Host receives the executor negotiation request that carries the description information about the flow control capability of the virtual machine VM-m, where the description information about the flow control capability carried in the executor negotiation request indicates whether the virtual machine VM-m supports execution of a flow control policy, so that the preload server deployed in the Host may determine, according to the description information about the flow control capability, whether the virtual machine VM-m supports execution of the flow control policy.

In this embodiment, that the preload server deployed in the Host determines that the virtual machine VM-m supports the execution of the flow control policy is used as an example in the following. Therefore, the preload server deployed in the Host may send a negotiation acknowledgment indication to the preload client deployed in the virtual machine VM-m, where the negotiation acknowledgment indication indicates that a negotiated executor of the flow control policy is the virtual machine VM-m, where the negotiation acknowledgment indication may carry the flow control policy. The preload server deployed in the Host further instructs a preload kernel (preload kernel) deployed in the Host not to execute the flow control policy.

505. After receiving the negotiation acknowledgment indication sent by the preload server deployed in the Host, the preload client deployed in the virtual machine VM-m determines that the negotiated executor of the flow control policy is the virtual machine VM-m, and therefore the preload client deployed in the virtual machine VM-m sends the flow control policy carried in the negotiation acknowledgment indication to an FE corresponding to a network interface card deployed in the virtual machine VM-m, so as to instruct the FE corresponding to the network interface card deployed in the virtual machine VM-m to execute the flow control policy.

By performing steps 503 to 505, the preload client deployed in the virtual machine VM-m and the preload server deployed in the Host determine, through negotiation, the executor of the flow control policy.

506. After receiving the flow control policy, the FE corresponding to the network interface card deployed in the virtual machine VM-m performs, based on a received flow control policy, forward processing on a to-be-forward-processed packet from a user-mode application deployed in the virtual machine VM-m.

In this embodiment, a flow control policy based on service quality or a flow control policy based on an access control list is used as an example of the flow control policy.

In the flow control policy based on service quality, a specific manner (where a specific forward processing manner may be sending a packet with a delay, sending a packet without a delay, or discarding a packet, or the like) of performing forward processing on the packet is determined mainly based on a service priority corresponding to the to-be-forward-processed packet. For example, multiple to-be-forward-processed packets currently exist in a cache; a packet corresponding to a higher service priority may be sent with a shorter delay or even without a delay, a packet corresponding to a lower service priority may be sent with a longer delay, and a to-be-forward-processed packet corresponding to a service priority that is lower than a set priority threshold may even be discarded. This helps ensure service quality of a high-priority service as much as possible.

In the flow control policy based on an access control list, a specific manner of performing forward processing on the packet is determined mainly based on whether information carried in the to-be-forward-processed packet matches a record included in an access control list. For example, the access control list is a restricted access control list (which is similar to a blacklist); if the restricted access control list has a record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; on the contrary, if the restricted access control list has no record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. For another example, the access control list is a permitted access control list (which is similar to a whitelist); if the permitted access control list has no record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; and if the permitted access control list has a record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. Other cases may be processed by analogy.

Therefore, that the FE corresponding to the network interface card deployed in the virtual machine VM-m performs, based on a received flow control policy, forward processing on a to-be-forward-processed packet from a user-mode application deployed in the virtual machine VM-m may include that: the FE corresponding to the network interface card deployed in the virtual machine VM-m discards the to-be-forward-processed packet from the user-mode application deployed in the virtual machine VM-m; or the FE corresponding to the network interface card deployed in the virtual machine VM-m sends the to-be-forward-processed packet from the user-mode application deployed in the virtual machine VM-m with a delay (an extent of the delay may be related to a service priority of the to-be-forward-processed packet and the current number of to-be-forward-processed packets); or the FE corresponding to the network interface card deployed in the virtual machine VM-m sends the to-be-forward-processed packet from the user-mode application deployed in the virtual machine VM-m without a delay. Other manners are not listed herein again.

If a BE corresponding to a network interface card deployed in the Host receives a packet of the FE corresponding to the network interface card deployed in the virtual machine VM-m, the BE corresponding to the network interface card deployed in the Host performs forward processing on the received packet to the preload kernel deployed in the Host.

Because the preload kernel deployed in the Host does not need to execute the flow control policy, the preload kernel deployed in the Host may directly forward the received packet to the network interface card by using a network interface card driver, and the network interface card may correspondingly perform forward processing on the received packet.

In some embodiments of the present invention, after it is determined that the negotiated executor of the flow control policy is the virtual machine VM-m, the preload client may periodically send a heartbeat message to the preload server through the connection. One of the purposes of sending the heartbeat message is to notify the preload server of a state that the virtual machine VM-m works properly; if the preload server receives no heartbeat message from the preload client within a set duration, the preload server may determine by default that a fault occurs on the VM-m. For example, after it is determined that the negotiated executor of the flow control policy is the virtual machine VM-m, if the preload server receives no heartbeat message from the preload client within the set duration, the preload server may switch the executor of the flow control policy to the Host (that is, the preload kernel also performs forward processing on a packet from the virtual machine VM-m based on the flow control policy no matter whether the FE corresponding to the network interface card deployed in the virtual machine VM-m performs forward processing on the to-be-forward-processed packet based on the flow control policy; because flow control policies executed in the Host and the virtual machine VM-m are the same, for a same packet flow, if the preload kernel or the FE corresponding to the network interface card deployed in the virtual machine VM-m or both execute the same flow control policy, eventual packet output conditions of the preload kernel are basically the same), and may send an indication message to the preload client to indicate that the executor of the flow control policy is switched to the Host.

In some embodiments of the present invention, after it is determined that the negotiated executor of the flow control policy is the virtual machine VM-m, the preload client may also, when a fault occurs when the FE corresponding to the network interface card deployed in the virtual machine VM-m executes the flow control policy, send an indication message to the preload server to indicate that the fault occurs when the virtual machine VM-m executes the flow control policy. After it is determined that the negotiated executor of the flow control policy is the virtual machine, if the preload server receives, from the preload client, the indication message that indicates that the fault occurs when the virtual machine VM-m executes the flow control policy, the preload server may switch the executor of the flow control policy to the Host, and the preload server may instruct the preload kernel to execute the flow control policy.

In some embodiments of the present invention, after it is determined that the negotiated executor of the flow control policy is the virtual machine VM-m, the preload server may also periodically or non-periodically send a state query message to the preload client to query whether the virtual machine VM-m properly executes the flow control policy; and if no state indication message in response to the state query message is received from the preload client within a set duration, or an indication message is received, where the indication message is from the preload client and indicates that a fault occurs when the virtual machine VM-m executes the flow control policy, it may be determined that a fault occurs when the virtual machine VM-m executes the flow control policy. Certainly, the preload server may also monitor, in other manners, whether a fault occurs when the virtual machine VM-m executes the flow control policy. If it is determined that a fault occurs when the virtual machine VM-m executes the flow control policy, the preload server may switch the executor of the flow control policy to the Host, and the preload server may instruct the preload kernel to execute the flow control policy.

After being instructed to execute the flow control policy, the preload kernel performs forward processing on the to-be-forward-processed packet from the virtual machine VM-m based on the flow control policy.

Referring to FIG. 5-*c*, FIG. 5-*c* is a schematic diagram of an effect of flow control according to this embodiment of the present invention. As shown in FIG. 5-*c*, after the FE corresponding to the network interface card executes the flow control policy for a high-bandwidth packet flow from the user-mode application in the virtual machine VM-m, bandwidth of the packet flow is reduced. It can be seen that performing flow control at an early stage helps reduce resource consumption.

It can be learned that, in the solution according to this embodiment, a mechanism in which a virtual machine and a Host negotiate an executor of a flow control policy is introduced, so that both the virtual machine and the Host have an opportunity to be the executor of the flow control policy; this makes it possible for the virtual machine to execute the flow control policy, which helps perform flow control on a packet as early as possible, and further helps reduce ineffective processing and reduce bandwidth and address space, of the Host, occupied by an invalid packet flow. It can be seen that the solution helps reduce the address space, of the Host, occupied for performing forward processing on an outbound packet flow of the virtual machine. Moreover, the executor of the flow control policy is determined through negotiation, which helps improve reliability of executing the flow control policy.

Further, when both the virtual machine and the Host support execution of the flow control policy, the virtual machine has priority in executing the flow control policy; this further helps perform flow control on a packet as early as possible, and further helps reduce bandwidth occupied by ineffective processing and the invalid packet flow.

Further, the virtual machine and the Host are designed by using a modular architecture, which helps improve adaptability of a product to a complex application environment and reduce upgrade costs of environment migration.

Referring to FIG. 6-*a*, FIG. 6-*a* is a schematic flowchart of another packet flow control method according to another embodiment of the present invention. FIG. 5-*b* is a schematic structural diagram of a computing node that is provided by this embodiment of the present invention and may be used to implement the flow control method shown in FIG. 6-*a*. FIG. 5-*b* shows, as an example, a specific internal logical architecture of a Host and a virtual machine that are deployed in the computing node; certainly, the Host and the virtual machine may also have another internal logical architecture that is different from the example shown in FIG. 5-*b*. This embodiment is described mainly by using an example in which the flow control method is implemented in the architecture shown in FIG. 5-*b*.

As shown in FIG. 6-*a*, the another packet flow control method according to the another embodiment of the present invention may include the following content:

601. A preload client deployed in a virtual machine VM-m and a preload server deployed in a Host establish a connection. The connection is a connection of the Transmission Control Protocol or a communication connection of another type.

If an intrinsic communication connection exists between the preload client deployed in the virtual machine VM-m and the preload server deployed in the Host or the preload client and the preload server can directly communicate with each other, step 601 may also be omitted.

602. The preload client deployed in the virtual machine VM-m receives a negotiation starting request sent by the preload server deployed in the Host.

603. The preload client deployed in the virtual machine VM-m sends an executor negotiation request that carries description information about a flow control capability of the virtual machine VM-m to the preload server deployed in the Host.

It may be understood that in step 601, the preload server deployed in the Host sends the negotiation starting request to the preload client deployed in the virtual machine VM-m mainly to trigger the preload client deployed in the virtual machine VM-m to initiate negotiation of an executor of a flow control policy; certainly, the preload client deployed in the virtual machine VM-m may also be triggered by another condition (for example, a negotiation starting request (which, that is, may be triggered by a user-mode application or a user instruction) initiated by a user-mode process is received) to initiate the negotiation of the executor of the flow control policy. If the preload client deployed in the virtual machine VM-m independently initiates the negotiation of the executor of the flow control policy, step 602 may be omitted.

604. The preload server deployed in the Host receives the executor negotiation request that carries the description information about the flow control capability of the virtual machine VM-m, where the description information about the flow control capability carried in the executor negotiation request indicates whether the virtual machine VM-m supports execution of a flow control policy, so that the preload server deployed in the Host may determine, according to the description information about the flow control capability, whether the virtual machine VM-m supports execution of the flow control policy.

In this embodiment, that the preload server deployed in the Host determines that the virtual machine VM-m does not support the execution of the flow control policy is used as an example in the following. Therefore, the preload server deployed in the Host may send a negotiation non-acknowledgment indication to the preload client deployed in the virtual machine VM-m, where the negotiation non-acknowledgment indication indicates that a negotiated executor of the flow control policy is the Host. The preload server deployed in the Host further instructs a preload kernel (preload kernel) deployed in the Host to execute the flow control policy.

605. After receiving the negotiation non-acknowledgment indication sent by the preload server deployed in the Host, the preload client deployed in the virtual machine VM-m determines that the negotiated executor of the flow control policy is the Host, and therefore the preload client deployed in the virtual machine VM-m instructs an FE corresponding to a network interface card deployed in the virtual machine VM-m not to execute the flow control policy.

By performing steps 603 to 605, the preload client deployed in the virtual machine VM-m and the preload server deployed in the Host determine, through negotiation, the executor of the flow control policy.

The FE corresponding to the network interface card deployed in the virtual machine VM-m performs forward processing on a to-be-forward-processed packet from a user-mode application deployed in the virtual machine VM-m. Herein, the FE corresponding to the network interface card deployed in the virtual machine VM-m does not perform flow control on the to-be-forward-processed packet.

606. If a BE corresponding to a network interface card deployed in the Host receives a packet of the FE corresponding to the network interface card deployed in the virtual machine VM-m, the BE corresponding to the network interface card deployed in the Host forwards the received packet to the preload kernel deployed in the Host.

The preload kernel performs forward processing on a received packet based on the flow control policy.

In this embodiment, a flow control policy based on service quality or a flow control policy based on an access control list is used as an example of the flow control policy.

In the flow control policy based on service quality, a specific manner (where a specific forward processing manner may be sending a packet with a delay, sending a packet without a delay, or discarding a packet, or the like) of performing forward processing on the packet is determined mainly based on a service priority corresponding to the to-be-forward-processed packet. For example, multiple to-be-forward-processed packets currently exist in a cache; a packet corresponding to a higher service priority may be sent with a shorter delay or even without a delay, a packet corresponding to a lower service priority may be sent with a longer delay, and a to-be-forward-processed packet corresponding to a service priority that is lower than a set priority threshold may even be discarded. This helps ensure service quality of a high-priority service as much as possible.

In the flow control policy based on an access control list, a specific manner of performing forward processing on the packet is deter pined mainly based on whether information carried in the to-be-forward-processed packet matches a record included in an access control list. For example, the access control list is a restricted access control list (which is similar to a blacklist); if the restricted access control list has a record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; on the contrary, if the restricted access control list has no record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. For another example, the access control list is a permitted access control list (which is similar to a whitelist); if the permitted access control list has no record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; and if the permitted access control list has a record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. Other cases may be processed by analogy.

Therefore, that the preload kernel performs forward processing on the to-be-forward-processed packet from the virtual machine VM-m based on the flow control policy may include that: the preload kernel discards the to-be-forward-processed packet from the virtual machine VM-m; or the preload kernel sends the to-be-forward-processed packet from the virtual machine VM-m with a delay (an extent of the delay may be related to a service priority of the to-be-forward-processed packet and the current number of to-be-forward-processed packet); or the preload kernel sends the to-be-forward-processed packet from the virtual machine VM-m without delay. Other manners are not listed herein again.

If the network interface card receives, by using a network interface card driver, a packet sent by the preload kernel, the network interface card correspondingly performs forward processing on the received packet.

Referring to FIG. 6-*b*, FIG. 6-*b* is a schematic diagram of an effect of another flow control according to this embodiment of the present invention. As shown in FIG. 6-*b*, after the FE corresponding to the network interface card does not execute the flow control policy for a high-bandwidth packet flow from the user-mode application in the virtual machine VM-m, bandwidth of the packet flow is reduced after the preload kernel in the Host executes the flow control policy.

It can be learned that, in the solution according to this embodiment, a mechanism in which a virtual machine and a Host negotiate an executor of a flow control policy is introduced, so that both the virtual machine and the Host have an opportunity to be the executor of the flow control policy; this makes it possible for the virtual machine to execute the flow control policy, which helps perform flow control on a packet as early as possible, and further helps reduce ineffective processing and reduce bandwidth and address space, of the Host, occupied by an invalid packet flow. It can be seen that the solution helps reduce the address space, of the Host, occupied for performing forward processing on an outbound packet flow of the virtual machine. Moreover, the executor of the flow control policy is determined through negotiation, which helps improve reliability of executing the flow control policy.

Further, when both the virtual machine and the Host support execution of the flow control policy, the virtual machine has priority in executing the flow control policy; this further helps perform flow control on a packet as early as possible, and further helps reduce bandwidth occupied by ineffective processing and the invalid packet flow.

Further, the virtual machine and the Host are designed by using a modular architecture, which helps improve adaptability of a product to a complex application environment and reduce upgrade costs of environment migration.

Figure 7:
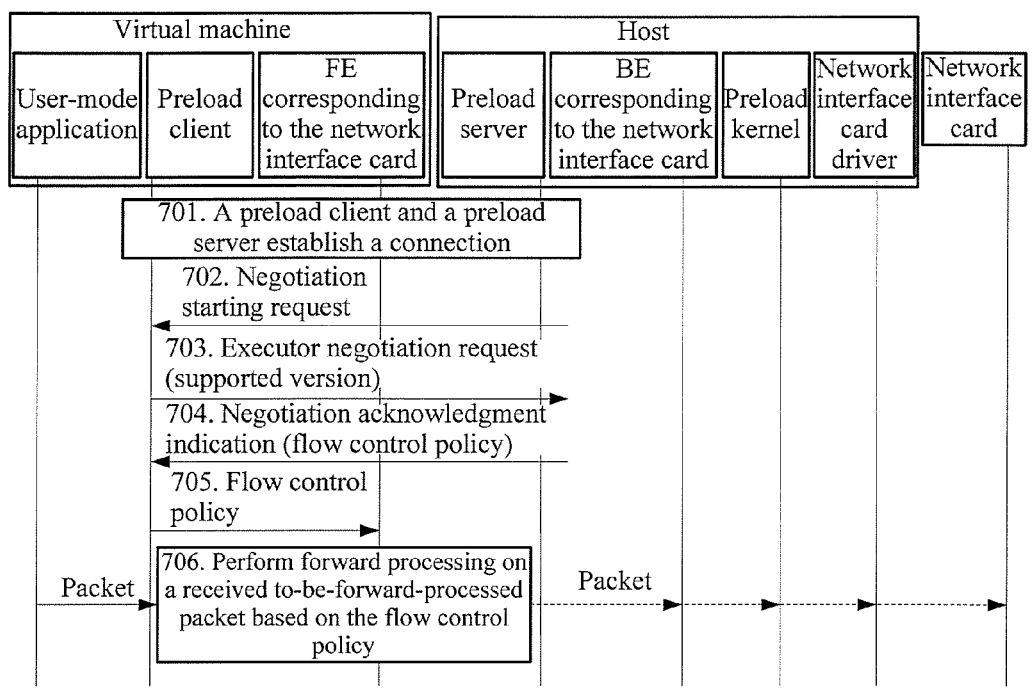
FIG. 7 is a schematic flowchart of another packet flow control method according to an embodiment of the present invention.

Referring to FIG. 7, FIG. 7 is a schematic flowchart of another packet flow control method according to another embodiment of the present invention. FIG. 5-*b* is a schematic structural diagram of a computing node that is provided by this embodiment of the present invention and may be used to implement the flow control method shown in FIG. 7. FIG. 5-*b* shows, as an example, a specific internal logical architecture of a Host and a virtual machine that are deployed in the computing node; certainly, the Host and the virtual machine may also have another internal logical architecture that is different from the example shown in FIG. 5-*b*. This embodiment is described mainly by using an example in which the flow control method is implemented in the architecture shown in FIG. 5-*b*.

As shown in FIG. 7, the another packet flow control method according to the another embodiment of the present invention may include the following content:

701. A preload client deployed in a virtual machine VM-m and a preload server deployed in a Host establish a connection. The connection is a connection of the Transmission Control Protocol or a communication connection of another type.

If an intrinsic communication connection exists between the preload client deployed in the virtual machine VM-m and the preload server deployed in the Host or the preload client and the preload server can directly communicate with each other, step 701 may also be omitted.

702. The preload client deployed in the virtual machine VM-m receives a negotiation starting request sent by the preload server deployed in the Host.

703. The preload client deployed in the virtual machine VM-m sends an executor negotiation request that carries description information about a flow control capability of the virtual machine VM-m to the preload server deployed in the Host.

It may be understood that in step 702, the preload server deployed in the Host sends the negotiation starting request to the preload client deployed in the virtual machine VM-m mainly to trigger the preload client deployed in the virtual machine VM-m to initiate negotiation of an executor of a flow control policy; certainly, the preload client deployed in the virtual machine VM-m may also be triggered by another condition (for example, a negotiation starting request (which, that is, may be triggered by a user-mode application or a user instruction) initiated by a user-mode process is received) to initiate the negotiation of the executor of the flow control policy. If the preload client deployed in the virtual machine VM-m independently initiates the negotiation of the executor of the flow control policy, step 702 may be omitted.

704. The preload server deployed in the Host receives the executor negotiation request that carries the description information about the flow control capability of the virtual machine VM-m, where the description information about the flow control capability carried in the executor negotiation request indicates a version of a flow control policy of which execution is supported by the virtual machine VM-m, so that the preload server deployed in the Host may determine, according to the description information about the flow control capability, whether the virtual machine VM-m supports execution of the flow control policy of a current latest version or a preset version.

In some embodiments of the present invention, the description information about the flow control capability is used to describe a version of a flow control policy of which execution is supported by the virtual machine; therefore, that the preload server determines, according to the description information about the flow control capability, whether the virtual machine supports execution of the flow control policy of the current latest version or the preset version may specifically include: determining, through comparison, whether the version, which is described by the description information about the flow control capability, of the flow control policy of which execution is supported by the virtual machine, is the same as the current latest version or the preset version of the flow control policy; if they are the same, determining that the virtual machine supports execution of the flow control policy of the current latest version or the preset version; and if they are different, determining that the virtual machine does not support the execution of the flow control policy of the current latest version or the preset version. For another example, that the preload server determines, according to the description information about the flow control capability, whether the virtual machine supports execution of the flow control policy of the current latest version or the preset version may specifically include: determining, through comparison, whether each version of k (where k is a positive integer) versions, which are described by the description information about the flow control capability, of flow control policies of which execution is supported by the virtual machine, is the same as the current latest version or the preset version of the flow control policy; if it is obtained, by comparison, that one version of the k versions is the current latest version or the preset version of the flow control policy, determining that the virtual machine supports execution of the flow control policy of the current latest version or the preset version; and if it is obtained, by comparison, that any one version of the k versions is different from the current latest version or the preset version of the flow control policy, determining that the virtual machine does not support the execution of the flow control policy of the current latest version or the preset version.

In this embodiment, that the preload server deployed in the Host determines that the virtual machine VM-m supports the execution of the flow control policy of the current latest version or the preset version is used as an example in the following. Therefore, the preload server deployed in the Host may send a negotiation acknowledgment indication to the preload client deployed in the virtual machine VM-m, where the negotiation acknowledgment indication indicates that a negotiated executor of the flow control policy is the virtual machine VM-m, where the negotiation acknowledgment indication may carry the flow control policy of the current latest version or the preset version. The preload server deployed in the Host further instructs a preload kernel deployed in the Host not to execute the flow control policy.

705. After receiving the negotiation acknowledgment indication sent by the preload server deployed in the Host, the preload client deployed in the virtual machine VM-m determines that the negotiated executor of the flow control policy is the virtual machine VM-m, and therefore the preload client deployed in the virtual machine VM-m sends the flow control policy carried in the negotiation acknowledgment indication to an FE corresponding to a network interface card deployed in the virtual machine VM-m.

By performing steps 703 to 705, the preload client deployed in the virtual machine VM-m and the preload server deployed in the Host determine, through negotiation, the executor of the flow control policy.

706. After receiving the flow control policy, the FE corresponding to the network interface card deployed in the virtual machine VM-m performs, based on a received flow control policy, forward processing on a to-be-forward-processed packet sent by a user-mode application deployed in the virtual machine VM-m.

In this embodiment, a flow control policy based on service quality or a flow control policy based on an access control list is used as an example of the flow control policy.

In the flow control policy based on service quality, a specific manner (where a specific forward processing manner may be sending a packet with a delay, sending a packet without a delay, or discarding a packet, or the like) of performing forward processing on the packet is determined mainly based on a service priority corresponding to the to-be-forward-processed packet. For example, multiple to-be-forward-processed packets currently exist in a cache; a packet corresponding to a higher service priority may be sent with a shorter delay or even without a delay, a packet corresponding to a lower service priority may be sent with a longer delay, and a to-be-forward-processed packet corresponding to a service priority that is lower than a set priority threshold may even be discarded. This helps ensure service quality of a high-priority service as much as possible.

In the flow control policy based on an access control list, a specific manner of performing forward processing on the packet is determined mainly based on whether information carried in the to-be-forward-processed packet matches a record included in an access control list. For example, the access control list is a restricted access control list (which is similar to a blacklist); if the restricted access control list has a record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; on the contrary, if the restricted access control list has no record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. For another example, the access control list is a permitted access control list (which is similar to a whitelist); if the permitted access control list has no record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; and if the permitted access control list has a record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. Other cases may be processed by analogy.

Therefore, that the FE corresponding to the network interface card deployed in the virtual machine VM-m performs, based on a received flow control policy, forward processing on a to-be-forward-processed packet from a user-mode application deployed in the virtual machine VM-m may include that: the FE corresponding to the network interface card deployed in the virtual machine VM-m discards the to-be-forward-processed packet from the user-mode application deployed in the virtual machine VM-m; or the FE corresponding to the network interface card deployed in the virtual machine VM-m sends the to-be-forward-processed packet from the user-mode application deployed in the virtual machine VM-m with a delay (an extent of the delay may be related to a service priority of the to-be-forward-processed packet and the current number of to-be-forward-processed packets); or the FE corresponding to the network interface card deployed in the virtual machine VM-m sends the to-be-forward-processed packet from the user-mode application deployed in the virtual machine VM-m without a delay. Other manners are not listed herein again.

If a BE corresponding to a network interface card deployed in the Host receives a packet of the FE corresponding to the network interface card deployed in the virtual machine VM-m, the BE corresponding to the network interface card deployed in the Host performs forward processing on the received packet to the preload kernel deployed in the Host.

Because the preload kernel deployed in the Host does not need to execute the flow control policy, the preload kernel deployed in the Host may directly forward the received packet to the network interface card by using a network interface card driver, and the network interface card may correspondingly perform forward processing on the received packet.

In some embodiments of the present invention, after it is determined that the negotiated executor of the flow control policy is the virtual machine VM-m, the preload client may periodically send a heartbeat message to the preload server through the connection. One of the purposes of sending the heartbeat message is to notify the preload server of a state that the virtual machine VM-m works properly; if the preload server receives no heartbeat message from the preload client within a set duration, the preload server may determine by default that a fault occurs on the VM-m. For example, after it is determined that the negotiated executor of the flow control policy is the virtual machine VM-m, if the preload server receives no heartbeat message from the preload client within the set duration, the preload server may switch the executor of the flow control policy to the Host (that is, the preload kernel also performs forward processing on a packet from the virtual machine VM-m based on the flow control policy no matter whether the FE corresponding to the network interface card deployed in the virtual machine VM-m performs forward processing on the to-be-forward-processed packet based on the flow control policy; because flow control policies executed in the Host and the virtual machine VM-m are the same, for a same packet flow, if the preload kernel or the FE corresponding to the network interface card deployed in the virtual machine VM-m or both execute the same flow control policy, eventual packet output conditions of the preload kernel are basically the same), and may send an indication message to the preload client to indicate that the executor of the flow control policy is switched to the Host.

In some embodiments of the present invention, after it is determined that the negotiated executor of the flow control policy is the virtual machine VM-m, the preload client may also, when a fault occurs when the FE corresponding to the network interface card deployed in the virtual machine VM-m executes the flow control policy, send an indication message to the preload server to indicate that the fault occurs when the virtual machine VM-m executes the flow control policy. After it is determined that the negotiated executor of the flow control policy is the virtual machine, if the preload server receives, from the preload client, the indication message that indicates that the fault occurs when the virtual machine VM-m executes the flow control policy, the preload server may switch the executor of the flow control policy to the Host, and the preload server may instruct the preload kernel to execute the flow control policy.

In some embodiments of the present invention, after it is determined that the negotiated executor of the flow control policy is the virtual machine VM-m, the preload server may also periodically or non-periodically send a state query message to the preload client to query whether the virtual machine VM-m properly executes the flow control policy; and if no state indication message in response to the state query message is received from the preload client within a set duration, or an indication message is received, where the indication message is from the preload client and indicates that a fault occurs when the virtual machine VM-m executes the flow control policy, it may be determined that a fault occurs when the virtual machine VM-m executes the flow control policy. Certainly, the preload server may also monitor, in other manners, whether a fault occurs when the virtual machine VM-m executes the flow control policy. If it is determined that a fault occurs when the virtual machine VM-m executes the flow control policy, the preload server may switch the executor of the flow control policy to the Host, and the preload server may instruct the preload kernel to execute the flow control policy.

After being instructed to execute the flow control policy, the preload kernel performs forward processing on the to-be-forward-processed packet from the virtual machine VM-m based on the flow control policy.

It can be learned that, in the solution according to this embodiment, a mechanism in which a virtual machine and a Host negotiate an executor of a flow control policy is introduced, so that both the virtual machine and the Host have an opportunity to be the executor of the flow control policy; this makes it possible for the virtual machine to execute the flow control policy, which helps perform flow control on a packet as early as possible, and further helps reduce ineffective processing and reduce bandwidth and address space, of the Host, occupied by an invalid packet flow. It can be seen that the solution helps reduce the address space, of the Host, occupied for performing forward processing on an outbound packet flow of the virtual machine. Moreover, the executor of the flow control policy is determined through negotiation, which helps improve reliability of executing the flow control policy.

Further, when both the virtual machine and the Host support execution of the flow control policy, the virtual machine has priority in executing the flow control policy; this further helps perform flow control on a packet as early as possible, and further helps reduce bandwidth occupied by ineffective processing and the invalid packet flow.

Further, the virtual machine and the Host are designed by using a modular architecture, which helps improve adaptability of a product to a complex application environment and reduce upgrade costs of environment migration.

Figure 8:
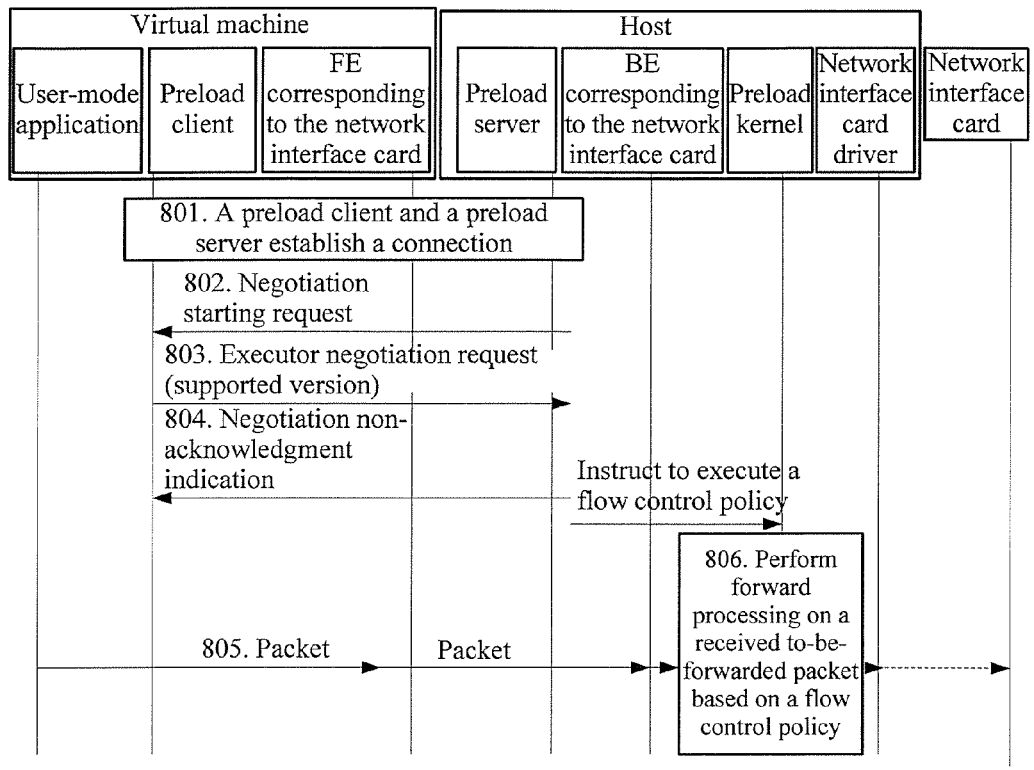
FIG. 8 is a schematic flowchart of another packet flow control method according to an embodiment of the present invention.

Referring to FIG. 8, FIG. 8 is a schematic flowchart of another packet flow control method according to another embodiment of the present invention. FIG. 5-*b* is a schematic structural diagram of a computing node that is provided by this embodiment of the present invention and may be used to implement the flow control method shown in FIG. 8. FIG. 5-*b* shows, as an example, a specific internal logical architecture of a Host and a virtual machine that are deployed in the computing node; certainly, the Host and the virtual machine may also have another internal logical architecture that is different from the example shown in FIG. 5-*b*. This embodiment is described mainly by using an example in which the flow control method is implemented in the architecture shown in FIG. 5-*b*.

As shown in FIG. 8, the another packet flow control method according to the another embodiment of the present invention may include the following content:

801. A preload client deployed in a virtual machine VM-m and a preload server deployed in a Host establish a connection. The connection is a connection of the Transmission Control Protocol or a communication connection of another type.

If an intrinsic communication connection exists between the preload client deployed in the virtual machine VM-m and the preload server deployed in the Host or the preload client and the preload server can directly communicate with each other, step 801 may also be omitted.

802. The preload client deployed in the virtual machine VM-m receives a negotiation starting request sent by the preload server deployed in the Host.

803. The preload client deployed in the virtual machine VM-m sends an executor negotiation request that carries description information about a flow control capability of the virtual machine VM-m to the preload server deployed in the Host.

It may be understood that in step 802, the preload server deployed in the Host sends the negotiation starting request to the preload client deployed in the virtual machine VM-m mainly to trigger the preload client deployed in the virtual machine VM-m to initiate negotiation of an executor of a flow control policy; certainly, the preload client deployed in the virtual machine VM-m may also be triggered by another condition (for example, a negotiation starting request (that is, may be triggered by a user-mode application or a user instruction) initiated by a user-mode process is received) to initiate the negotiation of the executor of the flow control policy. If the preload client deployed in the virtual machine VM-m independently initiates the negotiation of the executor of the flow control policy, step 802 may be omitted.

804. The preload server deployed in the Host receives the executor negotiation request that carries the description information about the flow control capability of the virtual machine VM-m, where the description information about the flow control capability carried in the executor negotiation request indicates a version of a flow control policy of which execution is supported by the virtual machine VM-m; therefore, the preload server deployed in the Host may determine, according to the description information about the flow control capability, whether the virtual machine VM-m supports execution of a flow control policy of a current latest version or a preset version.

In some embodiments of the present invention, the description information about the flow control capability is used to describe a version of a flow control policy of which execution is supported by the virtual machine; therefore, that the preload server determines, according to the description information about the flow control capability, whether the virtual machine supports execution of the flow control policy of the current latest version or the preset version may specifically include: determining, through comparison, whether the version, which is described by the description information about the flow control capability, of the flow control policy of which execution is supported by the virtual machine, is the same as the current latest version or the preset version of the flow control policy; if they are the same, determining that the virtual machine supports execution of the flow control policy of the current latest version or the preset version; and if they are different, determining that the virtual machine does not support the execution of the flow control policy of the current latest version or the preset version. For another example, that the preload server determines, according to the description information about the flow control capability, whether the virtual machine supports execution of the flow control policy of the current latest version or the preset version may specifically include: determining, through comparison, whether each version of k (where k is a positive integer) versions, which are described by the description information about the flow control capability, of flow control policies of which execution is supported by the virtual machine, is the same as the current latest version or the preset version of the flow control policy; if it is obtained, by comparison, that one version of the k versions is the current latest version or the preset version of the flow control policy, determining that the virtual machine supports execution of the flow control policy of the current latest version or the preset version; and if it is obtained, by comparison, that any one version of the k versions is different from the current latest version or the preset version of the flow control policy, determining that the virtual machine does not support the execution of the flow control policy of the current latest version or the preset version.

In this embodiment, that the preload server deployed in the Host determines that the virtual machine VM-m does not support the execution of the flow control policy of the current latest version or the preset version is used as an example in the following. Therefore, the preload server deployed in the Host may send a negotiation non-acknowledgment indication to the preload client deployed in the virtual machine VM-m, where the negotiation non-acknowledgment indication indicates that a negotiated executor of the flow control policy is the Host. The preload server deployed in the Host further instructs a preload kernel (preload kernel) deployed in the Host to execute the flow control policy.

805. After receiving the negotiation non-acknowledgment indication sent by the preload server deployed in the Host, the preload client deployed in the virtual machine VM-m determines that the negotiated executor of the flow control policy is the Host, and therefore the preload client deployed in the virtual machine VM-m instructs an FE corresponding to a network interface card deployed in the virtual machine VM-m not to execute the flow control policy.

By performing steps 803 to 805, the preload client deployed in the virtual machine VM-m and the preload server deployed in the Host determine, through negotiation, the executor of the flow control policy.

The FE corresponding to the network interface card deployed in the virtual machine VM-m performs forward processing on a to-be-forward-processed packet from a user-mode application deployed in the virtual machine VM-m. Herein, the FE corresponding to the network interface card deployed in the virtual machine VM-m does not perform flow control on the to-be-forward-processed packet.

806. If a BE corresponding to a network interface card deployed in the Host receives a packet of the FE corresponding to the network interface card deployed in the virtual machine VM-m, the BE corresponding to the network interface card deployed in the Host performs forward processing on the received packet to the preload kernel deployed in the Host.

The preload kernel performs forward processing on a received packet based on the flow control policy.

In this embodiment, a flow control policy based on service quality or a flow control policy based on an access control list is used as an example of the flow control policy.

In the flow control policy based on service quality, a specific manner (where a specific forward processing manner may be sending a packet with a delay, sending a packet without a delay, or discarding a packet, or the like) of performing forward processing on the packet is determined mainly based on a service priority corresponding to the to-be-forward-processed packet. For example, multiple to-be-forward-processed packets currently exist in a cache; a packet corresponding to a higher service priority may be sent with a shorter delay or even without a delay, a packet corresponding to a lower service priority may be sent with a longer delay, and a to-be-forward-processed packet corresponding to a service priority that is lower than a set priority threshold may even be discarded. This helps ensure service quality of a high-priority service as much as possible.

In the flow control policy based on an access control list, a specific manner of performing forward processing on the packet is determined mainly based on whether information carried in the to-be-forward-processed packet matches a record included in an access control list. For example, the access control list is a restricted access control list (which is similar to a blacklist); if the restricted access control list has a record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; on the contrary, if the restricted access control list has no record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. For another example, the access control list is a permitted access control list (which is similar to a whitelist); if the permitted access control list has no record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; and if the permitted access control list has a record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. Other cases may be processed by analogy.

Therefore, that the preload kernel performs forward processing on the to-be-forward-processed packet from the virtual machine VM-m based on the flow control policy of the current latest version or the preset version may include that: the preload kernel discards the to-be-forward-processed packet from the virtual machine VM-m; or the preload kernel sends the to-be-forward-processed packet from the virtual machine VM-m with a delay (an extent of the delay may be related to a service priority of the to-be-forward-processed packet and the current number of to-beforward-processed packet); or the preload kernel sends the to-be-forward-processed packet from the virtual machine VM-m without delay. Other manners are not listed herein again.

If the network interface card receives, by using a network interface card driver, a packet sent by the preload kernel, the network interface card correspondingly performs forward processing on the received packet.

It can be learned that, in the solution according to this embodiment, a mechanism in which a virtual machine and a Host negotiate an executor of a flow control policy is introduced, so that both the virtual machine and the Host have an opportunity to be the executor of the flow control policy; this makes it possible for the virtual machine to execute the flow control policy, which helps perform flow control on a packet as early as possible, and further helps reduce ineffective processing and reduce bandwidth and address space, of the Host, occupied by an invalid packet flow. It can be seen that the solution helps reduce the address space, of the Host, occupied for performing forward processing on an outbound packet flow of the virtual machine. Moreover, the executor of the flow control policy is determined through negotiation, which helps improve reliability of executing the flow control policy.

Further, when both the virtual machine and the Host support execution of the flow control policy, the virtual machine has priority in executing the flow control policy; this further helps perform flow control on a packet as early as possible, and further helps reduce bandwidth occupied by ineffective processing and the invalid packet flow.

Further, the virtual machine and the Host are designed by using a modular architecture, which helps improve adaptability of a product to a complex application environment and reduce upgrade costs of environment migration.

Figure 9:
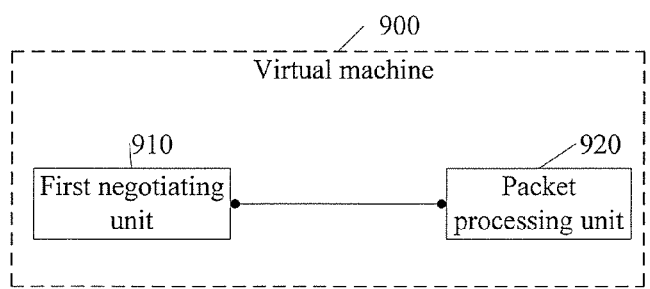
FIG. 9 is a schematic structural diagram of a virtual machine according to an embodiment of the present invention.

For better implementation of the solutions according to the embodiments of the present invention, a relevant apparatus for implementing the solutions is further provided as follows:

Referring to FIG. 9, a virtual machine 900 according to an embodiment of the present invention may include: a first negotiating unit 910 and a packet processing unit 920.

The first negotiating unit 910 is configured to negotiate, between the virtual machine 900 and a Host, an executor of a flow control policy based on a flow control capability of the virtual machine.

The packet processing unit 920 is configured to perform forward processing on a to-be-forward-processed packet based on the flow control policy if it is determined that a negotiated executor of the flow control policy is the virtual machine, and send the to-be-forward-processed packet to the Host if it is determined that the negotiated executor of the flow control policy is the Host, so that the Host performs forward processing on the received packet based on the flow control policy.

In some embodiments of the present invention, the first negotiating unit 910 may be specifically configured to send an executor negotiation request that carries description information about the flow control capability of the virtual machine to the Host; if a negotiation acknowledgment indication is received, determine that the negotiated executor of the flow control policy is the virtual machine, where the negotiation acknowledgment indication is sent by the Host after the Host determines, according to the description information about the flow control capability, that the virtual machine supports execution of the flow control policy; and if a negotiation non-acknowledgment indication is received, determine that the negotiated executor of the flow control policy is the Host, where the negotiation non-acknowledgment indication is sent by the Host after the Host determines, according to the description information about the flow control capability, that the virtual machine does not support the execution of the flow control policy;

or the first negotiating unit 910 may be specifically configured to send an executor negotiation request that carries description information about the flow control capability of the virtual machine to the Host, where the description information about the flow control capability is used to describe a version of a flow control policy of which execution is supported by the virtual machine; if a negotiation acknowledgment indication that is sent by the Host after the Host determines, according to the description information about the flow control capability, that the virtual machine supports execution of a flow control policy of a current latest version or a preset version is received, determine that the negotiated executor of the flow control policy is the virtual machine; and if a negotiation non-acknowledgment indication that is sent by the Host after the Host determines, according to the description information about the flow control capability, that the virtual machine does not support the execution of the flow control policy of the current latest version or the preset version is received, determine that the negotiated executor of the flow control policy is the Host;

or the first negotiating unit 910 may be specifically configured to send an executor negotiation request that carries description information about the flow control capability of the virtual machine to the Host; if a negotiation acknowledgment indication is received, determine that the negotiated executor of the flow control policy is the virtual machine, where the negotiation acknowledgment indication is sent by the Host after the Host determines, according to the description information about the flow control capability, that the virtual machine supports execution of the flow control policy; and if no negotiation acknowledgment indication that is sent by the Host in response to the executor negotiation request is received within a first set duration, determine that the negotiated executor of the flow control policy is the Host;

or the first negotiating unit 910 may be specifically configured to send an executor negotiation request that carries description information about the flow control capability of the virtual machine to the Host, where the description information about the flow control capability is used to describe a version of a flow control policy of which execution is supported by the virtual machine; if a negotiation acknowledgment indication that is sent by the Host after the Host determines, according to the description information about the flow control capability, that the virtual machine supports execution of a flow control policy of a current latest version or a preset version is received, determine that the negotiated executor of the flow control policy is the virtual machine; and if no negotiation acknowledgment indication that is sent by the Host in response to the executor negotiation request is received within a first set duration, determine that the negotiated executor of the flow control policy is the Host;

or the first negotiating unit 910 may be specifically configured to send an executor negotiation request that carries description information about the flow control capability of the virtual machine to the Host; if a negotiation non-acknowledgment indication is received, determine that the negotiated executor of the flow control policy is the Host, where the negotiation non-acknowledgment indication is sent by the Host after the Host determines, according to the description information about the flow control capability, that the virtual machine does not support execution of the flow control policy; and if no negotiation non-acknowledgment indication that is sent by the Host in response to the executor negotiation request is received within a second set duration, determine that the negotiated executor of the flow control policy is the virtual machine;

or the first negotiating unit 910 may be specifically configured to send an executor negotiation request that carries description information about the flow control capability of the virtual machine to the Host, where the description information about the flow control capability is used to describe a version of a flow control policy of which execution is supported by the virtual machine; if a negotiation non-acknowledgment indication that is sent by the Host after the Host determines, according to the description information about the flow control capability, that the virtual machine does not support execution of a flow control policy of a current latest version or a preset version is received, determine that the negotiated executor of the flow control policy is the Host; and if no negotiation non-acknowledgment indication that is sent by the Host in response to the executor negotiation request is received within a second set duration, determine that the negotiated executor of the flow control policy is the virtual machine.

In some embodiments of the present invention, if the description information about the flow control capability is used to describe a version of a flow control policy of which execution is supported by the virtual machine 900, that the Host may determine, according to the description information about the flow control capability, whether the virtual machine 900 supports execution of a flow control policy of a current latest version or a preset version may specifically include: determining, through comparison, whether the version, which is described by the description information about the flow control capability, of the flow control policy of which execution is supported by the virtual machine 900, is the same as the current latest version or the preset version of the flow control policy; if they are the same, determining that the virtual machine 900 supports execution of the flow control policy of the current latest version or the preset version; and if they are different, determining that the virtual machine 900 does not support the execution of the flow control policy of the current latest version or the preset version. For another example, that the Host may determine, according to the description information about the flow control capability, whether the virtual machine 900 supports execution of the flow control policy of the current latest version or the preset version may specifically include: determining, through comparison, whether each version of k (where k is a positive integer) versions, which are described by the description information about the flow control capability, of flow control policies of which execution is supported by the virtual machine 900, is the same as the current latest version or the preset version of the flow control policy; if it is obtained, by comparison, that one version of the k versions is the current latest version or the preset version of the flow control policy, determining that the virtual machine 900 supports execution of the flow control policy of the current latest version or the preset version; and if it is obtained, by comparison, that any one version of the k versions is different from the current latest version or the preset version of the flow control policy, determining that the virtual machine 900 does not support the execution of the flow control policy of the current latest version or the preset version.

In some embodiments of the present invention, the virtual machine 900 may further include:

a sending unit (not shown in FIG. 9), configured to periodically send a heartbeat message to the Host after it is determined that the negotiated executor of the flow control policy is the virtual machine.

The flow control policy mentioned in this embodiment may be, for example, a flow control policy based on service quality and/or a flow control policy based on an access control list; certainly, the flow control policy may also be a flow control policy that makes reference to other factors.

In the flow control policy based on service quality, a specific manner (where a specific forward processing manner may be sending a packet with a delay, sending a packet without a delay, or discarding a packet, or the like) of performing forward processing on the packet is determined mainly based on a service priority corresponding to the to-be-forward-processed packet. For example, multiple to-be-forward-processed packets currently exist in a cache; a packet corresponding to a higher service priority may be sent with a shorter delay or even without a delay, a packet corresponding to a lower service priority may be sent with a longer delay, and a to-be-forward-processed packet corresponding to a service priority that is lower than a set priority threshold may even be discarded. This helps ensure service quality of a high-priority service as much as possible. That is, the performing forward processing on the to-be-forward-processed packet according to the flow control policy based on service quality may specifically include: performing forward processing on the to-be-forward-processed packet according to a forward processing manner corresponding to a service priority of the to-be-forward-processed packet.

In the flow control policy based on an access control list, a specific manner of performing forward processing on the packet is determined mainly based on whether information carried in the to-be-forward-processed packet matches a record included in an access control list. For example, the access control list is a restricted access control list (which is similar to a blacklist); if the restricted access control list has a record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; on the contrary, if the restricted access control list has no record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. For another example, the access control list is a permitted access control list (which is similar to a whitelist); if the permitted access control list has no record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; and if the permitted access control list has a record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. Other cases may be processed by analogy.

It may be understood that functions of each module of the virtual machine 900 in this embodiment may be specifically implemented according to the method described in the foregoing method embodiments. For its specific implementation process, refer to the related descriptions in the foregoing embodiments, and details are not described herein again.

It can be learned that, in the solution according to this embodiment, a mechanism in which a virtual machine and a Host negotiate an executor of a flow control policy is introduced, so that both the virtual machine and the Host have an opportunity to be the executor of the flow control policy; this makes it possible for the virtual machine to execute the flow control policy, which helps perform flow control on a packet as early as possible, and further helps reduce ineffective processing and reduce bandwidth and address space, of the Host, occupied by an invalid packet flow. It can be seen that the solution helps reduce the address space, of the Host, occupied for performing forward processing on an outbound packet flow of the virtual machine. Moreover, the executor of the flow control policy is determined through negotiation, which helps improve reliability of executing the flow control policy.

Further, when both the virtual machine and the Host support execution of the flow control policy, the virtual machine has priority in executing the flow control policy; this further helps perform flow control on a packet as early as possible, and further helps reduce bandwidth occupied by ineffective processing and the invalid packet flow.

Further, the virtual machine and the Host are designed by using a modular architecture, which helps improve adaptability of a product to a complex application environment and reduce upgrade costs of environment migration.

Figure 10:
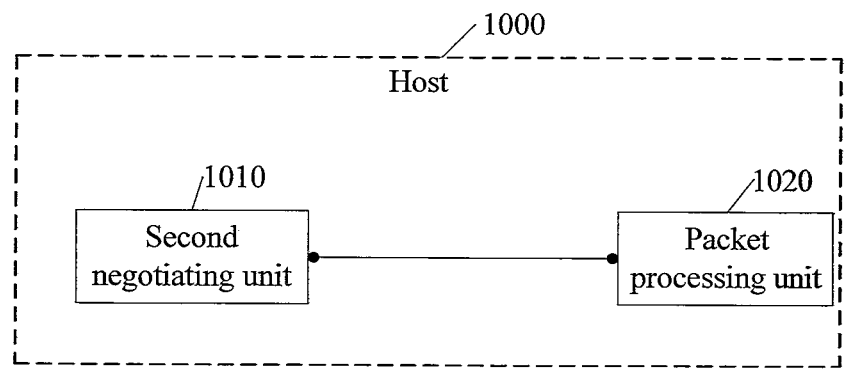
FIG. 10 is a schematic structural diagram of a host according to an embodiment of the present invention.

Referring to FIG. 10, an embodiment of the present invention further provides a host 1000, which may include: a second negotiating unit 1010 and a packet processing unit 1020.

The second negotiating unit 1010 is configured to negotiate, between a virtual machine and the host 1000, an executor of a flow control policy based on a flow control capability of the virtual machine.

The packet processing unit 1020 is configured to: if it is determined that a negotiated executor of the flow control policy is the host, perform forward processing on a received packet based on the flow control policy after receiving the packet from the virtual machine.

In some embodiments of the present invention, the second negotiating unit 1010 may be specifically configured to receive an executor negotiation request that is sent by the virtual machine and carries description information about the flow control capability of the virtual machine; send a negotiation acknowledgment indication to the virtual machine if it is determined, according to the description information about the flow control capability, that the virtual machine supports execution of the flow control policy, where the negotiation acknowledgment indication indicates that the negotiated executor of the flow control policy is the virtual machine; and/or send a negotiation non-acknowledgment indication to the virtual machine if it is determined, according to the description information about the flow control capability, that the virtual machine does not support the execution of the flow control policy, where the negotiation non-acknowledgment indication indicates that the negotiated executor of the flow control policy is the host.

In some other embodiments of the present invention, the second negotiating unit 1010 may be specifically configured to receive an executor negotiation request that is sent by the virtual machine and carries description information about the flow control capability of the virtual machine, where the description information about the flow control capability is used to describe a version of a flow control policy of which execution is supported by the virtual machine; send a negotiation acknowledgment indication to the virtual machine if it is determined, according to the description information about the flow control capability, that the virtual machine supports execution of a flow control policy of a current latest version or a preset version, where the negotiation acknowledgment indication indicates that a negotiated executor of the flow control policy is the virtual machine; and/or send a negotiation non-acknowledgment indication to the virtual machine if it is determined, according to the description information about the flow control capability, that the virtual machine does not support the execution of the flow control policy of the current latest version or the preset version, where the negotiation non-acknowledgment indication indicates that the negotiated executor of the flow control policy is the host.

In some embodiments of the present invention, if the description information about the flow control capability is used to describe a version of a flow control policy of which execution is supported by the virtual machine, that the second negotiating unit 1010 may determine, according to the description information about the flow control capability, whether the virtual machine supports execution of a flow control policy of a current latest version or a preset version may specifically include: determining, through comparison, whether the version, which is described by the description information about the flow control capability, of the flow control policy of which execution is supported by the virtual machine, is the same as the current latest version or the preset version of the flow control policy; if they are the same, determining that the virtual machine supports execution of the flow control policy of the current latest version or the preset version; and if they are different, determining that the virtual machine does not support the execution of the flow control policy of the current latest version or the preset version. For another example, that the second negotiating unit 1010 may determine, according to the description information about the flow control capability, whether the virtual machine supports execution of the flow control policy of the current latest version or the preset version may specifically include: determining, through comparison, whether each version of k (where k is a positive integer) versions, which are described by the description information about the flow control capability, of flow control policies of which execution is supported by the virtual machine, is the same as the current latest version or the preset version of the flow control policy; if it is obtained, by comparison, that one version of the k versions is the current latest version or the preset version of the flow control policy, determining that the virtual machine supports execution of the flow control policy of the current latest version or the preset version; and if it is obtained, by comparison, that any one version of the k versions is different from the current latest version or the preset version of the flow control policy, determining that the virtual machine does not support the execution of the flow control policy of the current latest version or the preset version.

In some embodiments of the present invention, the packet processing unit 1020 is further configured to: after it is determined that the negotiated executor of the flow control policy is the virtual machine, if no heartbeat message is received from the virtual machine within a set duration, send, to the virtual machine, an indication message used to indicate that the executor of the flow control policy is switched to the Host.

In this embodiment, the flow control policy based on which the packet processing unit 1020 processes a to-be-forward-processed packet may be, for example, a flow control policy based on service quality and/or a flow control policy based on an access control list; certainly, the flow control policy may also be a flow control policy that makes reference to other factors.

In the flow control policy based on service quality, a specific manner (where a specific forward processing manner may be sending a packet with a delay, sending a packet without a delay, or discarding a packet, or the like) of performing forward processing on the packet is determined mainly based on a service priority corresponding to the to-be-forward-processed packet. For example, multiple to-be-forward-processed packets currently exist in a cache; a packet corresponding to a higher service priority may be sent with a shorter delay or even without a delay, a packet corresponding to a lower service priority may be sent with a longer delay, and a to-be-forward-processed packet corresponding to a service priority that is lower than a set priority threshold may even be discarded. This helps ensure service quality of a high-priority service as much as possible. That is, the performing forward processing on the to-be-forward-processed packet according to the flow control policy based on service quality may specifically include: performing forward processing on the to-be-forward-processed packet according to a forward processing manner corresponding to a service priority of the to-be-forward-processed packet.

In the flow control policy based on an access control list, a specific manner of performing forward processing on the packet is determined mainly based on whether information carried in the to-be-forward-processed packet matches a record included in an access control list. For example, the access control list is a restricted access control list (which is similar to a blacklist); if the restricted access control list has a record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; on the contrary, if the restricted access control list has no record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. For another example, the access control list is a permitted access control list (which is similar to a whitelist); if the permitted access control list has no record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; and if the permitted access control list has a record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. Other cases may be processed by analogy.

It may be understood that functions of each module of the Host 1000 in this embodiment may be specifically implemented according to the method described in the foregoing method embodiments. For its specific implementation process, refer to the related descriptions in the foregoing embodiments, and details are not described herein again.

It can be learned that, in the solution according to this embodiment, a mechanism in which a virtual machine and a Host negotiate an executor of a flow control policy is introduced, so that both the virtual machine and the Host have an opportunity to be the executor of the flow control policy; this makes it possible for the virtual machine to execute the flow control policy, which helps perform flow control on a packet as early as possible, and further helps reduce ineffective processing and reduce bandwidth and address space, of the Host, occupied by an invalid packet flow. It can be seen that the solution helps reduce the address space, of the Host, occupied for performing forward processing on an outbound packet flow of the virtual machine. Moreover, the executor of the flow control policy is determined through negotiation, which helps improve reliability of executing the flow control policy.

Further, when both the virtual machine and the Host support execution of the flow control policy, the virtual machine has priority in executing the flow control policy; this further helps perform flow control on a packet as early as possible, and further helps reduce bandwidth occupied by ineffective processing and the invalid packet flow.

Further, the virtual machine and the Host are designed by using a modular architecture, which helps improve adaptability of a product to a complex application environment, reduce upgrade costs of environment migration.

Figure 11:
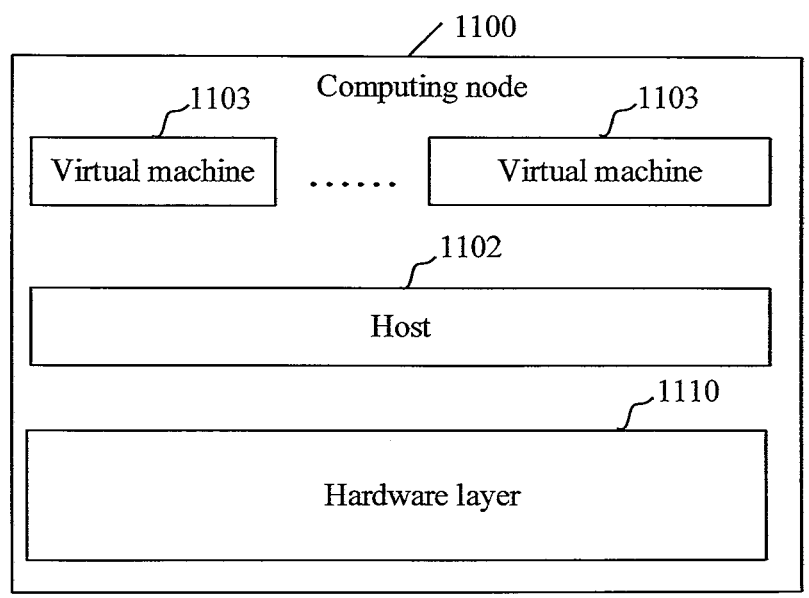
FIG. 11 is a schematic structural diagram of a computing node according to an embodiment of the present invention.

Referring to FIG. 11, an embodiment of the present invention further provides a computing node 1100, which may include: a hardware layer 1110, a host 1102 that runs at the hardware layer, and at least one virtual machine 1103 that runs on the host 1102.

The virtual machine 1103 is configured to negotiate, between the virtual machine 1103 and the host 1102, an executor of a flow control policy based on a flow control capability of the virtual machine 1103; perform forward processing on a to-be-forward-processed packet based on the flow control policy if it is determined that a negotiated executor of the flow control policy is the virtual machine; and send the to-be-forward-processed packet to the Host 1102 if it is determined that the negotiated executor of the flow control policy is the host 1102.

The host 1102 is configured to: if it is determined that the negotiated executor of the flow control policy is the host 1102, perform forward processing on a received packet based on the flow control policy after receiving the packet from the virtual machine.

In some embodiments of the present invention, for negotiating, between the virtual machine 1103 and the host 1102, the executor of the flow control policy based on the flow control capability of the virtual machine 1103, the virtual machine is specifically configured to send an executor negotiation request that carries description information about the flow control capability of the virtual machine to the host 1102; if a negotiation acknowledgment indication is received, determine that the negotiated executor of the flow control policy is the virtual machine, where the negotiation acknowledgment indication is sent by the host 1102 after the host 1102 determines, according to the description information about the flow control capability, that the virtual machine supports execution of the flow control policy; and if a negotiation non-acknowledgment indication is received, deter mine that the negotiated executor of the flow control policy is the host 1102, where the negotiation non-acknowledgment indication is sent by the host 1102 after the host 1102 determines, according to the description information about the flow control capability, that the virtual machine does not support the execution of the flow control policy.

Alternatively, for negotiating, between the virtual machine 1103 and the host 1102, the executor of the flow control policy based on the flow control capability of the virtual machine 1103, the virtual machine is specifically configured to send an executor negotiation request that carries description information about the flow control capability of the virtual machine to the host 1102, where the description information about the flow control capability is used to describe a version of a flow control policy of which execution is supported by the virtual machine; if a negotiation acknowledgment indication that is sent by the host 1102 after the host 1102 determines, according to the description information about the flow control capability, that the virtual machine supports execution of a flow control policy of a current latest version or a preset version is received, determine that the negotiated executor of the flow control policy is the virtual machine; and if a negotiation non-acknowledgment indication that is sent by the host 1102 after the host 1102 determines, according to the description information about the flow control capability, that the virtual machine does not support the execution of the flow control policy of the current latest version or the preset version is received, determine that the negotiated executor of the flow control policy is the host 1102.

Alternatively, for negotiating, between the virtual machine 1103 and the host 1102, the executor of the flow control policy based on the flow control capability of the virtual machine 1103, the virtual machine is specifically configured to send an executor negotiation request that carries description information about the flow control capability of the virtual machine to the host 1102; if a negotiation acknowledgment indication is received, determine that the negotiated executor of the flow control policy is the virtual machine, where the negotiation acknowledgment indication is sent by the host 1102 after the host 1102 determines, according to the description information about the flow control capability, that the virtual machine supports execution of the flow control policy; and if no negotiation acknowledgment indication that is sent by the host 1102 in response to the executor negotiation request is received within a first set duration, determine that the negotiated executor of the flow control policy is the host 1102.

Alternatively, for negotiating, between the virtual machine 1103 and the host 1102, the executor of the flow control policy based on the flow control capability of the virtual machine 1103, the virtual machine is specifically configured to send an executor negotiation request that carries description information about the flow control capability of the virtual machine to the host 1102, where the description information about the flow control capability is used to describe a version of a flow control policy of which execution is supported by the virtual machine; if a negotiation acknowledgment indication that is sent by the host 1102 after the host 1102 determines, according to the description information about the flow control capability, that the virtual machine supports execution of a flow control policy of a current latest version or a preset version is received, determine that the negotiated executor of the flow control policy is the virtual machine; and if no negotiation acknowledgment indication that is sent by the host 1102 in response to the executor negotiation request is received within a first set duration, determine that the negotiated executor of the flow control policy is the host 1102.

Alternatively, for negotiating, between the virtual machine 1103 and the host 1102, the executor of the flow control policy based on the flow control capability of the virtual machine 1103, the virtual machine is specifically configured to send an executor negotiation request that carries description information about the flow control capability of the virtual machine to the host 1102; if a negotiation non-acknowledgment indication is received, determine that the negotiated executor of the flow control policy is the host 1102, where the negotiation non-acknowledgment indication is sent by the host 1102 after the host 1102 determines, according to the description information about the flow control capability, that the virtual machine does not support execution of the flow control policy; and if no negotiation non-acknowledgment indication that is sent by the host 1102 in response to the executor negotiation request is received within a second set duration, determine that the negotiated executor of the flow control policy is the virtual machine.

Alternatively, for negotiating, between the virtual machine 1103 and the host 1102, the executor of the flow control policy based on the flow control capability of the virtual machine 1103, the virtual machine 1103 is specifically configured to send an executor negotiation request that carries description information about the flow control capability of the virtual machine to the host 1102, where the description information about the flow control capability is used to describe a version of a flow control policy of which execution is supported by the virtual machine; if a negotiation non-acknowledgment indication that is sent by the host 1102 after the host 1102 determines, according to the description information about the flow control capability, that the virtual machine does not support execution of a flow control policy of a current latest version or a preset version is received, determine that the negotiated executor of the flow control policy is the host 1102; and if no negotiation non-acknowledgment indication that is sent by the host 1102 in response to the executor negotiation request is received within a second set duration, determine that the negotiated executor of the flow control policy is the virtual machine.

In some embodiments of the present invention, the host 1102 may receive an executor negotiation request that is sent by the virtual machine and carries description information about the flow control capability of the virtual machine; send a negotiation acknowledgment indication to the virtual machine if it is determined, according to the description information about the flow control capability, that the virtual machine supports execution of the flow control policy, where the negotiation acknowledgment indication indicates that the negotiated executor of the flow control policy is the virtual machine; and/or send a negotiation non-acknowledgment indication to the virtual machine if it is determined, according to the description information about the flow control capability, that the virtual machine does not support the execution of the flow control policy, where the negotiation non-acknowledgment indication indicates that the negotiated executor of the flow control policy is the host.

In some other embodiments of the present invention, the host 1102 may receive an executor negotiation request that is sent by the virtual machine and carries description information about the flow control capability of the virtual machine, where the description information about the flow control capability is used to describe a version of a flow control policy of which execution is supported by the virtual machine; send a negotiation acknowledgment indication to the virtual machine if it is determined, according to the description information about the flow control capability, that the virtual machine supports execution of a flow control policy of a current latest version or a preset version, where the negotiation acknowledgment indication indicates that a negotiated executor of the flow control policy is the virtual machine; and/or send a negotiation non-acknowledgment indication to the virtual machine if it is determined, according to the description information about the flow control capability, that the virtual machine does not support the execution of the flow control policy of the current latest version or the preset version, where the negotiation non-acknowledgment indication indicates that the negotiated executor of the flow control policy is the host.

In some embodiments of the present invention, if the description information about the flow control capability is used to describe a version of a flow control policy of which execution is supported by the virtual machine, that the host 1102 may determine, according to the description information about the flow control capability, whether the virtual machine supports execution of a flow control policy of a current latest version or a preset version may specifically include: determining, through comparison, whether the version, which is described by the description information about the flow control capability, of the flow control policy of which execution is supported by the virtual machine, is the same as the current latest version or the preset version of the flow control policy; if they are the same, determining that the virtual machine supports execution of the flow control policy of the current latest version or the preset version; and if they are different, determining that the virtual machine does not support the execution of the flow control policy of the current latest version or the preset version. For another example, that the host 1102 may determine, according to the description information about the flow control capability, whether the virtual machine supports execution of the flow control policy of the current latest version or the preset version may specifically include: determining, through comparison, whether each version of k (where k is a positive integer) versions, which are described by the description information about the flow control capability, of flow control policies of which execution is supported by the virtual machine, is the same as the current latest version or the preset version of the flow control policy; if it is obtained, by comparison, that one version of the k versions is the current latest version or the preset version of the flow control policy, determining that the virtual machine supports execution of the flow control policy of the current latest version or the preset version; and if it is obtained, by comparison, that any one version of the k versions is different from the current latest version or the preset version of the flow control policy, determining that the virtual machine does not support the execution of the flow control policy of the current latest version or the preset version.

In some embodiments of the present invention, the host 1102 is further configured to: after it is determined that the negotiated executor of the flow control policy is the virtual machine, if no heartbeat message is received from the virtual machine within a set duration, send, to the virtual machine, an indication message used to indicate that the executor of the flow control policy is switched to the Host 1102.

In some embodiments of the present invention, the negotiation acknowledgment indication may include the flow control policy; and for performing, by the virtual machine, forward processing on the to-be-forward-processed packet based on the flow control policy, the virtual machine is specifically configured to perform forward processing on the to-be-forward-processed packet based on the flow control policy included in the negotiation acknowledgment indication.

Certainly, the host 1102 may also transfer the flow control policy to the virtual machine in other manners, so that the virtual machine 1103 performs, after it is determined that the negotiated executor of the flow control policy is the virtual machine, forward processing on the to-be-forward-processed packet based on the flow control policy transferred by the host 1102. Certainly, the flow control policy may also be pre-configured in the virtual machine 1103; when the virtual machine 1103 determines that the negotiated executor of the flow control policy is the virtual machine 1103, the virtual machine 1103 performs forward processing on the to-be-forward-processed packet based on the pre-configured flow control policy.

In some embodiments of the present invention, for that the virtual machine 1103 sends the executor negotiation request that carries the description information about the flow control capability of the virtual machine 1103 to the host 1102, the virtual machine 1103 is specifically configured to send the executor negotiation request that carries the description information about the flow control capability of the virtual machine 1103 to the host 1102 after a negotiation starting request initiated by a user-mode process is received; or send the executor negotiation request that carries the description information about the flow control capability of the virtual machine 1103 to the host 1102 after a negotiation starting request from the host 1102 is received.

In this embodiment, the flow control policy based on which the host 1102 or the virtual machine 1103 processes a to-be-forward-processed packet may be, for example, a flow control policy based on service quality and/or a flow control policy based on an access control list; certainly, the flow control policy may also be a flow control policy that makes reference to other factors.

In the flow control policy based on service quality, a specific manner (where a specific forward processing manner may be sending a packet with a delay, sending a packet without a delay, or discarding a packet, or the like) of performing forward processing on the packet is determined mainly based on a service priority corresponding to the to-be-forward-processed packet. For example, multiple to-be-forward-processed packets currently exist in a cache; a packet corresponding to a higher service priority may be sent with a shorter delay or even without a delay, a packet corresponding to a lower service priority may be sent with a longer delay, and a to-be-forward-processed packet corresponding to a service priority that is lower than a set priority threshold may even be discarded. This helps ensure service quality of a high-priority service as much as possible. That is, the performing forward processing on the to-be-forward-processed packet according to the flow control policy based on service quality may specifically include: performing forward processing on the to-be-forward-processed packet according to a forward processing manner corresponding to a service priority of the to-be-forward-processed packet.

In the flow control policy based on an access control list, a specific manner of performing forward processing on the packet is determined mainly based on whether information carried in the to-be-forward-processed packet matches a record included in an access control list. For example, the access control list is a restricted access control list (which is similar to a blacklist); if the restricted access control list has a record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; on the contrary, if the restricted access control list has no record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. For another example, the access control list is a permitted access control list (which is similar to a whitelist); if the permitted access control list has no record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; and if the permitted access control list has a record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. Other cases may be processed by analogy.

It may be understood that functions of each unit of the computing node 1100 in this embodiment may be specifically implemented according to the method described in the foregoing method embodiments. For its specific implementation process, refer to the related descriptions in the foregoing embodiments, and details are not described herein again.

It can be learned that, in the solution according to this embodiment, a mechanism in which a virtual machine and a Host negotiate an executor of a flow control policy is introduced into a computing node 1100, so that both the virtual machine and the Host have an opportunity to be the executor of the flow control policy; this makes it possible for the virtual machine to execute the flow control policy, which helps perform flow control on a packet as early as possible, and further helps reduce ineffective processing and reduce bandwidth and address space, of the Host, occupied by an invalid packet flow. It can be seen that the solution helps reduce the address space, of the Host, occupied for performing forward processing on an outbound packet flow of the virtual machine. Moreover, the executor of the flow control policy is determined through negotiation, which helps improve reliability of executing the flow control policy.

Further, when both the virtual machine and the Host support execution of the flow control policy, the virtual machine has priority in executing the flow control policy; this further helps perform flow control on a packet as early as possible, and further helps reduce bandwidth occupied by ineffective processing and the invalid packet flow.

Further, the virtual machine and the Host are designed by using a modular architecture, which helps improve adaptability of a product to a complex application environment and reduce upgrade costs of environment migration.

Figure 12:
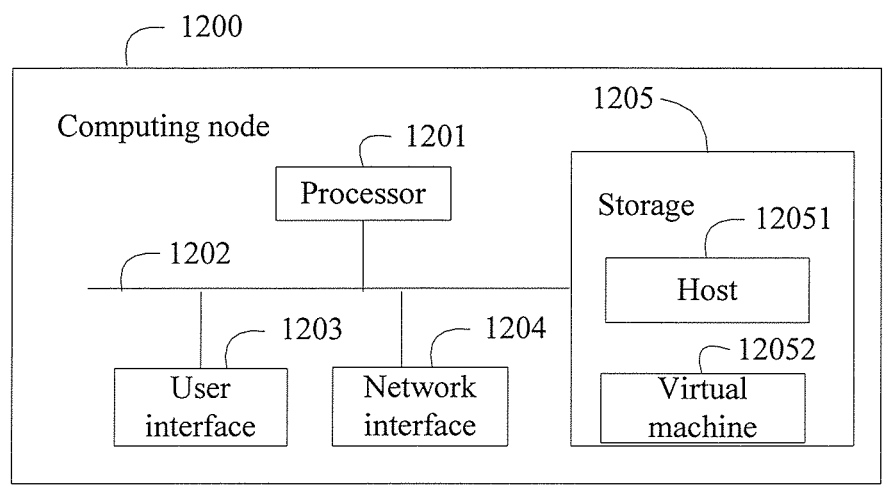
FIG. 12 is a schematic structural diagram of another computing node according to an embodiment of the present invention.

FIG. 12 shows a structure of a computing node 1200 according to an embodiment of the present invention. The computing node 1200 includes: at least one processor 1201, for example, a CPU, at least one network interface 1204 or another user interface 1203, storage 1205, and at least one communications bus 1202. The communications bus 1202 is configured to implement connection and communication between these components. Optionally, the computing node 1200 includes the user interface 1203, which includes a display, a keyboard, or a click device (such as a mouse, a trackball (trackball), a touchpad, or a touchscreen). The storage 1205 may include a high-speed RAM memory, and may also include a non-volatile memory (non-volatile memory), such as at least one disk memory. The storage 1205 may optionally include at least one storage apparatus far away from the processor 1201. The network interface 1204 includes a physical network interface card, and the like.

In some implementation manners, the storage 1205 stores the following elements, an executable module or a data structure, or a subset thereof, or an extended set thereof: a host 12051 and at least one virtual machine 12052. The host 12051 may, under invocation of the processor 1201, have a part of or all functions of the host described in the foregoing embodiments; the virtual machine 12052 may, under invocation of the processor 1201, have a part of or all functions of the virtual machine described in the foregoing embodiments.

In this embodiment of the present invention, the virtual machine 12052 may, under invocation of the processor 1201, be configured to negotiate, between the virtual machine 12052 and the Host 12051, an executor of a flow control policy based on a flow control capability of the virtual machine; perform forward processing on a to-be-forward-processed packet based on the flow control policy if it is determined that a negotiated executor of the flow control policy is the virtual machine; and send the to-be-forward-processed packet to the Host 12051 if it is determined that the negotiated executor of the flow control policy is the host 12051.

The host 12051 may, under invocation of the processor 1201, be configured to: if it is determined that the negotiated executor of the flow control policy is the host 12051, perform forward processing on a received packet based on the flow control policy after receiving the packet from the virtual machine 12052.

In some embodiments of the present invention, for negotiating, between the virtual machine 12052 and the Host 12051, the executor of the flow control policy based on the flow control capability of the virtual machine, the virtual machine 12052 is, under invocation of the processor 1201, specifically configured to send an executor negotiation request that carries description information about the flow control capability of the virtual machine to the host 12051; if a negotiation acknowledgment indication is received, determine that the negotiated executor of the flow control policy is the virtual machine, where the negotiation acknowledgment indication is sent by the host 12051 after the host 12051 determines, according to the description information about the flow control capability, that the virtual machine supports execution of the flow control policy; and if a negotiation non-acknowledgment indication is received, determine that the negotiated executor of the flow control policy is the host 12051, where the negotiation non-acknowledgment indication is sent by the host 12051 after the host 12051 determines, according to the description information about the flow control capability, that the virtual machine does not support the execution of the flow control policy.

Alternatively, for negotiating, between the virtual machine 12052 and the Host 12051, the executor of the flow control policy based on the flow control capability of the virtual machine, the virtual machine 12052 is, under invocation of the processor 1201, specifically configured to send an executor negotiation request that carries description information about the flow control capability of the virtual machine to the host 12051, where the description information about the flow control capability is used to describe a version of a flow control policy of which execution is supported by the virtual machine; if a negotiation acknowledgment indication that is sent by the host 12051 after the host 12051 determines, according to the description information about the flow control capability, that the virtual machine supports execution of a flow control policy of a current latest version or a preset version is received, determine that the negotiated executor of the flow control policy is the virtual machine; and if a negotiation non-acknowledgment indication that is sent by the host 12051 after the host 12051 determines, according to the description information about the flow control capability, that the virtual machine does not support the execution of the flow control policy of the current latest version or the preset version is received, determine that the negotiated executor of the flow control policy is the host 12051.

Alternatively, for negotiating, between the virtual machine 12052 and the Host 12051, the executor of the flow control policy based on the flow control capability of the virtual machine, the virtual machine 12052 is, under invocation of the processor 1201, specifically configured to send an executor negotiation request that carries description information about the flow control capability of the virtual machine to the host 12051; if a negotiation acknowledgment indication is received, determine that the negotiated executor of the flow control policy is the virtual machine, where the negotiation acknowledgment indication is sent by the host 12051 after the host 12051 determines, according to the description information about the flow control capability, that the virtual machine supports execution of the flow control policy; and if no negotiation acknowledgment indication that is sent by the host 12051 in response to the executor negotiation request is received within a first set duration, determine that the negotiated executor of the flow control policy is the host 12051.

Alternatively, for negotiating, between the virtual machine 12052 and the Host 12051, the executor of the flow control policy based on the flow control capability of the virtual machine, the virtual machine 12052 is, under invocation of the processor 1201, specifically configured to send an executor negotiation request that carries description information about the flow control capability of the virtual machine to the host 12051, where the description information about the flow control capability is used to describe a version of a flow control policy of which execution is supported by the virtual machine; if a negotiation acknowledgment indication that is sent by the host 12051 after the host 12051 determines, according to the description information about the flow control capability, that the virtual machine supports execution of a flow control policy of a current latest version or a preset version is received, determine that the negotiated executor of the flow control policy is the virtual machine; and if no negotiation acknowledgment indication that is sent by the host 12051 in response to the executor negotiation request is received within a first set duration, determine that the negotiated executor of the flow control policy is the host 12051.

Alternatively, for negotiating, between the virtual machine 12052 and the Host 12051, the executor of the flow control policy based on the flow control capability of the virtual machine, the virtual machine 12052 is, under invocation of the processor 1201, specifically configured to send an executor negotiation request that carries description information about the flow control capability of the virtual machine to the host 12051; if a negotiation non-acknowledgment indication is received, determine that the negotiated executor of the flow control policy is the host 12051, where the negotiation non-acknowledgment indication is sent by the host 12051 after the host 12051 determines, according to the description information about the flow control capability, that the virtual machine does not support execution of the flow control policy; and if no negotiation non-acknowledgment indication that is sent by the host 12051 in response to the executor negotiation request is received within a second set duration, determine that the negotiated executor of the flow control policy is the virtual machine.

Alternatively, for negotiating, between the virtual machine 12052 and the Host 12051, the executor of the flow control policy based on the flow control capability of the virtual machine, the virtual machine 12052 is, under invocation of the processor 1201, specifically configured to send an executor negotiation request that carries description information about the flow control capability of the virtual machine to the host 12051, where the description information about the flow control capability is used to describe a version of a flow control policy of which execution is supported by the virtual machine; if a negotiation non-acknowledgment indication that is sent by the host 12051 after the host 12051 determines, according to the description information about the flow control capability, that the virtual machine does not support execution of a flow control policy of a current latest version or a preset version is received, determine that the negotiated executor of the flow control policy is the host 12051; and if no negotiation non-acknowledgment indication that is sent by the host 12051 in response to the executor negotiation request is received within a second set duration, determine that the negotiated executor of the flow control policy is the virtual machine.

In some embodiments of the present invention, if the description information about the flow control capability is used to describe a version of a flow control policy of which execution is supported by the virtual machine, that the host 12051 may, under invocation of the processor 1201, determine, according to the description information about the flow control capability, whether the virtual machine supports execution of a flow control policy of a current latest version or a preset version may specifically include: determining, through comparison, whether the version, which is described by the description information about the flow control capability, of the flow control policy of which execution is supported by the virtual machine, is the same as the current latest version or the preset version of the flow control policy; if they are the same, determining that the virtual machine supports execution of the flow control policy of the current latest version or the preset version; and if they are different, determining that the virtual machine does not support the execution of the flow control policy of the current latest version or the preset version. For another example, that the host 12051 may, under invocation of the processor 1201, determine, according to the description information about the flow control capability, whether the virtual machine supports execution of the flow control policy of the current latest version or the preset version may specifically include: determining, through comparison, whether each version of k (where k is a positive integer) versions, which are described by the description information about the flow control capability, of flow control policies of which execution is supported by the virtual machine, is the same as the current latest version or the preset version of the flow control policy; if it is obtained, by comparison, that one version of the k versions is the current latest version or the preset version of the flow control policy, determining that the virtual machine supports execution of the flow control policy of the current latest version or the preset version; and if it is obtained, by comparison, that any one version of the k versions is different from the current latest version or the preset version of the flow control policy, determining that the virtual machine does not support the execution of the flow control policy of the current latest version or the preset version.

In some embodiments of the present invention, the host 12051 is, under invocation of the processor 1201, further configured to: after it is determined that the negotiated executor of the flow control policy is the virtual machine, if no heartbeat message is received from the virtual machine within a set duration, send, to the virtual machine, an indication message used to indicate that the executor of the flow control policy is switched to the Host 12051.

In some embodiments of the present invention, the negotiation acknowledgment indication may include the flow control policy; and for performing, by the virtual machine, forward processing on the to-be-forward-processed packet based on the flow control policy, the virtual machine 12052 is specifically configured to perform forward processing on the to-be-forward-processed packet based on the flow control policy included in the negotiation acknowledgment indication.

Certainly, the host 12051 may also transfer the flow control policy to the virtual machine in other manners, so that the virtual machine 12052 performs, after it is determined that the negotiated executor of the flow control policy is the virtual machine, forward processing on the to-be-forward-processed packet based on the flow control policy transferred by the host 12051. Certainly, the flow control policy may also be pre-configured in the virtual machine 12052; when the virtual machine 12052 determines that the negotiated executor of the flow control policy is the virtual machine 12052, the virtual machine 12052 performs forward processing on the to-be-forward-processed packet based on the pre-configured flow control policy.

In some embodiments of the present invention, for that the virtual machine 12052 sends the executor negotiation request that carries the description information about the flow control capability of the virtual machine 12052 to the host 12051, the virtual machine 12052 is, under invocation of the processor 1201, specifically configured to send the executor negotiation request that carries the description information about the flow control capability of the virtual machine 12052 to the host 12051 after a negotiation starting request initiated by a user-mode process is received; or send the executor negotiation request that carries the description information about the flow control capability of the virtual machine 12052 to the host 12051 after a negotiation starting request from the host 12051 is received.

In this embodiment, the flow control policy based on which the host 12051 or the virtual machine 12052 processes a to-be-forward-processed packet may be, for example, a flow control policy based on service quality and/or a flow control policy based on an access control list; certainly, the flow control policy may also be a flow control policy that makes reference to other factors.

In the flow control policy based on service quality, a specific manner (where a specific forward processing manner may be sending a packet with a delay, sending a packet without a delay, or discarding a packet, or the like) of performing forward processing on the packet is determined mainly based on a service priority corresponding to the to-be-forward-processed packet. For example, multiple to-be-forward-processed packets currently exist in a cache; a packet corresponding to a higher service priority may be sent with a shorter delay or even without a delay, a packet corresponding to a lower service priority may be sent with a longer delay, and a to-be-forward-processed packet corresponding to a service priority that is lower than a set priority threshold may even be discarded. This helps ensure service quality of a high-priority service as much as possible. That is, the performing forward processing on the to-be-forward-processed packet according to the flow control policy based on service quality may specifically include: performing forward processing on the to-be-forward-processed packet according to a forward processing manner corresponding to a service priority of the to-be-forward-processed packet.

In the flow control policy based on an access control list, a specific manner of performing forward processing on the packet is determined mainly based on whether information carried in the to-be-forward-processed packet matches a record included in an access control list. For example, the access control list is a restricted access control list (which is similar to a blacklist); if the restricted access control list has a record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; on the contrary, if the restricted access control list has no record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. For another example, the access control list is a permitted access control list (which is similar to a whitelist); if the permitted access control list has no record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; and if the permitted access control list has a record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. Other cases may be processed by analogy.

It may be understood that functions of each unit of the computing node 1200 in this embodiment may be specifically implemented according to the method described in the foregoing method embodiments. For its specific implementation process, refer to the related descriptions in the foregoing embodiments, and details are not described herein again.

It can be learned that, in the solution according to this embodiment, a mechanism in which a virtual machine and a Host negotiate an executor of a flow control policy is introduced into a computing node 1200, so that both the virtual machine and the Host have an opportunity to be the executor of the flow control policy; this makes it possible for the virtual machine to execute the flow control policy, which helps perform flow control on a packet as early as possible, and further helps reduce ineffective processing and reduce bandwidth and address space, of the Host, occupied by an invalid packet flow. It can be seen that the solution helps reduce the address space, of the Host, occupied for performing forward processing on an outbound packet flow of the virtual machine. Moreover, the executor of the flow control policy is determined through negotiation, which helps improve reliability of executing the flow control policy.

Further, when both the virtual machine and the Host support execution of the flow control policy, the virtual machine has priority in executing the flow control policy; this further helps perform flow control on a packet as early as possible, and further helps reduce bandwidth occupied by ineffective processing and the invalid packet flow.

Figure 13:
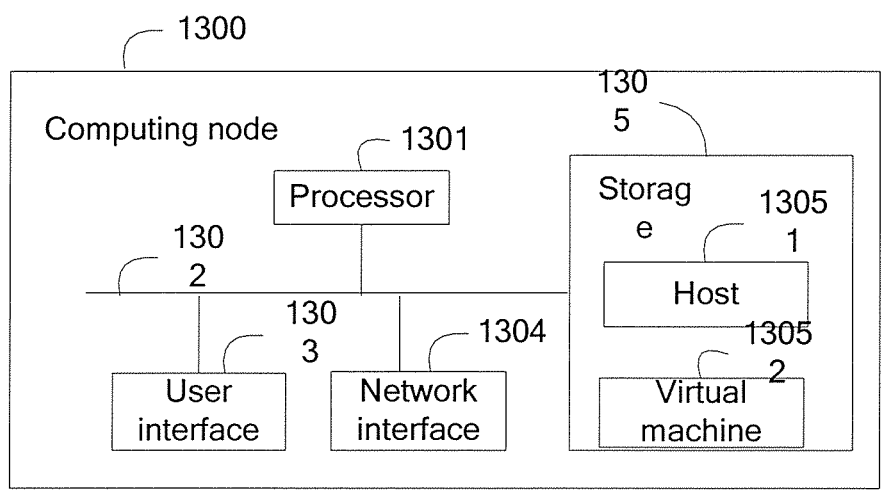
FIG. 13 is a schematic structural diagram of another computing node according to an embodiment of the present invention.

FIG. 13 shows a structure of a computing node 1300 according to an embodiment of the present invention. The computing node 1300 includes: at least one processor 1301, for example, a CPU, at least one network interface 1304, storage 1305, and at least one communications bus 1302. The communications bus 1302 is configured to implement connection and communication between these components. Optionally, the computing node 1300 includes a user interface 1303, which includes a display, a keyboard, or a click device (such as a mouse, a trackball (trackball), a touchpad, or a touchscreen). The storage 1305 may include a high-speed RAM memory, and may also include a non-volatile memory (non-volatile memory), such as at least one disk memory. The storage 1305 may optionally include at least one storage apparatus far away from the processor 1301. The network interface 1304 includes a physical network interface card, and the like.

In some implementation manners, the storage 1305 stores the following elements, an executable module or a data structure, or a subset thereof, or an extended set thereof: a host 13051 and at least one virtual machine 13052. The host 13051 may, under invocation of the processor 1301, have a part of or all functions of the host described in the foregoing embodiments; the virtual machine 13052 may, under invocation of the processor 1301, have a part of or all functions of the virtual machine described in the foregoing embodiments.

In this embodiment of the present invention, the processor 1301 may, by invoking a program or instruction stored in the storage 1305, be configured to negotiate, between the host 13051 and the virtual machine 13052, an executor of a flow control policy based on a flow control capability of the virtual machine 13052; perform forward processing on a to-be-forward-processed packet of the virtual machine 13052 based on the flow control policy if a negotiated executor of the flow control policy is the virtual machine 13052; and send the to-be-forward-processed packet of the virtual machine 13052 to the host 13051 if the negotiated executor of the flow control policy is the host 13051, and perform, based on the flow control policy, forward processing on the to-be-forward-processed packet received by the host 13051.

In some embodiments of the present invention, that the processor 1301 negotiates, between the host 13051 and the virtual machine 13052, an executor of a flow control policy based on a flow control capability of the virtual machine 13052 may include: sending, by the processor 1301 to the host 13051, an executor negotiation request to be sent by the virtual machine 13052 to the host 13051, where the executor negotiation request carries description information about the flow control capability of the virtual machine 13052; and after the host 13051 receives the executor negotiation request, if the processor 1301 determines, according to the description information about the flow control capability, that the virtual machine 13052 supports execution of the flow control policy, sending, by the processor 1301 to the virtual machine 13052, a negotiation acknowledgment indication to be sent by the host 13051 to the virtual machine 13052, where the negotiation acknowledgment indication indicates that the negotiated executor of the flow control policy is the virtual machine 13052; and/or if the processor 1301 determines, according to the description information about the flow control capability, that the virtual machine 13052 does not support the execution of the flow control policy, sending, by the processor 1301 to the virtual machine 13052, a negotiation non-acknowledgment indication to be sent by the host 13051 to the virtual machine 13052, where the negotiation non-acknowledgment indication indicates that the negotiated executor of the flow control policy is the host 13051.

Alternatively, that the processor 1301 negotiates, between the host 13051 and a virtual machine 13052, an executor of a flow control policy based on a flow control capability of the virtual machine 13052 includes: sending, by the processor 1301 to the host 13051, an executor negotiation request to be sent by the virtual machine 13052 to the host 13051, where the executor negotiation request carries description information about the flow control capability of the virtual machine 13052, and the description information about the flow control capability is used to describe a version of a flow control policy of which execution is supported by the virtual machine 13052; and after the host 13051 receives the executor negotiation request, if the processor 1301 determines, according to the description information about the flow control capability, that the virtual machine 13052 supports execution of a flow control policy of a current latest version or a preset version, sending, by the processor 1301 to the virtual machine 13052, a negotiation acknowledgment indication to be sent by the host 13051 to the virtual machine 13052, where the negotiation acknowledgment indication indicates that the negotiated executor of the flow control policy is the virtual machine 13052; and/or if the processor 1301 determines, according to the description information about the flow control capability, that the virtual machine 13052 does not support the execution of the flow control policy of the current latest version or the preset version, sending, by the processor 1301 to the virtual machine 13052, a negotiation non-acknowledgment indication to be sent by the host 13051 to the virtual machine 13052, where the negotiation non-acknowledgment indication indicates that the negotiated executor of the flow control policy is the host 13051.

In some other embodiments of the present invention, that the processor 1301 negotiates, between the host 13051 and the virtual machine 13052, an executor of a flow control policy based on a flow control capability of the virtual machine 13052 may include: sending, by the processor 1301 to the host 13051, an executor negotiation request to be sent by the virtual machine 13052 to the host 13051, where the executor negotiation request carries description information about the flow control capability of the virtual machine 13052; and if a negotiation acknowledgment indication that is sent by the host 13051 in response to the executor negotiation request is received by the virtual machine 13052, determining, by the processor 1301, that the negotiated executor of the flow control policy is the virtual machine; and if a negotiation non-acknowledgment indication that is sent by the host 13051 in response to the executor negotiation request is received by the virtual machine 13052, determining, by the processor 1301, that the negotiated executor of the flow control policy is the host 13051.

Alternatively, that the processor 1301 negotiates, between the host 13051 and the virtual machine 13052, an executor of a flow control policy based on a flow control capability of the virtual machine 13052 may include: sending, by the processor 1301 to the host 13051, an executor negotiation request to be sent by the virtual machine 13052 to the host 13051, where the executor negotiation request carries description information about the flow control capability of the virtual machine 13052, and the description information about the flow control capability is used to describe a version of a flow control policy of which execution is supported by the virtual machine 13052; if a negotiation acknowledgment indication that is sent by the host 13051 in response to the executor negotiation request is received by the virtual machine 13052, determining, by the processor 1301, that the negotiated executor of the flow control policy is the virtual machine 13052; and if a negotiation non-acknowledgment indication that is sent by the host 13051 in response to the executor negotiation request is received by the virtual machine 13052, determining that the negotiated executor of the flow control policy is the host 13051.

Alternatively, that the processor 1301 negotiates, between the host 13051 and the virtual machine 13052, an executor of a flow control policy based on a flow control capability of the virtual machine 13052 may include: sending, by the processor 1301 to the host 13051, an executor negotiation request to be sent by the virtual machine 13052 to the host 13051, where the executor negotiation request carries description information about the flow control capability of the virtual machine 13052; if a negotiation acknowledgment indication that is sent by the host 13051 in response to the executor negotiation request is received by the virtual machine 13052, determining, by the processor 1301, that the negotiated executor of the flow control policy is the virtual machine; and if no negotiation acknowledgment indication that is sent by the host 13051 in response to the executor negotiation request is received by the virtual machine 13052 within a first set duration, determining, by the processor 1301, that the negotiated executor of the flow control policy is the host 13051.

Alternatively, that the processor 1301 negotiates, between the host 13051 and the virtual machine 13052, an executor of a flow control policy based on a flow control capability of the virtual machine 13052 may include: sending, by the processor 1301 to the host 13051, an executor negotiation request to be sent by the virtual machine 13052 to the host 13051, where the executor negotiation request carries description information about the flow control capability of the virtual machine 13052, and the description information about the flow control capability is used to describe a version of a flow control policy of which execution is supported by the virtual machine; if a negotiation acknowledgment indication that is sent by the host 13051 in response to the executor negotiation request is received by the virtual machine 13052, determining, by the processor 1301, that the negotiated executor of the flow control policy is the virtual machine; and if no negotiation acknowledgment indication that is sent by the host 13051 in response to the executor negotiation request is received by the virtual machine 13052 within a first set duration, determining, by the processor 1301, that the negotiated executor of the flow control policy is the host 13051.

Alternatively, that the processor 1301 negotiates, between the host 13051 and the virtual machine 13052, an executor of a flow control policy based on a flow control capability of the virtual machine 13052 may include: sending, by the processor 1301 to the host 13051, an executor negotiation request to be sent by the virtual machine 13052 to the host 13051, where the executor negotiation request carries description information about the flow control capability of the virtual machine 13052; if a negotiation non-acknowledgment indication that is sent by the host 13051 in response to the executor negotiation request is received by the virtual machine 13052, determining, by the processor 1301, that the negotiated executor of the flow control policy is the host 13051; and if no negotiation non-acknowledgment indication that is sent by the host 13051 in response to the executor negotiation request is received by the virtual machine 13052 within a second set duration, determining, by the processor 1301, that the negotiated executor of the flow control policy is the virtual machine.

Alternatively, that the processor 1301 negotiates, between the host 13051 and the virtual machine 13052, an executor of a flow control policy based on a flow control capability of the virtual machine 13052 may include: sending, by the processor 1301 to the host 13051, an executor negotiation request to be sent by the virtual machine 13052 to the host 13051, where the executor negotiation request carries description information about the flow control capability of the virtual machine 13052, and the description information about the flow control capability is used to describe a version of a flow control policy of which execution is supported by the virtual machine; if a negotiation non-acknowledgment indication that is sent by the host 13051 in response to the executor negotiation request is received by the virtual machine 13052, determining, by the processor 1301, that the negotiated executor of the flow control policy is the host 13051; and if no negotiation non-acknowledgment indication that is sent by the host 13051 in response to the executor negotiation request is received by the virtual machine 13052 within a second set duration, determining, by the processor 1301, that the negotiated executor of the flow control policy is the virtual machine.

In some embodiments of the present invention, the negotiation acknowledgment indication includes the flow control policy.

That the processor 1301 performs forward processing on the to-be-forward-processed packet of the virtual machine 13052 based on the flow control policy may include: performing, by the processor 1301, forward processing on the to-be-forward-processed packet of the virtual machine 13052 based on the flow control policy included in the negotiation acknowledgment indication.

Certainly, the host 13051 may also transfer the flow control policy to the virtual machine 13052 in other manners, so that the processor 1301 performs, after it is determined that the negotiated executor of the flow control policy is the virtual machine 13052, forward processing on the to-be-forward-processed packet of the virtual machine 13052 based on the flow control policy transferred by the host 13051. Certainly, the flow control policy may also be pre-configured in the virtual machine 13052; when it is determined that the negotiated executor of the flow control policy is the virtual machine 13052, the processor 1301 performs forward processing on the to-be-forward-processed packet of the virtual machine 13052 based on the pre-configured flow control policy.

In some embodiments of the present invention, after the host 13051 receives the executor negotiation request, if the description information about the flow control capability is used to describe a version of a flow control policy of which execution is supported by the virtual machine, that the processor 1301 may determine, according to the description information about the flow control capability, whether the virtual machine supports execution of a flow control policy of a current latest version or a preset version may specifically include: determining, through comparison, whether the version, which is described by the description information about the flow control capability, of the flow control policy of which execution is supported by the virtual machine, is the same as the current latest version or the preset version of the flow control policy; if they are the same, determining that the virtual machine supports execution of the flow control policy of the current latest version or the preset version; and if they are different, determining that the virtual machine does not support the execution of the flow control policy of the current latest version or the preset version. For another example, that the processor 1301 determines, according to the description information about the flow control capability, whether the virtual machine supports execution of the flow control policy of the current latest version or the preset version may specifically include: determining, through comparison, whether each version of k (where k is a positive integer) versions, which are described by the description information about the flow control capability, of flow control policies of which execution is supported by the virtual machine, is the same as the current latest version or the preset version of the flow control policy; if it is obtained, by comparison, that one version of the k versions is the current latest version or the preset version of the flow control policy, determining that the virtual machine supports execution of the flow control policy of the current latest version or the preset version; and if it is obtained, by comparison, that any one version of the k versions is different from the current latest version or the preset version of the flow control policy, determining that the virtual machine does not support the execution of the flow control policy of the current latest version or the preset version.

In some embodiments of the present invention, the processor 1301 is further configured to, after it is determined that the negotiated executor of the flow control policy is the virtual machine 13052, if the host 13051 receives no heartbeat message from the virtual machine 13052 within a set duration, send to the virtual machine 13052, an indication message that is to be sent by the host 13051 to the virtual machine 13052 and used to indicate that the executor of the flow control policy is switched to the host 13051.

In this embodiment, the flow control policy based on which the processor 1301 processes a to-be-forward-processed packet of the host 13051 or the virtual machine 13052 may be, for example, a flow control policy based on service quality and/or a flow control policy based on an access control list; certainly, the flow control policy may also be a flow control policy that makes reference to other factors.

In the flow control policy based on service quality, a specific manner (where a specific forward processing manner may be sending a packet with a delay, sending a packet without a delay, or discarding a packet, or the like) of performing forward processing on the packet is determined mainly based on a service priority corresponding to the to-be-forward-processed packet. For example, multiple to-be-forward-processed packets currently exist in a cache; a packet corresponding to a higher service priority may be sent with a shorter delay or even without a delay, a packet corresponding to a lower service priority may be sent with a longer delay, and a to-be-forward-processed packet corresponding to a service priority that is lower than a set priority threshold may even be discarded. This helps ensure service quality of a high-priority service as much as possible. That is, the performing forward processing on the to-be-forward-processed packet according to the flow control policy based on service quality may specifically include: performing forward processing on the to-be-forward-processed packet according to a forward processing manner corresponding to a service priority of the to-be-forward-processed packet.

In the flow control policy based on an access control list, a specific manner of performing forward processing on the packet is determined mainly based on whether information carried in the to-be-forward-processed packet matches a record included in an access control list. For example, the access control list is a restricted access control list (which is similar to a blacklist); if the restricted access control list has a record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; on the contrary, if the restricted access control list has no record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. For another example, the access control list is a permitted access control list (which is similar to a whitelist); if the permitted access control list has no record that matches information such as a source/destination address, an application-layer protocol type, or a transport-layer protocol type of a to-be-forward-processed packet and/or a specific keyword included in a packet header, a manner of performing forward processing on the to-be-forward-processed packet may be directly discarding the packet; and if the permitted access control list has a record that matches the information such as the source/destination address, the application-layer protocol type, or the transport-layer protocol type of the to-be-forward-processed packet and/or the specific keyword included in the packet header, the manner of performing forward processing on the to-be-forward-processed packet may be forwarding the packet. Other cases may be processed by analogy.

In some embodiments of the present invention, that the processor 1301 sends, to the host 13051, the executor negotiation request to be sent by the virtual machine 13052 to the host 13051 may include:

after the virtual machine 13052 receives a negotiation starting request initiated by a user-mode process, sending, by the processor 1301 to the host 13051, the executor negotiation request to be sent by the virtual machine 13052 to the host 13051; or after the virtual machine 13052 receives a negotiation starting request from the host 13051, sending, by the processor 1301 to the host 13051, the executor negotiation request to be sent by the virtual machine 13052 to the host 13051.

In some embodiments of the present invention, the negotiating, between the host 13051 and the virtual machine 13052, an executor of a flow control policy based on a flow control capability of the virtual machine 13052 may include:

after a connection between a preload client deployed in the virtual machine 13052 and a preload server deployed in the host 13051 is established, negotiating, by the processor 1301 by using the established connection, and between the host 13051 and the virtual machine 13052, the executor of the flow control policy based on the flow control capability of the virtual machine 13052.

It may be understood that functions of each unit of the computing node 1300 in this embodiment may be specifically implemented according to the method described in the foregoing method embodiments. For its specific implementation process, refer to the related descriptions in the foregoing embodiments, and details are not described herein again.

It can be seen that, after the foregoing solution is used, a mechanism in which a virtual machine 13052 and a host 13051 negotiate an executor of a flow control policy is introduced into a computing node 1300, so that with assistance of the processor 1301, both the virtual machine 13052 and the host 13051 have an opportunity to be the executor of the flow control policy; this makes it possible for the virtual machine 13052 to execute the flow control policy, which helps perform flow control on a packet as early as possible, and further helps reduce ineffective processing and reduce occupation of bandwidth and address space of the host 13051 by ineffective packet flow. It can be seen that the solution helps reduce occupation of the address space of the host 13051 for performing forward processing on an outbound packet flow of the virtual machine 13052. Moreover, the executor of the flow control policy is determined through negotiation, which helps improve reliability of executing the flow control policy.

Further, when both the virtual machine 13052 and the host 13051 support execution of the flow control policy, the virtual machine 13052 has priority in executing the flow control policy; this further helps perform flow control on a packet as early as possible, and further helps reduce bandwidth occupied by ineffective processing and the invalid packet flow.

An embodiment of the present invention further provides a computer storage medium, where the computer storage medium may store a program, and when the program is executed, a part of or all steps of the packet flow control methods described in the method embodiments are included.

It should be noted that, for ease of description, each foregoing method embodiment is described as a combination of a series of actions; however, persons skilled in the art should know that, the present invention is not limited by the described action sequence, because some steps may be performed in another sequence or simultaneously according to the present invention. In addition, a person skilled in the art should know that the embodiments described in the specification are exemplary embodiments, the involved actions and modules are not definitely needed in the present invention.

In the foregoing embodiments, the description of each embodiment has different emphases. For a part that is not described in detail in an embodiment, refer to related descriptions in other embodiments.

In the several embodiments provided in the present application, it should be understood that the disclosed apparatus may be implemented in other manners. For example, the described apparatus embodiment is merely exemplary. For example, the foregoing unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or a processor connected to a memory) to perform all or a part of the steps of the methods described in the embodiments of the present invention. The foregoing storage medium includes: any medium that can store program code, such as a USB flash drive, a read-only memory (Read-Only Memory, ROM), a random access memory (Random Access Memory, RAM), a removable hard disk, a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A packet flow control method, comprising:
   negotiating, between a virtual machine and a Host, an executor of a flow control policy based on a flow control capability of the virtual machine, wherein the virtual machine maintains a to-be-forward-processed packet that is to be forward-processed;
   when it is determined, according to the negotiation, that a negotiated executor of the flow control policy is the virtual machine, performing, by the virtual machine, forward processing on the to-be-forward-processed packet based on the flow control policy; and
   when it is determined, according to the negotiation, that the negotiated executor of the flow control policy is the Host, sending, by the virtual machine, the to-be-forward-processed packet to the Host, so that the Host performs forward processing on the received packet based on the flow control policy.

2. The method according to claim 1, wherein negotiating, between the virtual machine and the host, the executor of the flow control policy based on the flow control capability of the virtual machine comprises:

sending, by the virtual machine, an executor negotiation request that carries description information about the flow control capability of the virtual machine to the Host;

if the virtual machine receives a negotiation acknowledgment indication that is sent by the Host after the Host determines, according to the description information about the flow control capability, that the virtual machine supports execution of the flow control policy, determining, by the virtual machine, that the negotiated executor of the flow control policy is the virtual machine; and if the virtual machine receives a negotiation non-acknowledgment indication that is sent by the Host after the Host determines, according to the description information about the flow control capability, that the virtual machine does not support the execution of the flow control policy, determining, by the virtual machine, that the negotiated executor of the flow control policy is the Host.

3. The method according to claim 1, wherein negotiating, between the virtual machine and the host, the executor of the flow control policy based on the flow control capability of the virtual machine comprises:

sending, by the virtual machine, an executor negotiation request that carries description information about the flow control capability of the virtual machine to the Host, wherein the description information about the flow control capability is used to describe a version of a flow control policy of which execution is supported by the virtual machine;

if the virtual machine receives a negotiation acknowledgment indication that is sent by the Host after the Host determines, according to the description information about the flow control capability, that the virtual machine supports execution of a flow control policy of a current latest version or a preset version, determining, by the virtual machine, that the negotiated executor of the flow control policy is the virtual machine; and if the virtual machine receives a negotiation non-acknowledgment indication that is sent by the Host after the Host determines, according to the description information about the flow control capability, that the virtual machine does not support the execution of the flow control policy of the current latest version or the preset version, determining, by the virtual machine, that the negotiated executor of the flow control policy is the Host.

4. The method according to claim 1, wherein negotiating, between the virtual machine and the host, the executor of the flow control policy based on the flow control capability of the virtual machine comprises:

sending, by the virtual machine, an executor negotiation request that carries description information about the flow control capability of the virtual machine to the Host;

if the virtual machine receives a negotiation acknowledgment indication that is sent by the Host after the Host determines, according to the description information about the flow control capability, that the virtual machine supports execution of the flow control policy, determining, by the virtual machine, that the negotiated executor of the flow control policy is the virtual machine; and if the virtual machine receives, within a first predetermined duration, no negotiation acknowledgment indication that is sent by the Host in response to the executor negotiation request, determining, by the virtual machine, that the negotiated executor of the flow control policy is the Host.

5. The method according to claim 1, wherein negotiating, between the virtual machine and the host, the executor of the flow control policy based on the flow control capability of the virtual machine comprises:

sending, by the virtual machine, an executor negotiation request that carries description information about the flow control capability of the virtual machine to the Host, wherein the description information about the flow control capability is used to describe a version of a flow control policy of which execution is supported by the virtual machine;

if the virtual machine receives a negotiation acknowledgment indication that is sent by the Host after the Host determines, according to the description information about the flow control capability, that the virtual machine supports execution of a flow control policy of a current latest version or a preset version, determining, by the virtual machine, that the negotiated executor of the flow control policy is the virtual machine; and if the virtual machine receives, within a first predetermined duration, no negotiation acknowledgment indication that is sent by the Host in response to the executor negotiation request, determining, by the virtual machine, that the negotiated executor of the flow control policy is the Host.

6. The method according to claim 1, wherein negotiating, between the virtual machine and the host, the executor of the flow control policy based on the flow control capability of the virtual machine comprises:

sending, by the virtual machine, an executor negotiation request that carries description information about the flow control capability of the virtual machine to the Host;

if the virtual machine receives a negotiation non-acknowledgment indication that is sent by the Host after the Host determines, according to the description information about the flow control capability, that the virtual machine does not support execution of the flow control policy, determining, by the virtual machine, that the negotiated executor of the flow control policy is the Host; and if the virtual machine receives, within a second predetermined duration, no negotiation non-acknowledgment indication that is sent by the Host in response to the executor negotiation request, determining, by the virtual machine, that the negotiated executor of the flow control policy is the virtual machine.

7. The method according to claim 1, wherein negotiating, between the virtual machine and the host, the executor of the flow control policy based on the flow control capability of the virtual machine comprises:

sending, by the virtual machine, an executor negotiation request that carries description information about the flow control capability of the virtual machine to the Host, wherein the description information about the flow control capability is used to describe a version of a flow control policy of which execution is supported by the virtual machine;

if the virtual machine receives a negotiation non-acknowledgment indication that is sent by the Host after the Host determines, according to the description information about the flow control capability, that the virtual machine does not support execution of a flow control policy of a current latest version or a preset version, determining, by the virtual machine, that the negotiated executor of the flow control policy is the Host; and if the virtual machine receives, within a second predetermined duration, no negotiation non-acknowledgment indication that is sent by the Host in response to the executor negotiation request, determining, by the virtual machine, that the negotiated executor of the flow control policy is the virtual machine.

8. The method according to claim 2, wherein:

the negotiation acknowledgment indication comprises the flow control policy; and performing, by the virtual machine, forward processing on a to-be-forward-processed packet based on the flow control policy comprises:

performing, by the virtual machine, forward processing on the to-be-forward-processed packet based on the flow control policy comprised in the negotiation acknowledgment indication.

9. The method according to claim 2, wherein sending, by the virtual machine, the executor negotiation request that carries description information about the flow control capability of the virtual machine to the Host comprises:

sending, by the virtual machine after receiving a negotiation starting request initiated by a user-mode process, the executor negotiation request that carries the description information about the flow control capability of the virtual machine to the Host; or sending, by the virtual machine after receiving a negotiation starting request from the Host, the executor negotiation request that carries the description information about the flow control capability of the virtual machine to the Host.

10. The method according to claim 1, wherein negotiating, between the virtual machine and the host, the executor of the flow control policy based on the flow control capability of the virtual machine comprises:

after a connection between a preload client deployed in the virtual machine and a preload server deployed in the Host is established, negotiating between the virtual machine and the Host, by the preload client with the preload server based on the established connection, the executor of the flow control policy based on the flow control capability of the virtual machine.

11. The method according to claim 10, further comprising:

after it is determined that the negotiated executor of the flow control policy is the virtual machine, periodically sending, by the preload client, a heartbeat message to the preload server through the connection.

12. The method according to claim 1, wherein the flow control policy is a flow control policy based on service quality and/or a flow control policy based on an access control list.

13. A packet flow control method, comprising:

negotiating, between a virtual machine and a Host, an executor of a flow control policy based on a flow control capability of the virtual machine, wherein the virtual machine maintains a packet that is to be forward-processed; and if it is determined that a negotiated executor of the flow control policy is the Host, performing, by the Host after receiving the packet from the virtual machine, forward processing on the received packet based on the flow control policy.

14. The method according to claim 13, wherein negotiating, between the virtual machine and the host, the executor of the flow control policy based on the flow control capability of the virtual machine comprises:

receiving, by the Host, an executor negotiation request that is sent by the virtual machine and carries description information about the flow control capability of the virtual machine;

sending a negotiation acknowledgment indication to the virtual machine if the Host determines, according to the description information about the flow control capability, that the virtual machine supports execution of the flow control policy, wherein the negotiation acknowledgment indication indicates that the negotiated executor of the flow control policy is the virtual machine; and sending a negotiation non-acknowledgment indication to the virtual machine if the Host determines, according to the description information about the flow control capability, that the virtual machine does not support the execution of the flow control policy, wherein the negotiation non-acknowledgment indication indicates that the negotiated executor of the flow control policy is the Host.

15. The method according to claim 13, wherein negotiating, between the virtual machine and the host, the executor of the flow control policy based on the flow control capability of the virtual machine comprises:

receiving, by the Host, an executor negotiation request that is sent by the virtual machine and carries description information about the flow control capability of the virtual machine, wherein the description information about the flow control capability is used to describe a version of a flow control policy of which execution is supported by the virtual machine;

sending a negotiation acknowledgment indication to the virtual machine if the Host determines, according to the description information about the flow control capability, that the virtual machine supports execution of a flow control policy of a current latest version or a preset version, wherein the negotiation acknowledgment indication indicates that the negotiated executor of the flow control policy is the virtual machine; and sending a negotiation non-acknowledgment indication to the virtual machine if the Host determines, according to the description information about the flow control capability, that the virtual machine does not support the execution of the flow control policy of the current latest version or the preset version, wherein the negotiation non-acknowledgment indication indicates that the negotiated executor of the flow control policy is the Host.

16. The method according to claim 13, wherein negotiating, between the virtual machine and the host, the executor of the flow control policy based on the flow control capability of the virtual machine comprises:

after a connection between a preload server in the Host and a preload client in the virtual machine is established, negotiating, by the preload server with the preload client by using the connection, and between the virtual machine and the host, the executor of the flow control policy based on the flow control capability of the virtual machine.

17. The method according to claim 13, further comprising:

after it is determined that the negotiated executor of the flow control policy is the virtual machine, if no heartbeat message is received from the virtual machine within a predetermined duration, sending, by the Host to the virtual machine, an indication message to indicate that the executor of the flow control policy is switched to the Host.

18. The method according to claim 13, wherein the flow control policy is a flow control policy based on service quality and/or a flow control policy based on an access control list.

19. A computing node, comprising:
a hardware layer, a Host that runs at the hardware layer, and at least one virtual machine that runs on the Host, wherein the virtual machine maintains a to-be-forward-processed packet that is to be forward-processed;
wherein the virtual machine is configured to:
  negotiate, between the virtual machine and the Host, an executor of a flow control policy based on a flow control capability of the virtual machine,
  perform forward processing on the to-be-forward-processed packet based on the flow control policy when it is determined, according to the negotiation, that a negotiated executor of the flow control policy is the virtual machine, and
  send the to-be-forward-processed packet to the Host when it is determined, according to the negotiation, that the negotiated executor of the flow control policy is the Host; and
wherein the Host is configured to: if it is determined that the negotiated executor of the flow control policy is the Host, perform forward processing on a received packet based on the flow control policy after receiving the packet from the virtual machine.

20. The computing node according to claim 19, wherein, for negotiating, between the virtual machine and the Host, the executor of the flow control policy based on the flow control capability of the virtual machine, the virtual machine is configured to:
  send an executor negotiation request that carries description information about the flow control capability of the virtual machine to the Host;
  if a negotiation acknowledgment indication is received, determine that the negotiated executor of the flow control policy is the virtual machine, wherein the negotiation acknowledgment indication is sent by the Host after the Host determines, according to the description information about the flow control capability, that the virtual machine supports execution of the flow control policy; and
  if a negotiation non-acknowledgment indication is received, determine that the negotiated executor of the flow control policy is the Host, wherein the negotiation non-acknowledgment indication is sent by the Host after the Host determines, according to the description information about the flow control capability, that the virtual machine does not support the execution of the flow control policy.

21. The computing node according to claim 19, wherein, for negotiating, between the virtual machine and the Host, the executor of the flow control policy based on the flow control capability of the virtual machine, the virtual machine is configured to:
  send an executor negotiation request that carries description information about the flow control capability of the virtual machine to the Host, wherein the description information about the flow control capability is used to describe a version of a flow control policy of which execution is supported by the virtual machine;
  if a negotiation acknowledgment indication that is sent by the Host after the Host determines, according to the description information about the flow control capability, that the virtual machine supports execution of a flow control policy of a current latest version or a preset version is received, determine that the negotiated executor of the flow control policy is the virtual machine; and
  if a negotiation non-acknowledgment indication that is sent by the Host after the Host determines, according to the description information about the flow control capability, that the virtual machine does not support the execution of the flow control policy of the current latest version or the preset version is received, determine that the negotiated executor of the flow control policy is the Host.

22. The computing node according to claim 19, wherein, for negotiating, between the virtual machine and the Host, the executor of the flow control policy based on the flow control capability of the virtual machine, the virtual machine is configured to:
  send an executor negotiation request that carries description information about the flow control capability of the virtual machine to the Host;
  if a negotiation acknowledgment indication is received, determine that the negotiated executor of the flow control policy is the virtual machine, wherein the negotiation acknowledgment indication is sent by the Host after the Host determines, according to the description information about the flow control capability, that the virtual machine supports execution of the flow control policy; and
  if no negotiation acknowledgment indication that is sent by the Host in response to the executor negotiation request is received within a first predetermined duration, determine that the negotiated executor of the flow control policy is the Host.

23. The computing node according to claim 19, wherein, for negotiating, between the virtual machine and the Host, the executor of the flow control policy based on the flow control capability of the virtual machine, the virtual machine is configured to:
  send an executor negotiation request that carries description information about the flow control capability of the virtual machine to the Host, wherein the description information about the flow control capability is used to describe a version of a flow control policy of which execution is supported by the virtual machine;
  if a negotiation acknowledgment indication that is sent by the Host after the Host determines, according to the description information about the flow control capability, that the virtual machine supports execution of a flow control policy of a current latest version or a preset version is received, determine that the negotiated executor of the flow control policy is the virtual machine; and
  if no negotiation acknowledgment indication that is sent by the Host in response to the executor negotiation request is received within a first predetermined duration, determine that the negotiated executor of the flow control policy is the Host.

24. The computing node according to claim 19, wherein, for negotiating, between the virtual machine and the Host, the executor of the flow control policy based on the flow control capability of the virtual machine, the virtual machine is configured to:

send an executor negotiation request that carries description information about the flow control capability of the virtual machine to the Host;

if a negotiation non-acknowledgment indication is received, determine that the negotiated executor of the flow control policy is the Host, wherein the negotiation non-acknowledgment indication is sent by the Host after the Host determines, according to the description information about the flow control capability, that the virtual machine does not support execution of the flow control policy; and if no negotiation non-acknowledgment indication that is sent by the Host in response to the executor negotiation request is received within a second predetermined duration, determine that the negotiated executor of the flow control policy is the virtual machine.

25. The computing node according to claim 19, wherein, for negotiating, between the virtual machine and the Host, the executor of the flow control policy based on the flow control capability of the virtual machine, the virtual machine is configured to:

send an executor negotiation request that carries description information about the flow control capability of the virtual machine to the host, wherein the description information about the flow control capability is used to describe a version of a flow control policy of which execution is supported by the virtual machine;

if a negotiation non-acknowledgment indication that is sent by the Host after the Host determines, according to the description information about the flow control capability, that the virtual machine does not support execution of a flow control policy of a current latest version or a preset version is received, determine that the negotiated executor of the flow control policy is the Host; and if no negotiation non-acknowledgment indication that is sent by the Host in response to the executor negotiation request is received within a second predetermined duration, determine that the negotiated executor of the flow control policy is the virtual machine.

26. The computing node according to claim 19, wherein the Host is further configured to:

after it is determined that the negotiated executor of the flow control policy is the virtual machine, if no heartbeat message is received from the virtual machine within a predetermined duration, send, to the virtual machine, an indication message used to indicate that the executor of the flow control policy is switched to the Host.

27. A packet flow control method, comprising:

negotiating, by a processor and between a Host and a virtual machine, an executor of a flow control policy based on a flow control capability of the virtual machine, wherein the virtual machine maintains a to-be-forward-processed packet that is to be forward-processed;

when a negotiated executor of the flow control policy, according to the negotiation, is the virtual machine, performing, by the processor, forward processing on the to-be-forward-processed packet of the virtual machine based on the flow control policy; and when the negotiated executor of the flow control policy, according to the negotiation, is the Host, sending, by the processor, the to-be-forward-processed packet of the virtual machine from the virtual machine to the Host, and performing, by the processor based on the flow control policy, forward processing on the to-be-forward-processed packet received by the Host.

28. The method according to claim 27, wherein negotiating, by the processor and between the host and the virtual machine, the executor of the flow control policy based on the flow control capability of the virtual machine comprises:

sending, by the processor to the Host, an executor negotiation request that is to be sent to the Host by the virtual machine, wherein the executor negotiation request carries description information about the flow control capability of the virtual machine; and after the Host receives the executor negotiation request, if the processor determines, according to the description information about the flow control capability, that the virtual machine supports execution of the flow control policy, sending, by the processor to the virtual machine, a negotiation acknowledgment indication that is to be sent to the virtual machine by the Host, wherein the negotiation acknowledgment indication indicates that the negotiated executor of the flow control policy is the virtual machine; and/or if the processor determines, according to the description information about the flow control capability, that the virtual machine does not support the execution of the flow control policy, sending, by the processor to the virtual machine, a negotiation non-acknowledgment indication that is to be sent to the virtual machine by the Host, wherein the negotiation non-acknowledgment indication indicates that the negotiated executor of the flow control policy is the Host.

29. The method according to claim 27, wherein negotiating, by the processor and between the host and the virtual machine, the executor of the flow control policy based on the flow control capability of the virtual machine comprises:

sending, by the processor to the Host, an executor negotiation request that is to be sent to the Host by the virtual machine, wherein the executor negotiation request carries description information about the flow control capability of the virtual machine, and the description information about the flow control capability is used to describe a version of a flow control policy of which execution is supported by the virtual machine; and after the Host receives the executor negotiation request, if the processor determines, according to the description information about the flow control capability, that the virtual machine supports execution of a flow control policy of a current latest version or a preset version, sending, by the processor to the virtual machine, a negotiation acknowledgment indication that is to be sent to the virtual machine by the Host, wherein the negotiation acknowledgment indication indicates that the negotiated executor of the flow control policy is the virtual machine; and/or if the processor determines, according to the description information about the flow control capability, that the virtual machine does not support the execution of the flow control policy of the current latest version or the preset version, sending, by the processor to the virtual machine, a negotiation non-acknowledgment indication that is to be sent to the virtual machine by the Host, wherein the negotiation non-acknowledgment indication indicates that the negotiated executor of the flow control policy is the Host.

30. The method according to claim 28, wherein:
the negotiation acknowledgment indication comprises the flow control policy; and performing forward processing on the to-be-forward-processed packet of the virtual machine based on the flow control policy comprises:
  performing forward processing on the to-be-forward-processed packet of the virtual machine based on the flow control policy comprised in the negotiation acknowledgment indication.

31. The method according to claim 27, further comprising:
  after it is determined that the negotiated executor of the flow control policy is the virtual machine, if the Host receives no heartbeat message from the virtual machine within a predetermined duration, sending, by the processor to the virtual machine, an indication message that is to be sent by the Host to the virtual machine and used to indicate that the executor of the flow control policy is switched to the Host.

32. A computing node, comprising:
  storage; and
  a processor coupled to the storage, wherein the processor is configured to:
    negotiate, between a Host and a virtual machine, an executor of a flow control policy based on a flow control capability of the virtual machine, wherein the virtual machine maintains a to-be-forward-processed packet that is to be forward-processed,
    when a negotiated executor of the flow control policy, according to the negotiation, is the virtual machine, perform forward processing on the to-be-forward-processed packet of the virtual machine based on the flow control policy, and
    when the negotiated executor of the flow control policy, according to the negotiation, is the Host, send the to-be-forward-processed packet of the virtual machine from the virtual machine to the Host, and perform, based on the flow control policy, forward processing on the to-be-forward-processed packet received by the Host.

33. The computing node according to claim 32, wherein the processor is configured to:
  send, to the Host, an executor negotiation request that is to be sent to the Host by the virtual machine, wherein the executor negotiation request carries description information about the flow control capability of the virtual machine,
  after the Host receives the executor negotiation request, if it is determined, according to the description information about the flow control capability, that the virtual machine supports execution of the flow control policy, send, to the virtual machine, a negotiation acknowledgment indication that is to be sent to the virtual machine by the Host, wherein the negotiation acknowledgment indication indicates that the negotiated executor of the flow control policy is the virtual machine, and/or
  if it is determined, according to the description information about the flow control capability, that the virtual machine does not support the execution of the flow control policy, send, to the virtual machine, a negotiation non-acknowledgment indication that is to be sent to the virtual machine by the Host, wherein the negotiation non-acknowledgment indication indicates that the negotiated executor of the flow control policy is the Host.

34. The computing node according to claim 32, wherein the processor is configured to:
  send, to the Host, an executor negotiation request that is to be sent to the Host by the virtual machine, wherein the executor negotiation request carries description information about the flow control capability of the virtual machine, and the description information about the flow control capability is used to describe a version of a flow control policy of which execution is supported by the virtual machine,
  after the Host receives the executor negotiation request, if it is determined, according to the description information about the flow control capability, that the virtual machine supports execution of a flow control policy of a current latest version or a preset version, send, to the virtual machine, a negotiation acknowledgment indication that is to be sent to the virtual machine by the Host, wherein the negotiation acknowledgment indication indicates that the negotiated executor of the flow control policy is the virtual machine, and/or
  if it is determined, according to the description information about the flow control capability, that the virtual machine does not support the execution of the flow control policy of the current latest version or the preset version, send, to the virtual machine, a negotiation non-acknowledgment indication that is to be sent to the virtual machine by the Host, wherein the negotiation non-acknowledgment indication indicates that the negotiated executor of the flow control policy is the Host.

35. The computing node according to claim 33, wherein:
  the negotiation acknowledgment indication comprises the flow control policy; and
  the processor is configured to perform forward processing on the to-be-forward-processed packet of the virtual machine based on the flow control policy comprised in the negotiation acknowledgment indication.

36. The computing node according to claim 32, wherein the processor is further configured to:
  after it is determined that the negotiated executor of the flow control policy is the virtual machine, if the Host receives no heartbeat message from the virtual machine within a predetermined duration, send, to the virtual machine, an indication message that is to be sent by the Host to the virtual machine and used to indicate that the executor of the flow control policy is switched to the Host.

* * * * *